(12) United States Patent
Roever et al.

(10) Patent No.: US 7,707,121 B1
(45) Date of Patent: *Apr. 27, 2010

(54) METHODS AND APPARATUS FOR TITLE STRUCTURE AND MANAGEMENT

(75) Inventors: Stefan Roever, Los Altos Hills, CA (US); Kevin Collins, Folsom, CA (US); Josh C. Ding, San Jose, CA (US); Alex F. Clark, Campbell, CA (US); James Bruce, Scotts Valley, CA (US)

(73) Assignee: Navio Systems, Inc., San Jose, CA (US)

( * ) Notice: Subject to any disclaimer, the term of this patent is extended or adjusted under 35 U.S.C. 154(b) by 445 days.

This patent is subject to a terminal disclaimer.

(21) Appl. No.: 10/440,286

(22) Filed: May 15, 2003

Related U.S. Application Data

(63) Continuation-in-part of application No. 10/232,861, filed on Aug. 30, 2002.

(60) Provisional application No. 60/380,787, filed on May 15, 2002, provisional application No. 60/407,466, filed on Aug. 30, 2002, provisional application No. 60/407,382, filed on Aug. 30, 2002.

(51) Int. Cl.
*G06Q 99/00* (2006.01)
(52) U.S. Cl. .............................. 705/78; 705/51; 705/64; 705/79; 705/75
(58) Field of Classification Search ...................... 707/3, 707/100; 705/37, 50, 64, 51–59; 713/172, 713/175, 177; 715/513; 726/5; 345/764; 84/609
See application file for complete search history.

(56) References Cited

U.S. PATENT DOCUMENTS 5,455,407 A * 10/1995 Rosen ......................... 705/69

(Continued)

FOREIGN PATENT DOCUMENTS

JP 02-245970 1/1990
WO WO03098398 11/2003

OTHER PUBLICATIONS

Menezes et al, Handbook of Applied CryptographY, 1997 CRC Press LLC, Section 1.7.*

(Continued)

*Primary Examiner*—Jalatee Worjloh
(74) *Attorney, Agent, or Firm*—Weaver Austin Villeneuve & Sampson LLP

(57) ABSTRACT

A title management apparatus resident on a first computer including a memory for storing a control program and data, and a processor for executing the control program and for managing the data. The apparatus includes user data resident in the memory including a set of user security indicia. The apparatus also includes a first title object resident in the memory including a title structure, the title structure further comprising a content element, a set of attributes, and a set of title object security indicia. The apparatus further includes a set of stub objects coupled to the title object, wherein the set of stub objects can further optimize the title structure; an authorization structure configured to selectively redeem the content element based at least in part of the user security indicia; and, a title management structure configured to associate a user with the first title object based at least in part of the user data and the title attributes.

54 Claims, 55 Drawing Sheets

U.S. PATENT DOCUMENTS

| | | | |
|---|---|---|---|
| 5,606,609 | A | 2/1997 | Houser et al. |
| 5,629,980 | A | 5/1997 | Stefik |
| 5,752,020 | A | 5/1998 | Ando |
| 5,778,182 | A | 7/1998 | Cathey et al. |
| 5,794,217 | A | 8/1998 | Allen |
| 5,892,900 | A | 4/1999 | Ginter et al. |
| 5,903,880 | A | 5/1999 | Biffar |
| 5,905,976 | A | 5/1999 | Mjolsnes et al. |
| 5,956,736 | A * | 9/1999 | Hanson et al. ............. 715/513 |
| 6,065,117 | A * | 5/2000 | White ..................... 713/159 |
| 6,098,056 | A | 8/2000 | Rusnak et al. |
| 6,119,229 | A | 9/2000 | Martinez et al. |
| 6,154,214 | A | 11/2000 | Uyehara et al. |
| 6,170,744 | B1 | 1/2001 | Lee et al. |
| 6,189,097 | B1 | 2/2001 | Tycksen, Jr. et al. |
| 6,205,436 | B1 | 3/2001 | Rosen |
| 6,212,504 | B1 | 4/2001 | Hayosh |
| 6,330,544 | B1 | 12/2001 | Walker et al. |
| 6,341,353 | B1 * | 1/2002 | Herman et al. ............. 726/5 |
| 6,372,974 | B1 * | 4/2002 | Gross et al. ............. 84/609 |
| 6,378,075 | B1 | 4/2002 | Goldstein et al. |
| 6,389,541 | B1 | 5/2002 | Patterson |
| 6,574,609 | B1 * | 6/2003 | Downs et al. ............. 705/50 |
| 6,578,078 | B1 | 6/2003 | Smith |
| 6,591,260 | B1 | 7/2003 | Schwarzhoff et al. |
| 6,600,823 | B1 | 7/2003 | Hayosh |
| 6,629,081 | B1 | 9/2003 | Cornelius |
| 6,662,340 | B2 | 12/2003 | Rawat et al. |
| 6,675,153 | B1 | 1/2004 | Cook et al. |
| 6,751,670 | B1 | 6/2004 | Patterson |
| 6,772,341 | B1 * | 8/2004 | Shrader et al. ............. 713/175 |
| 6,868,392 | B1 | 3/2005 | Ogasawara |
| 6,871,220 | B1 | 3/2005 | Rajan et al. |
| 6,895,392 | B2 | 5/2005 | Stefik et al. |
| 6,898,576 | B2 | 5/2005 | Stefik et al. |
| 6,910,179 | B1 | 6/2005 | Pennell et al. |
| 6,913,193 | B1 | 7/2005 | Kawan |
| 6,938,021 | B2 | 8/2005 | Shear et al. |
| 6,944,776 | B1 | 9/2005 | Lockhart et al. |
| 6,947,556 | B1 | 9/2005 | Matyas et al. |
| 6,947,571 | B1 | 9/2005 | Rhoads |
| 7,010,512 | B1 | 3/2006 | Gillin |
| 7,016,877 | B1 | 3/2006 | Steele et al. |
| 7,020,626 | B1 * | 3/2006 | Eng et al. ............. 705/27 |
| 7,028,009 | B2 * | 4/2006 | Wang et al. ............. 705/51 |
| 7,069,234 | B1 | 6/2006 | Cornelius |
| 7,103,574 | B1 | 9/2006 | Peinado et al. |
| 7,120,606 | B1 * | 10/2006 | Ranzini et al. ............. 705/64 |
| 7,130,829 | B2 | 10/2006 | Banerjee et al. |
| 7,191,332 | B1 | 3/2007 | Pankajakshan et al. |
| 7,275,260 | B2 | 9/2007 | De Jong et al. |
| 7,346,923 | B2 | 3/2008 | Atkins et al. |
| 7,392,226 | B1 | 6/2008 | Sasaki et al. |
| 7,401,221 | B2 | 7/2008 | Adent et al. |
| 7,426,492 | B1 | 9/2008 | Bishop et al. |
| 7,444,519 | B2 | 10/2008 | Laferriere et al. |
| 2001/0008557 | A1 * | 7/2001 | Stefik et al. ............. 380/202 |
| 2001/0026287 | A1 | 10/2001 | Watanabe ............. 345/764 |
| 2001/0032312 | A1 * | 10/2001 | Runje et al. ............. 713/172 |
| 2002/0026445 | A1 * | 2/2002 | Chica et al. ............. 707/100 |
| 2002/0029183 | A1 * | 3/2002 | Vlahoplus et al. ............. 705/37 |
| 2002/0032646 | A1 | 3/2002 | Sweeney |
| 2002/0038278 | A1 | 3/2002 | Himmelstein |
| 2002/0040346 | A1 | 4/2002 | Kwan |
| 2002/0062249 | A1 | 5/2002 | Iannacci |
| 2002/0082961 | A1 | 6/2002 | Abrahm et al. |
| 2002/0091643 | A1 | 7/2002 | Okamoto et al. |
| 2002/0091646 | A1 | 7/2002 | Lake et al. |
| 2002/0106081 | A1 | 8/2002 | Yang |
| 2002/0116471 | A1 | 8/2002 | Shteyn |
| 2002/0143703 | A1 | 10/2002 | Razvan et al. |
| 2002/0147929 | A1 | 10/2002 | Rose |
| 2002/0152126 | A1 | 10/2002 | Lieu et al. |
| 2002/0152173 | A1 | 10/2002 | Rudd |
| 2002/0184504 | A1 * | 12/2002 | Hughes ............. 713/177 |
| 2003/0023561 | A1 | 1/2003 | Stefik et al. |
| 2003/0023564 | A1 | 1/2003 | Padhye et al. |
| 2003/0028489 | A1 | 2/2003 | Williamson |
| 2003/0061566 | A1 | 3/2003 | Rubstein et al. |
| 2003/0079122 | A1 | 4/2003 | Asokan et al. |
| 2003/0125965 | A1 | 7/2003 | Falso |
| 2003/0140034 | A1 * | 7/2003 | Probst et al. ............. 707/3 |
| 2003/0159043 | A1 | 8/2003 | Epstein |
| 2003/0182142 | A1 | 9/2003 | Valenzuela |
| 2003/0196087 | A1 | 10/2003 | Stringer et al. |
| 2003/0200439 | A1 | 10/2003 | Maskowitz |
| 2003/0208406 | A1 * | 11/2003 | Okamoto et al. ............. 705/18 |
| 2003/0217006 | A1 | 11/2003 | Roever et al. |
| 2003/0229593 | A1 | 12/2003 | Raley |
| 2004/0039916 | A1 | 2/2004 | Aldis et al. |
| 2004/0044627 | A1 | 3/2004 | Russell |
| 2004/0054630 | A1 | 3/2004 | Ginter et al. |
| 2004/0054915 | A1 | 3/2004 | Jong |
| 2004/0113792 | A1 * | 6/2004 | Ireland et al. ............. 340/572.8 |
| 2004/0128546 | A1 | 7/2004 | Blakely |
| 2004/0139207 | A1 | 7/2004 | de Jong |
| 2004/0196981 | A1 | 10/2004 | Nakano et al. |
| 2004/0199577 | A1 | 10/2004 | Burd et al. |
| 2004/0221045 | A1 | 11/2004 | Joosten et al. |
| 2004/0243517 | A1 * | 12/2004 | Hansen ............. 705/64 |
| 2004/0267671 | A1 | 12/2004 | Nonaka et al. |
| 2004/0267673 | A1 | 12/2004 | Ballard et al. |
| 2005/0004875 | A1 | 1/2005 | Kontio et al. |
| 2005/0027804 | A1 | 2/2005 | Cahill et al. |
| 2005/0038707 | A1 | 2/2005 | Roever et al. |
| 2005/0038724 | A1 | 2/2005 | Roever et al. |
| 2005/0234860 | A1 | 10/2005 | Roever et al. |
| 2005/0246193 | A1 | 11/2005 | Roever et al. |
| 2005/0247777 | A1 | 11/2005 | Pitroda |
| 2005/0251452 | A1 | 11/2005 | Roever et al. |
| 2005/0273805 | A1 | 12/2005 | Roever et al. |
| 2006/0036447 | A1 | 2/2006 | Roever et al. |
| 2006/0036548 | A1 | 2/2006 | Roever et al. |
| 2006/0167815 | A1 * | 7/2006 | Peinado et al. ............. 705/59 |
| 2006/0170759 | A1 | 8/2006 | Roever et al. |
| 2006/0174350 | A1 | 8/2006 | Roever et al. |
| 2006/0259422 | A1 | 11/2006 | Sutton et al. |
| 2007/0016533 | A1 * | 1/2007 | Fujimura ............. 705/65 |
| 2007/0250453 | A1 * | 10/2007 | Sako et al. ............. 705/67 |
| 2007/0286393 | A1 | 12/2007 | Roever et al. |
| 2008/0067230 | A1 * | 3/2008 | Silverbrook et al. ............. 235/375 |
| 2008/0148056 | A1 * | 6/2008 | Ginter et al. ............. 713/176 |

OTHER PUBLICATIONS

G. Ahn and J. Lam, "Managing privacy preferences for federated identity management," in Proc. DIM '05: Proceedings of the 2005 workshop on Digital identity management, Fairfax, VA, USA, 2005, pp. 28-36.

Alladin/Preview Systems, "HASP SL," Alladin/Preview Systems. 2004.

K. Bohrer and B. Holland, "Customer Profile Exchange (CPExchange) Specification," International Digital Enterprise Alliance, Inc., Version 1.0, Oct. 20, 2000.

D. Burdett. RFC 2801: Internet Open Trading Protocol. [Online]. Apr. 2000. Available: http://www.faqs.org/rfcs/rfc2801.html.

Business.com. Preview Systems, Inc. Profile. [Online]. 2006. Available: http://www.business.com/directory/telecommunications/preview_systems_inc/profile/.

Cover Pages. Internet Open Trading Protocol. [Online]. Dec. 2002. Available: http://xml.coverpages.org/otp.html.

Cover Pages. IETF Internet Open Trading Protocol Working Group Publishes RFC for Voucher Trading System. [Online]. May 2003. Available: http://xml.coverpages.org/ni2003-05-15-a.html.

Cover Pages. XML Voucher: Generic Voucher Language. [Online]. May 2003. Available: http://xml.coverpages.org/xmlVoucher.html.
B. Cox, J. Tygar, and M. Sirbu, "Netbill Security and Transaction Protocol," First USENIX Workshop on Electronic Commerce, Jul. 1995.
FlexTicket. [Online]. Available: http://info.isl.ntt.co.jp/flexticket/index.html.
K. Fujimura and D. Eastlake, RFC 3506: Requirements and Design for Voucher Trading System (VTS), United States: Network Working Group, Mar. 2003.
K. Fujimura, Y. Nakajima, and J. Sekine, XML Ticket: Generalized Digital Ticket Definition Language. 1999.
K. Fujimura, Y. Nakajima, General Purpose Digital Ticket Framework. Boston, Mass.: 3rd USENIX Workshop on Electronic Commerce, 1998.
K. Fujimura, M. Terada, and J. Sekine, "A World Wide Supermarket Scheme Using Rights Trading System," in Proc. ICPADS '00: Proceedings of the Seventh International Conference on Parallel and Distributed Systems: Workshops, Washington, DC, USA, 2000, p. 289.
M. Iguchi et al. Voucher Integrated C2B and C2C Trading Model. May 2002. [Online]. Available: http://wwwconf.ecs.soton.ac.uk/archive/00000272/01/index.html.
T. Hardjono and J. Seberry, Strongboxes for Electronic Commerce. Oakland, Calif.: 2nd USENIX Workshop on Electronic Commerce, 1996.
A. Josang, J. Fabre, B. Hay, J. Dalziel and S. Pope. "Trust Requirements in Identity Management." Australasian Information Security Workshop 2005.
M. Kumar, A. Rangachari, A. Jhingran, and R. Mohan, Sales Promotions on the Internet. Boston, Mass.: 3rd USENIX Workshop on Electronic Commerce, 1998.
K. Matsuyama and K. Fujimura, "Distributed digital-ticket management for rights trading system," in Proc. EC '99: Proceedings of the 1st ACM conference on Electronic commerce, Denver, Colorado, United States, 1999, pp. 110-118.
G. Medvinksy and B. C. Neuman, NetCash: A design for practical electronic currency on the Internet. Proceedings of the First ACM Conference on Computer and Communications Security, Nov. 1993.
M. Mont, S. Pearson, P. Bramhall "Towards Accountable Management of Identity and Privacy: Sticky Policies and Enforceable Tracing Services," Hewlett Packard, 2003.
OECD. (Jan. 27, 2006) OECD Guidelines on the Protection of Privacy and Transborder Flows of Personal Data [br] . [Online]. Available: http://www.oecd.org/document/18/0,2340,en_2649_201185_1815186_1_1_1_1,00.
G. Skinner, S. Han, and E. Chang, "A framework of privacy shield in organizational information systems," Proceedings of Int'l Conference on Mobile Business, 2005.
D. Stewart. The Future of Digital Cash on the Internet. [Online]. Available: http://www.arraydev.com/commerce/JIBC/9703-02.html.
M. Terada, H. Kuno, M. Hanadate, and K. Fujimara, Copy Prevention Scheme for Rights Trading Infrastructure, 2000.
M. Terada and K. Fujimara, RFC 4153: "XML Voucher: Generic Voucher Language," Network Working Group, Sep. 2005.
M. Terada. RFC 4154: Voucher Trading System Application Programming Interface. Sep. 2005. [Online]Available: http://www.rfc-archive.org/getrfc.php?rfc=4154.
D. Weitzel "Liberty ID-WSF Implementation Guide" Draft Version 1.0-1.2, Liberty Alliance Project. 2004-2005.
K. Fujimura, H. Kuno, M. Terada, K. Matsuyama, Y. Mizuno and J. Sekine, Digital ticket controlled digital ticket circulation. USENIX, 1999.
"US Navy: Miitary exchanges now offer best-price guarantees". M2 Presswire. Coventry: Jun. 4, 1998. p. 1 [recovered from Proquest May 17, 2006].
U.S. Office Action mailed Feb. 9, 2005, from related U.S. Appl. No. 10/232,861.
U.S. Office Action mailed Jul. 27, 2005, from related U.S. Appl. No. 10/232,861.
U.S. Office Action mailed Dec. 2, 2005, from related U.S. Appl. No. 10/232,861.
U.S. Office Action mailed Nov. 30, 2006, from related U.S. Appl. No. 10/232,861.
U.S. Office Action mailed Jun. 21, 2006, from related U.S. Appl. No. 10/232,861.
Final Office Action mailed Jun. 14, 2007, from related U.S. Appl. No. 10/232,861.
U.S. Office Action mailed May 22, 2006, from related U.S. Appl. No. 10/414,817.
U.S. Office Action mailed Nov. 28, 2006, from related U.S. Appl. No. 10/414,817.
U.S. Office Action mailed Apr. 30, 2007, from related U.S. Appl. No. 10/414,817.
U.S. Office Action mailed Oct. 3, 2007, from related U.S. Appl. No. 10/414,817.
U.S. Office Action mailed Dec. 22, 2005, from related U.S. Appl. No. 10/414,830.
U.S. Office Action mailed Feb. 7, 2007, from related U.S. Appl. No. 10/414,830.
http://legalminds.lp.findlaw.com/list/cyberia-1/msg31650.html), Robert A. Hettinga, May 29, 2001.
http://www.nettime.org/Lists-Archives/nettime-1-0009/msg00214.html, Dr. Richard W. Rahn, Sep. 19, 2000.
U.S. Office Action for U.S. Appl. No. 10/232,861 mailed Jan. 10, 2008.
U.S. Office Action for U.S. Appl. No. 10/439,629 mailed Jan. 14, 2008.
U.S. Office Action for U.S. Appl. No. 11/118,608 mailed Sep. 26, 2007.
Menezes et al., "Handbook of Applied Cryptography", 1997 CRC Press LLC, Section 1.7.
Office Action dated Oct. 3, 2008 from U.S. Appl. No. 11/094,784.
Office Action dated Feb. 25, 2008 from U.S. Appl. No. 10/873,840.
Office Action dated May 15, 2008 from U.S. Appl. No. 10/232,861.
Office Action dated Jun. 11, 2008 from U.S. Appl. No. 10/414,817.
Office Action dated May 14, 2008 from U.S. Appl. No. 11/118,608.
International Search Report & Written Opinion dated Dec. 7, 2007 from International Application No. PCT/US07/10708.
International Search Report & Written Opinion dated Feb. 20, 2008 from International Application No. PCT/US06/48776.
International Search Report dated Nov. 25, 2003 from International Application No. PCT/US03/15614.
International Search Report and Written Opinion dated Sep. 16, 2008 from International Application No. PCT/US07/10560.
Office Action dated Nov. 10, 2008 from U.S. Appl. No. 11/118,608.
Office Action dated Oct. 23, 2008 from U.S. Appl. No. 10/439,629.
Office Action dated Mar. 27, 2009 from U.S. Appl. No. 11/096,284.
Final Office Action dated Dec. 3, 2008 from U.S. Appl. No. 10/8973,840.
JP Office Action dated Mar. 24, 2009 from JP Application No. 2004-505848.
Final Office Action dated Dec. 5, 2008 from U.S. Appl. No. 10/232,861.
Office Action dated Dec. 24, 2008 from U.S. Appl. No. 10/414,817.
Office Action dated Jan. 28, 2009 from U.S. Appl. No. 10/439,629.
Final Office Action dated Apr. 16, 2009 from U.S. Appl. No. 11/118,608.
Office Action dated Mar. 16, 2009 from U.S. Appl. No. 11/146,399.
International Search Report and Written Opinion dated Feb. 16, 2006 from PCT Application No. PCT/US2005/021057.
Notification Concerning Transmittal of International Preliminary Report on Patentability dated Jan. 11, 2007 from PCT Application No. PCT/US2005/021057.
European Office Action dated Oct. 27, 2008 from EP Application No. 03726905.7.
Chinese Office Action dated Dec. 26, 2008 from CN Application No. 03816746.8.
Notification Concerning Transmittal of International Preliminary Report on Patentability dated Nov. 13, 2008 from PCT Application No. PCT/US2007/010708.
Notification Concerning Transmittal of International Preliminary Report on Patentability dated Jul. 10, 2008 from PCT Application No. PCT/US2006/048776.

N. Szabo, "Contracts with Bearer" http://szabo.best.vwh.net/bearer_contracts.html, 12 pages (1997).
Office Action dated Sep. 15, 2009 from U.S. Appl. No. 10/873,841.
Office Action dated May 28, 2009 from U.S. Appl. No. 10/873,840.
Office Action dated Jun. 24, 2009 from U.S. Appl. No. 10/232,861.
Office Action dated Aug. 24, 2009 from U.S. Appl. No. 11/155,010.
Final Office Action dated Jun. 12, 2006 from U.S. Appl. No. 10/414,817.

* cited by examiner

Figure 13E:
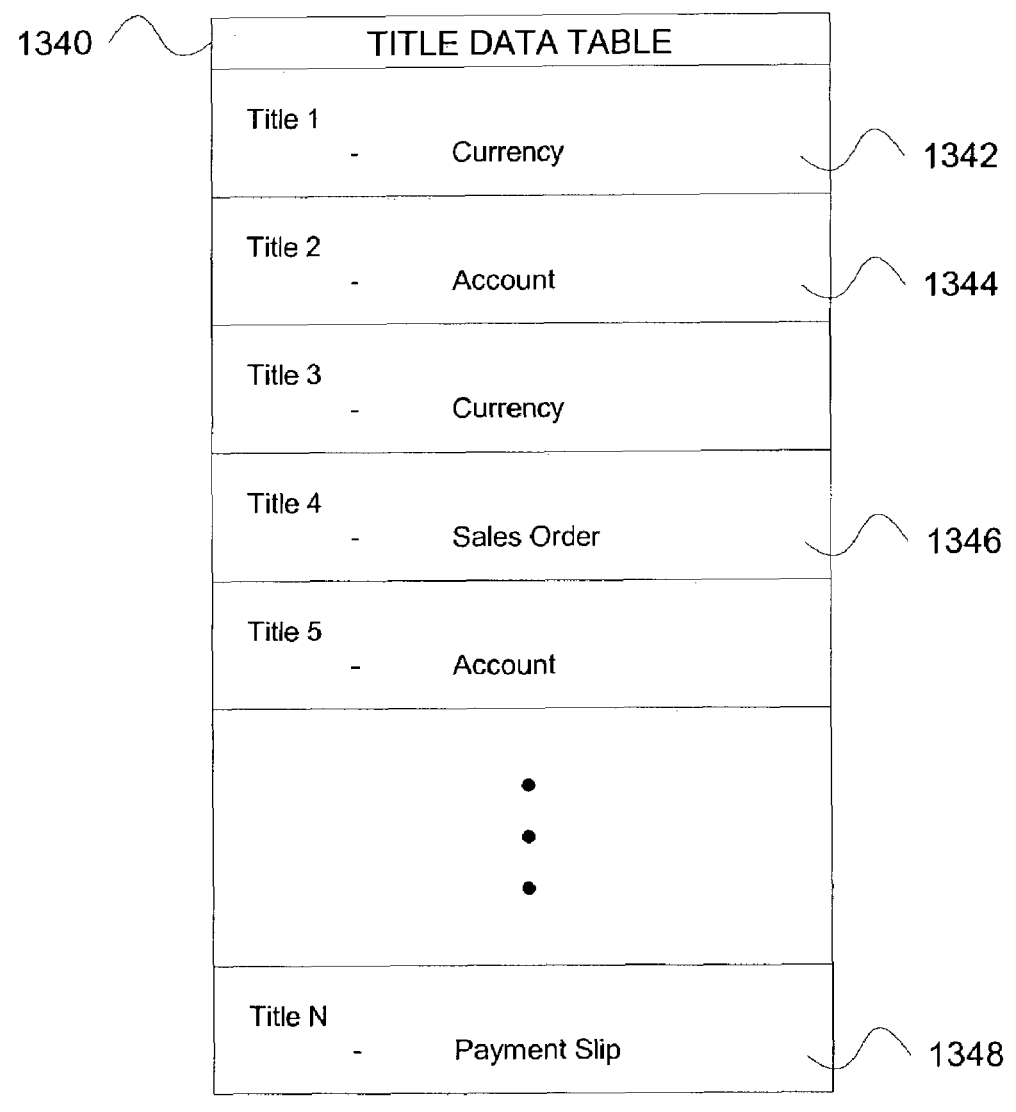

| 1340 | TITLE DATA TABLE | |
|---|---|---|
| | Title 1 - Currency | 1342 |
| | Title 2 - Account | 1344 |
| | Title 3 - Currency | |
| | Title 4 - Sales Order | 1346 |
| | Title 5 - Account | |
| | ⋮ | |
| | Title N - Payment Slip | 1348 |

| CONTACT TITLE TABLE |
|---|
| Contact Title 1<br>- Tag |
| Contact Title 2<br>- Tag |
| Contact Title 3<br>- Ticket |
| •<br>•<br>• |
| Contact Title N<br>- Tag |

METHODS AND APPARATUS FOR TITLE STRUCTURE AND MANAGEMENT

REFERENCE TO RELATED APPLICATIONS

This application is a continuation-in-part of U.S. Ser. No. 10/232,861 filed on Aug. 30, 2002.

This application claims priority to U.S. Prov. No. 60/380,787 filed May 15, 2002, U.S. Prov. No. 60/407,466 filed Aug. 30, 2002, and U.S. Prov. No. 60/407,382 filed Aug. 30, 2002.

TECHNICAL FIELD

The invention relates to an advanced title and transaction network. In particular, the invention provides an architecture and operation for the facilitation of the creation, ownership, exchange, management, reselling, marketing, bartering, and auctioning of titles over an electronic network such as the Internet.

BACKGROUND OF THE INVENTION

The Internet has become an efficient mechanism for globally distributing digital content, such as documents, pictures, music, and other types of digital content. Information can now be transmitted directly and instantly across the Internet from the content owner to the content buyer, without having to first convert it into physical form, such as paper documents, compact disks, photographs, etc.

However, the advantage of easy digital communication has also allowed digital content to be easily pirated by just about anyone with a computer and Internet access. The combination of high-speed broadband Internet access, digital content compression software (which reduces the size of digital content files), peer-to-peer file trading networks (which allows users to post content files), and lack of a viable digital rights standard, has caused the content owners to lose control of their content. Consequently, content owners are experiencing a loss of potential revenue.

The lack of a standardized and transparent digital rights management system, however, is preventing a commercially viable solution from emerging. In order for such a system to be commercially viable, the system should be secure both from the user's and the content owner's standpoint, universal so that electronic device manufactures are encouraged to engineer it into their products, and transparent so that users are not required to change their behavior.

Existing systems that attempt to provide confidence between buyers include escrow agreements, third party confirmations, third party appraisals and other similar techniques. These systems are slow and complex, and they do not provide the content user with sufficient confidence that the buyers and sellers are not illegally replicating the content or otherwise attempting to sell pirated copies of works.

In addition to the pirating aspects associated with sharing digital content, users are burdened with less than ideal methods for legally sharing digital content. These cumbersome methods include transferring entire files to other users via electronic mail, instant messenger, peer-to-peer and other applications, or sharing hyperlinks via electronic mail, instant messenger, and other applications. These methods can be viewed as counter productive, anti-social and even bothersome to the users that receive or attempt to share the content. Sharing of entire digital content such as music via electronic mail is a drain on resources and inefficient to the electronic mail servers, the network, and the receiving users. Sharing of hyperlinks can lead to broken links, complex URL (Universal Resource Locator) strings, and restrictions on the type of content that can be shared (i.e. linked to). Compatibility problems are widespread and create frustration when sharing digital content of a specific media type.

What is needed are advanced techniques for controlling the trading of digital rights so that the buyers are assured of an authentic copy, "fair use" is preserved for the copy, and content owners are fairly compensated. In addition, advanced techniques are employed to provide an easy, friendly, efficient, and adaptable method for users to share digital content.

SUMMARY OF THE INVENTION

The invention relates, in one embodiment, to a title management apparatus resident on a first computer including a memory for storing a control program and data, and a processor for executing the control program and for managing the data. The apparatus includes user data resident in the memory including a set of user security indicia. The apparatus also includes a first title object resident in the memory including a title structure, the title structure further comprising a content element, a set of attributes, and a set of title object security indicia. The apparatus further includes a set of stub objects coupled to the title object, wherein the set of stub objects can further optimize the title structure; an authorization structure configured to selectively redeem the content element based at least in part of the user security indicia; and, a title management structure configured to associate a user with the first title object based at least in part of the user data and the title attributes.

The invention relates, in another embodiment, to a method of managing title objects in a first computer having a memory. The method includes configuring user data resident in the memory including a set of user security indicia. The method also includes configuring a first title object resident in the memory including a title structure, the title structure further comprising a content element, a set of attributes, and a set of title object security indicia. The method further includes coupling a set of stub objects to the title object, wherein the set of stub objects can further optimize the title structure; configuring an authorization structure configured to selectively redeem the content element based at least in part of the user security indicia; and, configuring a title management structure configured to associate a user with the first title object based at least in part of the user data and the title attributes.

Advantages of the invention include the ability to easily and efficiently manage and share titles over a network such as the Internet.

BRIEF DESCRIPTION OF THE DRAWINGS

The invention is described with reference to the figures, in which:

FIGS. 9A-B depict exemplary title creation displays according to an embodiment of the invention;

FIGS. 10A-B depict exemplary administrative user control displays according to an embodiment of the invention;

FIGS. 13A-E depict exemplary title data according to an embodiment of the invention;

FIGS. 24A-D depicts exemplary title data according to an embodiment of the invention;

FIGS. 36-37A depict simplified diagrams of title object lifecycle management steps, according to an embodiment of the invention.

DETAILED DESCRIPTION OF THE PREFERRED EMBODIMENT(S)

Figure 1A:
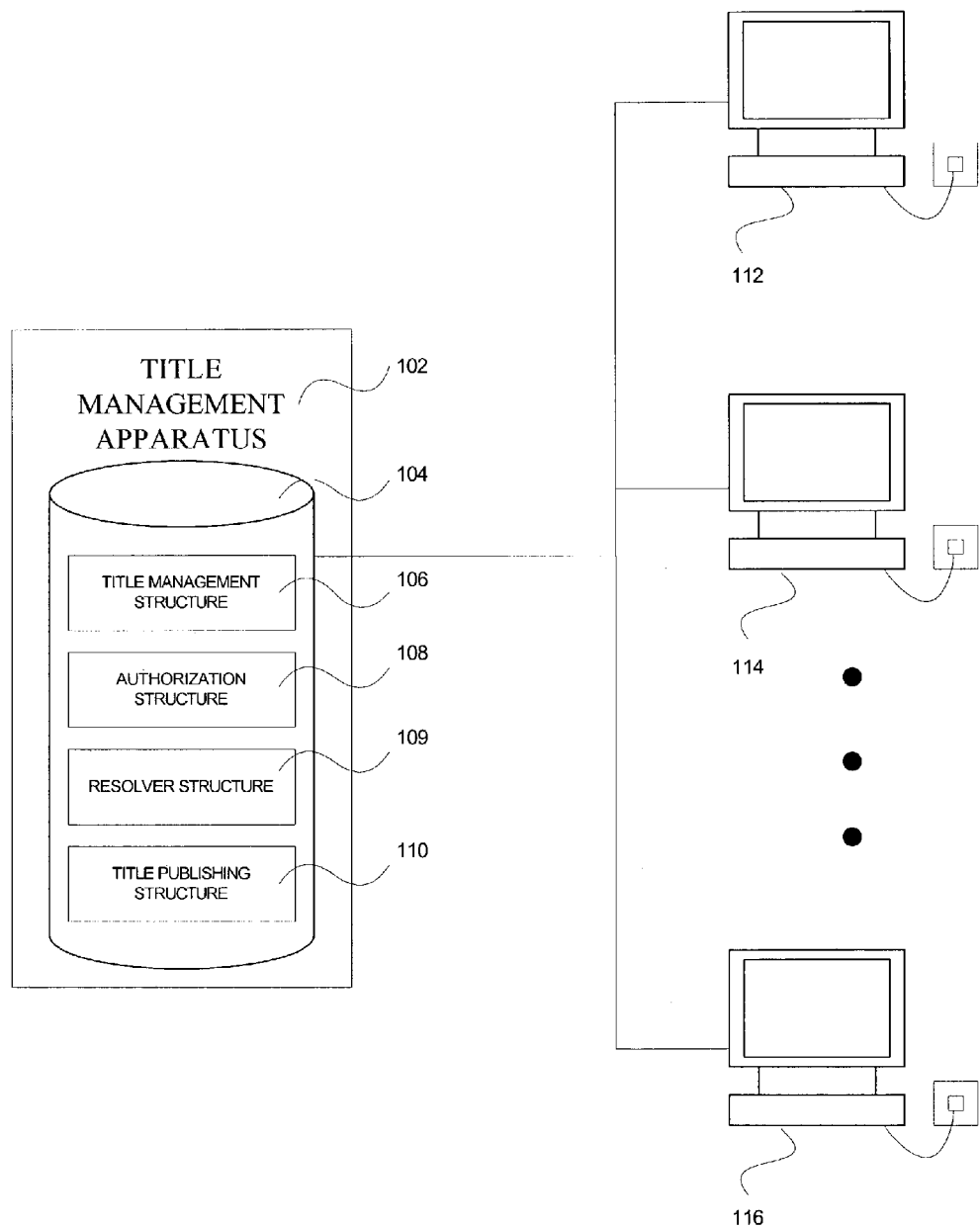
FIGS. 1A-3 depict a computer network and a title management apparatus according to an embodiment of the invention.

The invention is directed to the creation, ownership, exchange, management, reselling, marketing, bartering, and auctioning of titles.

In this context, a title is an object that may have a number of elements and attributes including embedded digital content, ownership attributes, copy permissions, and others as described herein. A title can also represent the rights to a single piece of digital content or a single resource, or it can represent the rights to a multitude of digital content and resources and in a variety of formats. The digital content rights, such as the ability to exchange or copy, are determined by the content publisher. Furthermore, a title can also represent the rights to another title or multitude of titles, which in turn express rights to digital content or resources.

Users can initiate a variety of exchanges with each other depending on the type of title and the rules associated with that title. These exchanges can take the form of trades or transfers. In the case of trades, offers can be reviewed, and then subsequently accepted, canceled, or a counter-offer can be presented. The counter-offer process can continue until satisfaction, or until trade is canceled.

In order to help protect the integrity of the trade, a chained hash cryptographic technique is used to guarantee that only a single instance of the title is in circulation at any one point in time. The title management and publisher structure may perform verification on the chained hash to ensure its integrity. The chained hash technique may be implemented in such a way as to provide benefits typically associated with one-time password and digital cash systems. However this implementation may be modified to provide a high degree of integrity around the use of titles within the ecosystem.

The chained hash technique can be combined with additional controls that work in conjunction with the security classification element to provide varying degrees of security for the title and the digital content referred to by the title. These additional controls may include cryptographic key-splitting techniques as well as multi-user and multi-factor authentication. Security class is an element that resides in the title to convey the level of security appropriate for this title. Security class is set by the publisher based on the publisher's requirements and rules. Security class can be used within the ecosystem to determine appropriate handling of the title. For example, a title with a high-security rating of 5 can force strong authentication of the user as well as strong encryption of the digital content associated with the title. As an example, a multi-user authentication requirement can be used for parental controls, whereby a guardian must also provide authentication (and acceptance) on the purchase and use of a title where a minor is involved.

The content rating system can be used by publishers to determine appropriate ratings for their content, and these ratings can be enforced by title management and resolver apparatus to ensure guardian approval. Content rating is an element within the content element to convey a rating regarding the suitability of the content. The rating system is dependent on the type of content and the regulatory factors involved (e.g. music, video, movie, etc.).

The exchange structure, specification, and rules provide the ability for the title publisher and/or the title owner to determine the exchange capabilities of subsequent owners of the title. For example, a title publisher could limit a title owner to only one trade, or even to deny trades but allow transfers. A title owner may transfer the title to another person for a limited period of time and deny that person any ability to trade or transfer. This ability to set limitations may operate in conjunction with the rules structure.

A trust structure is also implemented to provide users with a simple ability to validate the digital content they receive. The trust structure may convey that the digital content was (if applicable) rightfully issued by the content publisher. Content publishers are not bound to use the trust structure for the titles they issue but in doing so can provide assurances to the buyer.

The invention is described with reference to specific apparatus and embodiments. Those skilled in the art may recognize that the description is for illustration and to provide the best mode of practicing the invention. For example, references are made to computer servers and clients, but in a peer-to-peer network, any computer is capable of acting in either role. Likewise, reference is made to Internet protocol while any substantially comparable data transmission protocol can be used.

A. ARCHITECTURE

FIGS. 1-4 depict a computer network and a title management apparatus according to an embodiment of the invention. In one embodiment, FIG. 1A depicts a title management apparatus 102 resident on a computer 104, comprising a title management structure 106, an authorization structure 108, a resolver structure 109, a title publishing structure 110 and a number of client computers 112-116 all coupled over a network (e.g. Internet), where each of the computers 112-116 may be owned by users of the system.

The users log on to title management apparatus 102 over the network and are authorized to perform certain functions and access certain data based on their ownerships and permissions, in order to manage, resell, market, barter or auction their respective titles. A digital content file stored within a content publishing structure 110 is redeemed through a pointer stored within is respective title. This pointer indicates the location of the digital content file. However, since this location could have changed since the title was created, a resolver structure 109 substitutes the updated digital content file address, if needed.

Redemption can occur in various ways. For example, the digital content file could be downloaded in its entirety, or it could be streamed to one of the client computers 112-116 and then viewed or listened locally. If the digital content file is already stored locally, redemption could allow access or playability. In the case of an online game or chat application, redemption of the digital content file could authorize participation.

Figure 1B:
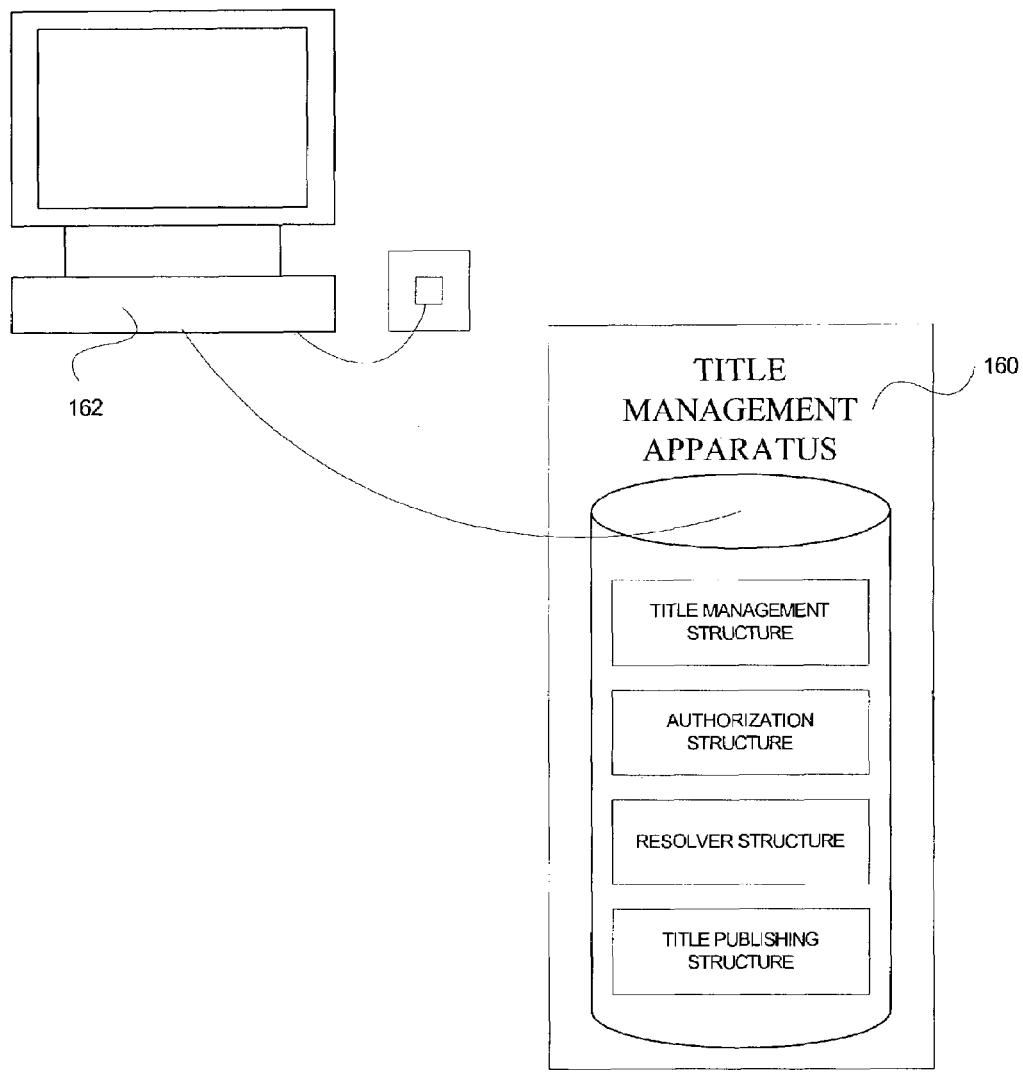

FIG. 1B depicts another embodiment in which the title management apparatus 160 is resident on a client computer 162. A user can log on to title management apparatus 160 directly without network access. As in FIG. 1A, the user is authorized to perform certain functions and access certain data based on their ownerships and permissions, in order to manage their respective titles. In this embodiment, redemption of a digital content file only occurs within the memory of client computer 162.

Figure 2A:
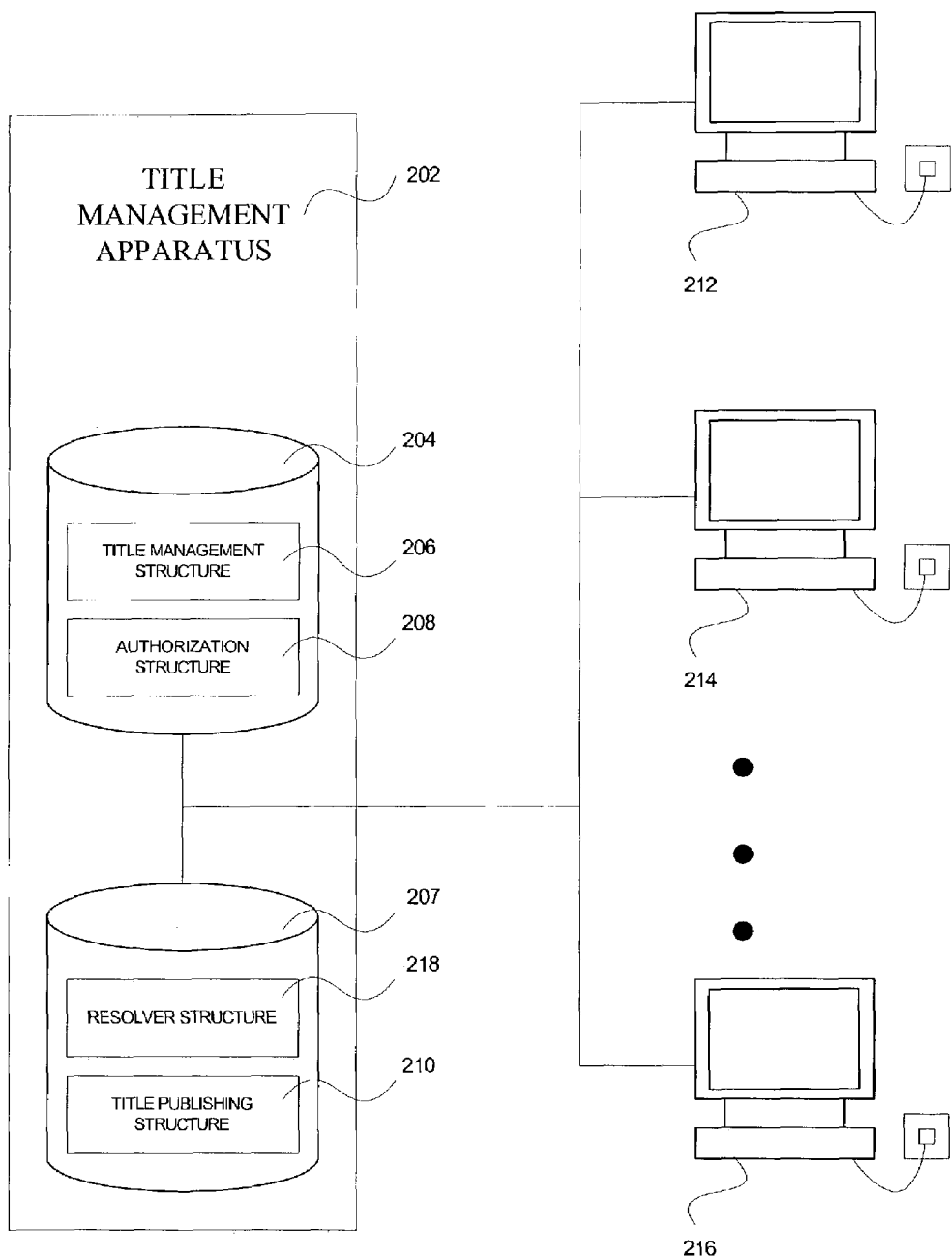

In another embodiment, FIG. 2A depicts a title management apparatus 202, wherein a title management structure 206 and an authorization structure 208 are resident on computer 204, while the content publishing structure 210 and a resolver structure 218 are resident on computer 207. Both computer 204 and computer 207 are coupled over a network to computers 212-216, which may be owned by users of the system. As in FIG. 1A, the users log on to title management apparatus 202 over the network and are authorized to perform certain functions and access certain data based on their ownerships and permissions, in order to manage, resell, market, barter or auction their respective titles.

Figure 2B:
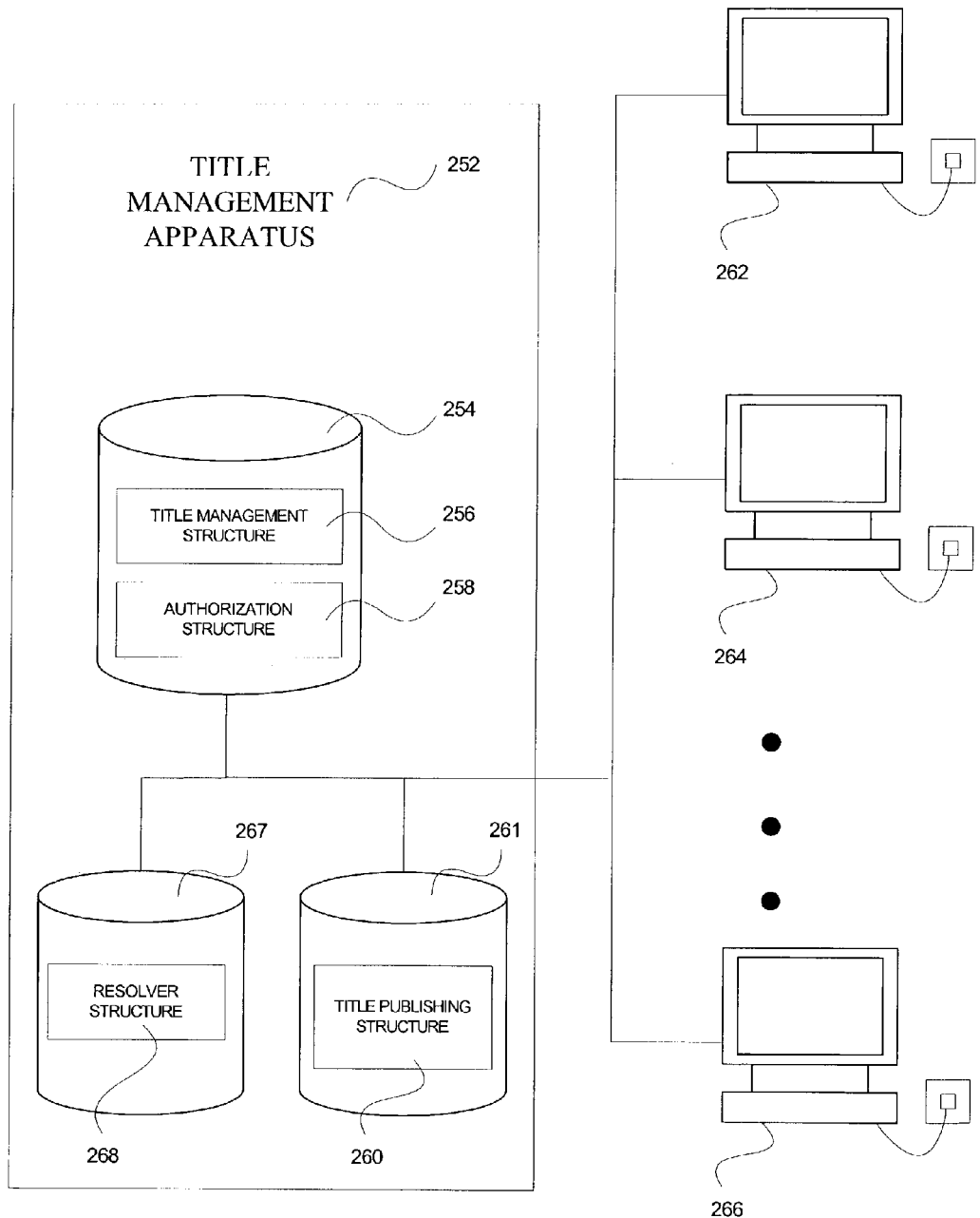

In another embodiment, FIG. 2B depicts a title management apparatus 252, wherein a title management structure 256 and an authorization structure 258 are resident on computer 254, while the resolver structure 268 is resident on computer 267, and the title publishing structure 260 is resident on computer 261. Computers 254, 267, 261 are coupled over a network to computers 212-216, which may be owned by users of the system. As in FIG. 1A, the users log on to title management apparatus 252 over the network and are authorized to perform certain functions and access certain data based on their ownerships and permissions, in order to manage, resell, market, barter or auction their respective titles.

Figure 3:
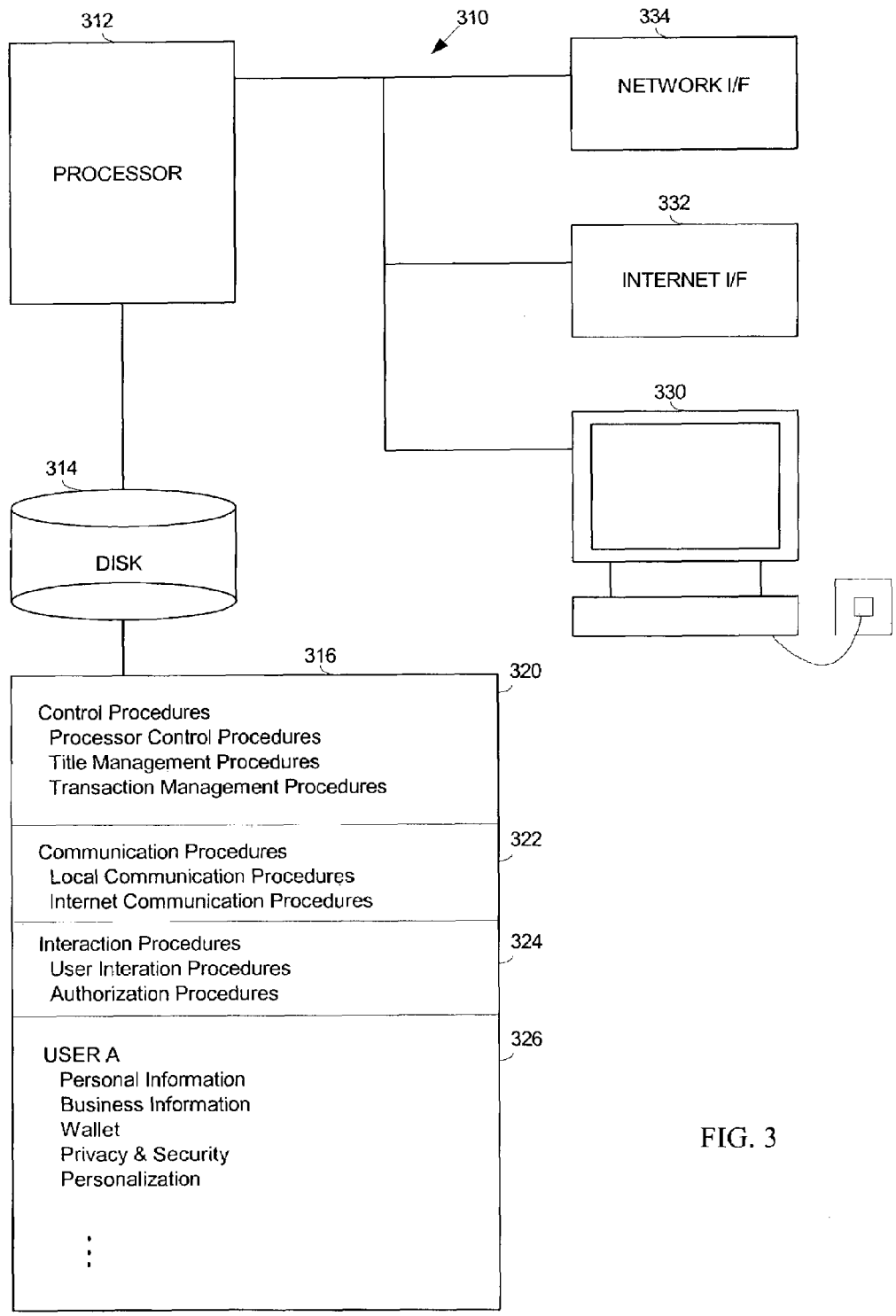

FIG. 3 depicts the computer 310 for performing the invention according to an embodiment of the invention. The computer includes a processor 312 coupled to a memory 314. The memory contains a data structure 316 further comprising a plurality of software structures including control procedures 320, communication procedures 322, interaction procedures 324 and data 326. The processor is further coupled to a user interface 330, an Internet communication interface 332 and a network interface 334.

Figure 4:
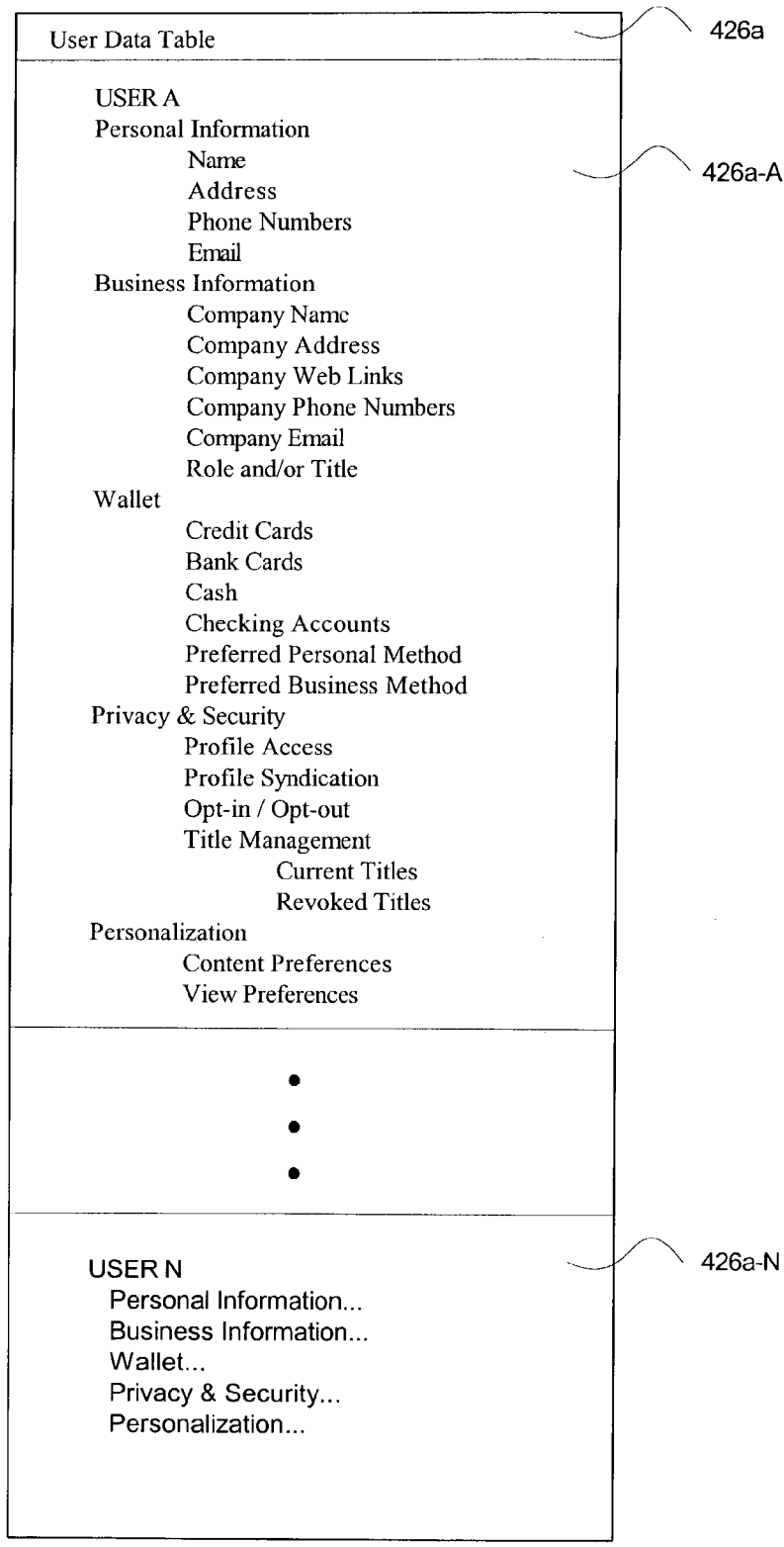
FIG. 4 depicts exemplary user data according to an embodiment of the invention.

FIG. 4 depicts exemplary user data 426a according to an embodiment of the invention. The user data has a number of elements for each user 426a-A to 426a-N, including personal information fields, business information fields, wallet fields, privacy and security fields, and personalization fields. The personalization fields can be set by the user for controlling the user environment, for example, the default color scheme for the graphical user interface, the type of interface skin, and the background image. Profile information maintained on the user can include, for example, the financial information, emergency contact, medical information, and work related information. The user data and profiler are extensible to support the needs of the title transaction system (and the ecosystem).

The title transaction system may provide the ability for users to manage their profile information and to generate titles for accessing profile information. For example, this functionality can be used by someone to easily create a business card title and distribute that title to their associates. The title in this case would be a tag that refers (that is, points) to their "business card" profile elements containing (as an example) their name, title, business address, and business contact information. In an other example, some else could create an emergency profile card and distribute it to specific people so that in an emergency they would have access to certain personal information such as name, medical insurance number, allergies, health risks, and emergency contacts. In this particular case, the title could be a ticket. The title transaction system provides for close integration of profile information to provide significant value add for the user as they participate in a community where communication, purchasing, trading, auctioning, and bartering are common place.

Figure 5:
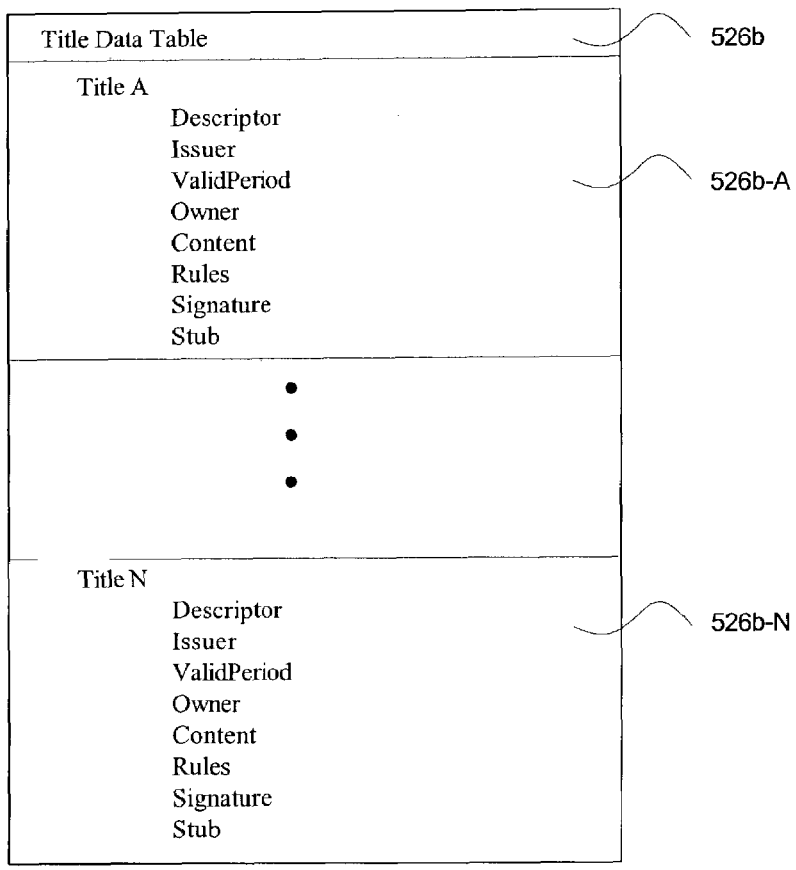
FIG. 5 depicts exemplary title data according to an embodiment of the invention.

FIG. 5 depicts exemplary title data 526b for a title object. The title data has a number of fields for each title including header fields, titleowner fields, content parts fields, titlerules fields, and tagged fields, for example, XMLDSIG fields. The title object can be a type such as a tag, token or ticket.

As depicted in FIG. 5, the title object has at least one stub object associated with it in order to verify the integrity and valid instance of the title. In addition to identifiers, the stub object may contain security indicia, such as the indicia required by the chained hash technique, in order to validate the single instance and valid ownership of the title. This stub object may change state on every redemption, exchange, and revocation of the title.

The title object may have more than one stub object associated with it in order to convey additional information, controls, content, or other value-add not explicitly given in the original title. The stub object provides extensibility to the title without requiring a complete replacement to the title object. As an example, a value-add reseller such as a retail merchant may attach additional content or value to the original title in order to promote their product or even to make the original title more attractive for sale or trade. In another example, an additional control stub maybe attached to the original title in order to ensure appropriate handling of the title for use by minors, such as ensuring that only an edited version of the content is viewed. The use of the stub object is flexible to ensure extensibility of the title object.

As depicted in FIG. 5, the stub object can contain a digital signature element in order to verify the integrity of the stub. Although the stub is viewed as an extension to the title, the stub can be digitally signed by any participant in the ecosystem. This permits a flexible architecture where multiple participants can collaborate on adding value to a title object.

The system employs a set of specification and rules for structuring, creating, managing, handling and using titles. The specification and rules, as well as the format of the title, are extensible to support the needs of both the user and content publisher, as well as the needs of intermediary systems within the ecosystem that handle (or interact) with titles.

In the exemplary embodiment, a tag is a title object that can be copied among users, a token is a title object that cannot be copied like a tag, but can be transferred or exchanged between users, and a ticket is a title object that is issued to a specific user, and hence cannot be copied or transferred among users.

B. LOGICAL STRUCTURE AND OPERATION

Figure 6:
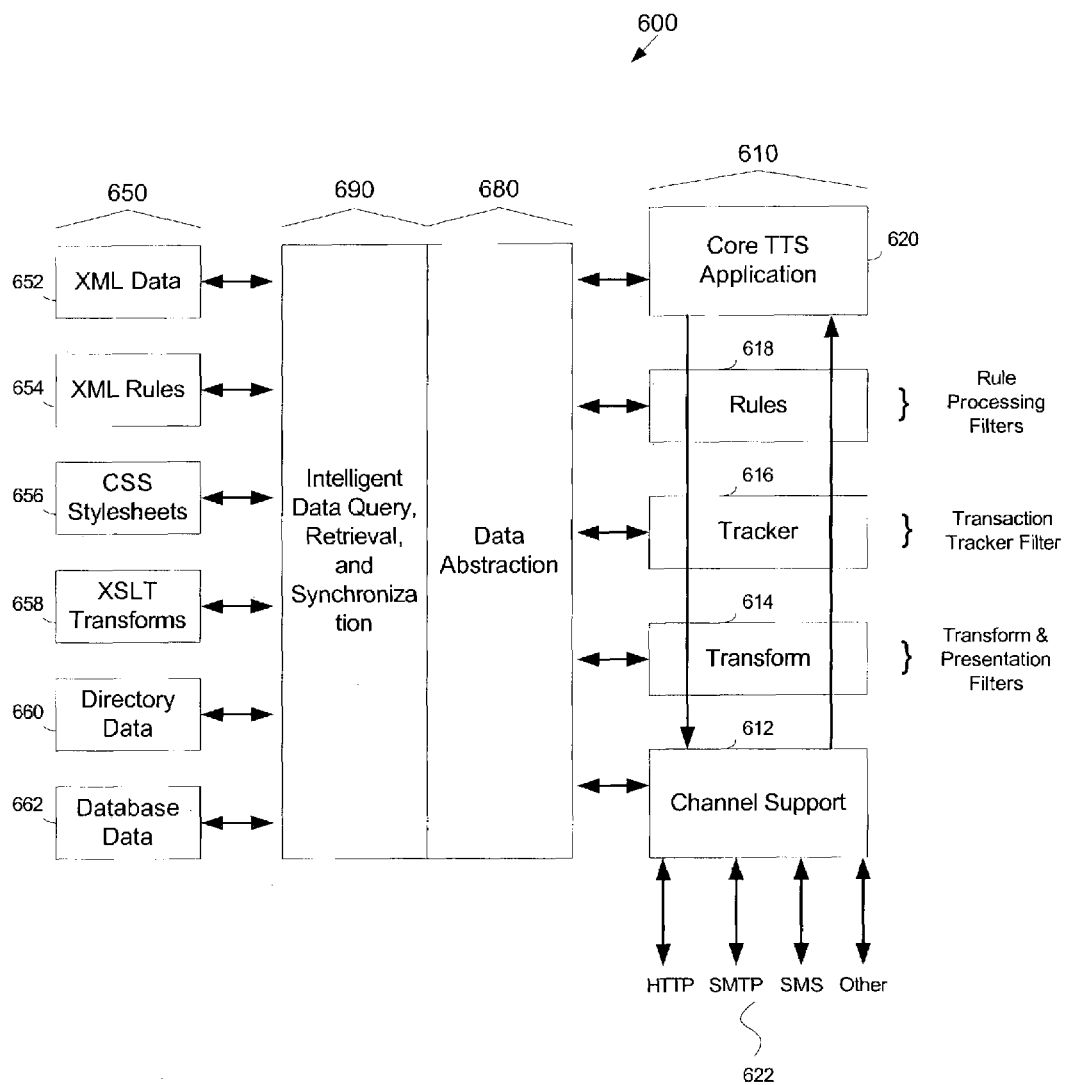
FIG. 6 depicts a logical structure of the invention according to an embodiment of the invention.

FIG. 6 depicts a logical structure 600 of the invention according to an embodiment of the invention. The primary parts of the logical structure are the processing portion 610, the data portion 650 and the data abstraction portion 680. As shown, the processing portion 610 communicates with the data portion 650 through the data abstraction portion 680. FIG. 6 represents the primary model for implementation and deployment of the title transaction system, however the design is intended to be modular in that components can be eliminated or modified as required by the environment and requirements. The implementation of the title transaction system can take many shapes and forms. For example, this model maybe modified to permit operation of certain TTS components within a limited resource computing device such as a mobile phone. In another example, a fixed implementation may eliminate certain abstractions when knowingly operating in a static environment with a limited set of titles. In another embodiment, the TTS comprises sub-systems within other applications to support titles and transactions (i.e., media players such as Microsoft Media Player and Winamp, Microsoft Outlook, etc.)

A channel support structure 612 is responsible for communicating with users and is associated with the communication procedures 622. The channel support 612 communicates over the network using a number of possible protocols including HTTP (hyper-text transfer protocol), SMTP (simple mail transfer protocol), SMS (short messaging service) and others.

The title protocol may define a standard set of protocol bindings to describe how title transactions are communicated across those protocols. However the title protocol specification may define extensions so that the title protocol can be bound to other underlying protocols as required within the ecosystem. When an inbound message is received by the channel support 612, the message is passed along to a number of other structures that decode, transform and interact with the message. For example a transform structure 614 performs a transform on the inbound data request to conform it to a normalized application interface for a core title transaction application. The use of the transform layer at this point provides standardized parsing of the transaction as it proceeds through the pipeline to the core title transaction application. A tracker 616 acts as a transaction filter to maintain a log of all the inbound messages and requests. A rule structure 618 then applies a number of possible rules to the message. The rule structure obtains its rule sets from several sources including the title itself (as defined in the title format), data storage through the data abstraction portion, and extensions that can support the retrieval of rules through other sources such as via the network. The rules include characteristics for each title, for example, whether it can be refunded, exchanged, played viewed, etc. Often, the functions that can be performed on a given title are related to the title type. For example, in the exemplary embodiment, titles of type tag can be freely distributed to all users, titles of type ticket are tied to a specific user and cannot be exchanged, and titles of type token can be exchanged with other users. When a title of type token is exchanged with another user, the user can no longer redeem that title, and the system may disable any offline content associated with the title.

For instance, the content element within a title can contain an encrypted password that is not known to the user. A program for viewing or playing the offline content, such as Windows Media Player, would read the title through an application program interface, check the rule sets, and then execute content, such as an MP3 file, using the encrypted password. Once a user exchanges the title with another user, the rule sets would be modified to reflect that that the user no longer has rights to the content, and the content itself could not be played or viewed.

The rules associated to the title are developed and applied by the content publisher and by the user (or someone acting on behalf of the user). The title management and title publisher modules may provide an application and interface to easily develop and apply rules to the titles. For example, a content publisher may apply usage rules applicable to the title and the digital content and/or resource it provides evidence of rights to. In turn, a user may apply default rules within the title management module to assist in controlling and protecting their actions related to certain titles (for example, to prevent from accidentally trading a valuable title). In another example, a parent may establish restrictions on the type of content their child may access and use in their title management module.

Specialized rules, called triggers, may also be used. Triggers are rules that invoke actions that are external to the title management apparatus. For instance, a parent can be notified by email that a child wishes to redeem a digital content file for which there is some age restriction.

Specialized rules, called timers, may also be used. Timers are rules that invoke actions based on a specific time or based on a spent amount of time. For example a title may only be good for twenty four hours, or an exchange may only be valid for one week. Timers maybe combined with triggers in rule processing.

The core title transaction application 620 (core TTS) is the application that verifies the ownership of the titles by the users and that authenticates the titles and selectively permits the titles to be transferred if such rights are allowed. Among the modules that may be contained within the core TTS application are the following:

(a) A title manager module performs management functions on titles such as organizing, deleting, adding, transferring, trading, copying, backing up, viewing, and redeeming. In addition to basic title functionality, the title manager module can provide sophisticated and value-add features to allow the user a better online experience such as chat where real-time redemption and trading are available during the chat session. Furthermore, features such as sorting categorizing, searching and notify can be made available to the user. As an example, a sophisticated search capability can be implemented whereby the user can search the network for other users, titles available for bid, transaction makers, or even a secure and trusted third party lockbox with which to conduct a trade. This sophisticated discovery process may be an integral part of the TTS ecosystem. The title manager module is the primary application component that the user may interact with on a regular basis. The title manager module maybe designed to be a single-user or multi-user application depending on the specific use of the module. A single-user version can be used in a peer-to-peer network, whereas a multi-user version can be deployed with consumer aggregators. The title manager implements a lockbox feature that is responsible for securely executing trades between two parties. The lockbox provides storage for titles being traded and provides a secure environment where users can verify trades, view samples, and accept a trade. Upon acceptance of the trade by all parties involved, the lockbox may execute the trade and provide each party with an updated title and stub object-pair that evidences their new rights. The lockbox feature of the title manager can be implemented as a standalone service so that a trusted third party can provide secure execution of trades.

(b) A transaction tracker module performs the basic task of tracking all inbound and outbound transactions whether successful or not. The tracker module is configurable by the user to determine the level of tracking to be performed based on the user's requirements. The tracker may be used to provide a record of all transactions performed by the user such as trades and transfers. The tracker may be used by all core TTS components for creating a record of all transactions (for example, those performed by the resolver and content publisher). The tracker may record transactions in a data repository using the data abstraction portion.

(c) A rules builder module performs the task of building rules to be associated with the titles and processing of the titles. The rules builder module may provide an easy to use interface for the user to create and build rules that can be embedded within a title or used during the processing of a title. Rules that are not embedded within a title may be stored in a data repository using the data abstraction portion. The rules builder may provide an extension capability to apply rules developed external to the rules builder ensuring the adaptability of title processing.

(d) A title resolver module that the important task of resolving all titles presented. This process involves all applicable tasks to the title presented including verifying integrity of the title, validating the title, ensuring ownership of the title, decoding and decrypting the necessary title elements and retrieving the content or resource requested. The title resolver may be responsible for executing and acting upon rules and triggers that are applicable to the title presented. An additional function of the resolver would be to refresh old titles. For example, if information contained within a title became outdated, this information could be automatically refreshed either by replacing the title completely or by adding a new stub object that updates the information. In addition, the title resolver may invoke additional processes as required such as the CODEC module.

(e) A state server module that maintains and verifies state associated with the use of titles throughout the ecosystem. The state server may work in conjunction with the title resolver in order to verify the validity of the title and generate new stub objects associated with the title on every redemption and exchange. The state server may be a high-capacity, high-availability, and high-performance system that can be widely distributed and chained in order to perform fast validation for titles in use. The state server may perform functions and algorithms associated with the chained hash, one-time password, and key-splitting techniques.

(f) A title publisher module performs the tasks associated with publishing (that is, creating new titles). The title publisher provides an easy to use interface for a user to identify, organize, and group new content (or resources), and then generate a new title or title template that points to that digital content or those resources. Titles can be generated on the fly and immediately by the title publisher which would then invoke the title manager to store the newly generated titles. Alternatively, the title publisher can generate new title templates that would describe the contents of the title but would not immediately generate a title. Title templates could be used in a variety of ways by the content publisher, for example by the content publisher's online shopping site to automatically generate titles when a buyer purchases new content. The content publisher stores work in progress (such as grouped publishing efforts) in a data repository using the data abstraction portion. Title publishers may provide sophisticated functionality to enhance the online experience for content publishers such as organizing content and title publishing into projects, sharing projects, and allowing community projects. Workgroup and workflow capabilities can be built into the title publisher as well as creating single-user and multi-user versions. As an example, a multi-user version can be implemented by a consumer aggregator or service provider in order to perform title publishing activities on behalf of a user community. Enhanced features may provide additional value to people using the title publisher such as verifying pointers to content files and resources, automatically obtaining icons, and even pushing titles and content out to servers.

(g) A rating system module performs rating tasks on transaction records to support billing requirements. The rating system may be flexible to support the variety of billing options required within the ecosystem. The rating system may act on transaction data but may maintain separation between the data sets to ensure integrity of the transaction log.

(h) A CODEC module performs coding and decoding functions on the content retrieved by the title resolver. The primary purpose of this module is to encapsulate content in a secure package as determined by the security required of the title and established by the rules. For example, this module can perform digital watermarking of music and image content, and it can also be used to encrypt the content in a traditional digital rights management package. Additionally, the CODEC can be used by the resolver to decode contents within the title before processing by the resolver. The CODEC may provide mechanisms to support these functions as required within the ecosystem.

(i) A billing interface module provides an interface to the billing system operated by the user or entity running any of the core TTS components or modules.

(j) A transaction viewer module provides an interface for the user to view transactions recorded by the transaction tracker.

(k) A content interface module performs the tasks associated with retrieving the content. This module may generally be invoked by the resolver. The content interface module may be extensible to support a variety of content and resource systems in use by content publishers.

(l) A synch & replication module performs synchronization and replication across components and modules within the TTS system. This is required for a number of functions including (but not limited to) synchronization and replication of transaction log entries, synchronization of titles across title management modules in a highly distributed environment, and replication of title databases to support redundancy and high-availability.

(m) A crypto interface module performs symmetric and asymmetric cryptographic functions as required within the TTS ecosystem.

(n) An authentication and authorization module performs the type authentication and authorization required by (and specified by) the title or other ecosystem configurations. Authentication may not be required in certain instances, or can be as simple as providing an identifier for "free" use. Strong authentication may be required for other instances and may be enforced by the ecosystem components. Strong authentication can take the form of two-factor such as Smartcard and PIN, or via mobile phone using a SIM card and a PIN, or via any other supported method such as a SecurID token card. In basic form, authentication may be a username and password. Authorization may provide fine-grained access control to core TTS applications as well as to use titles within the ecosystem. Authorization may be based on rules established within titles and configured as part of the implementation of core TTS applications.

(o) A payment interface module provides an interface to a payment system operated by a user or entity of the core TTS components and modules. This permits real-time and batch processing of payment requests as configured by the user or entity.

(p) A cache management module performs basic caching functions of the content or resources retrieved by the title system. This function may provide performance benefits using cached content versus retrieving new content on every request for the same content.

(q) A user registration module performs registration of new users into the core TTS components and modules. This may be used to establish new users in a single user environment such as peer-to-peer, as well as establish new users in a multi-user environment such as that hosted by a consumer aggregator. A consumer aggregator is an entity that provides services to a consumer base (i.e., ISP, mobile operator, etc.).

(r) A transaction maker module performs transaction maker functions such as operating an exchange for the sale of titles, perform licensing of content represented by the titles, maintaining a book of trades, closing and clearing trade transactions, and performing additional value add as determined by the market.

(s) An intelligent data retrieval and query module integrated with the data abstraction portion in order to perform intelligent searches and queries on a variety of data in a variety of disparate locations. The IDRQ module can combine, map, and match data before presenting it to requesting applications through the data abstraction portion. Persistence and caching can be developed into the IDRQ module to enhance performance on multiple and frequent queries/searches.

(t) A web crawler module performs searches on the web to catalog content and provide a mechanism to automatically generate titles that represent the content that has been discovered. The web crawler module can be used statically or dynamically executed based on configuration of the implementation and/or on inbound requests. The web crawler module could interface with the intelligent data retrieval and query system attached to the data abstraction layer for intelligent searches and retrieval of web content.

(u) A discovery mechanism that can be used by all appropriate modules for discovering TTS resources that may be available on the network. The discovery mechanism may allow TTS modules to participate in a peer-to-peer environment as well as collaborate on activities. The discovery process can ensure that trust third parties are available for conducting secure transactions and well as simplifying the user and content publisher experience for clearing titles through the ecosystem.

In the outbound stream from the core TTS, the rules structure 618 then performs certain functions on the outbound information according to rules stored in the data 650 and/or embedded in the title. The tracker 616 checks to ensure that the outbound information matches the inbound requests so that no inbound messages are dropped or ignored and that outbound message are responding to legitimate inbound messages. The tracker may log transactions in accordance with the configuration. The transform 614 converts the outbound information from a normalized format into a format that conforms to a user profile or preference, as well as based on incoming requests for particular transforms. For example, the data can be transformed into WML for display on a WAP enabled phone, or into HTML for display on a web browser. Certain transforms can be executed based on rules established within the system. The profile or preference data as well as the transform templates are retrieved from the data portion 650 in order to perform the transform. Finally, the channel support 612 communicates with the user of the network in a native protocol format.

Figure 7:
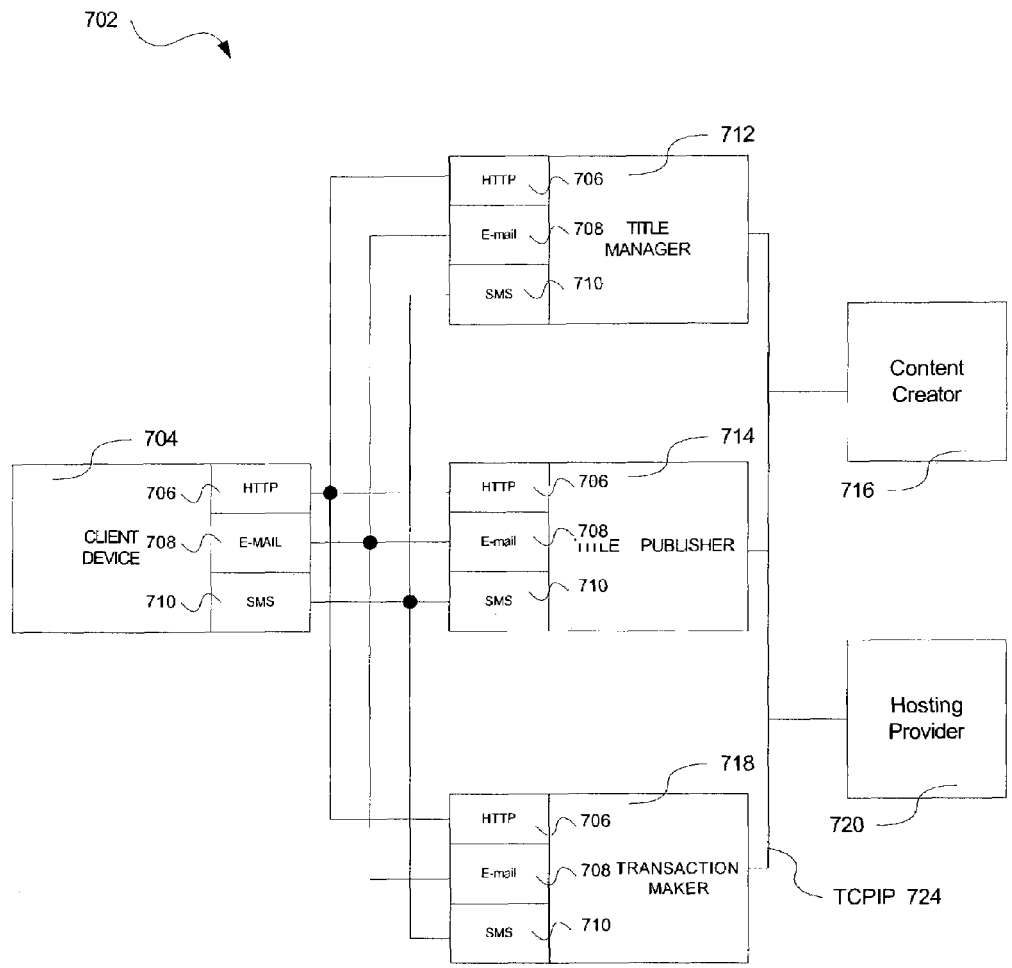
FIG. 7 depicts a logical structure of the invention as deployed in an ecosystem according to an embodiment of the invention.

In another embodiment, FIG. 7 depicts a logical structure of the invention as deployed in an ecosystem according to an embodiment of the invention. The ecosystem 702 is comprised of a number of entities, each providing a service of benefit to the overall system, and each connected to the other using some type of network protocol.

The title manager 712, content publisher 714, transaction maker 718, content creator 716, and hosting provider 720 are coupled to each other using a network protocol 724 such as TCPIP over the Internet. The client device 704 can be coupled to title manager 712, content publisher 714 and transaction maker 718 using any one of a number of network protocols. Among these are HTTP 706, E-Mail (SMTP) 708, and SMS 710.

Figure 8A:
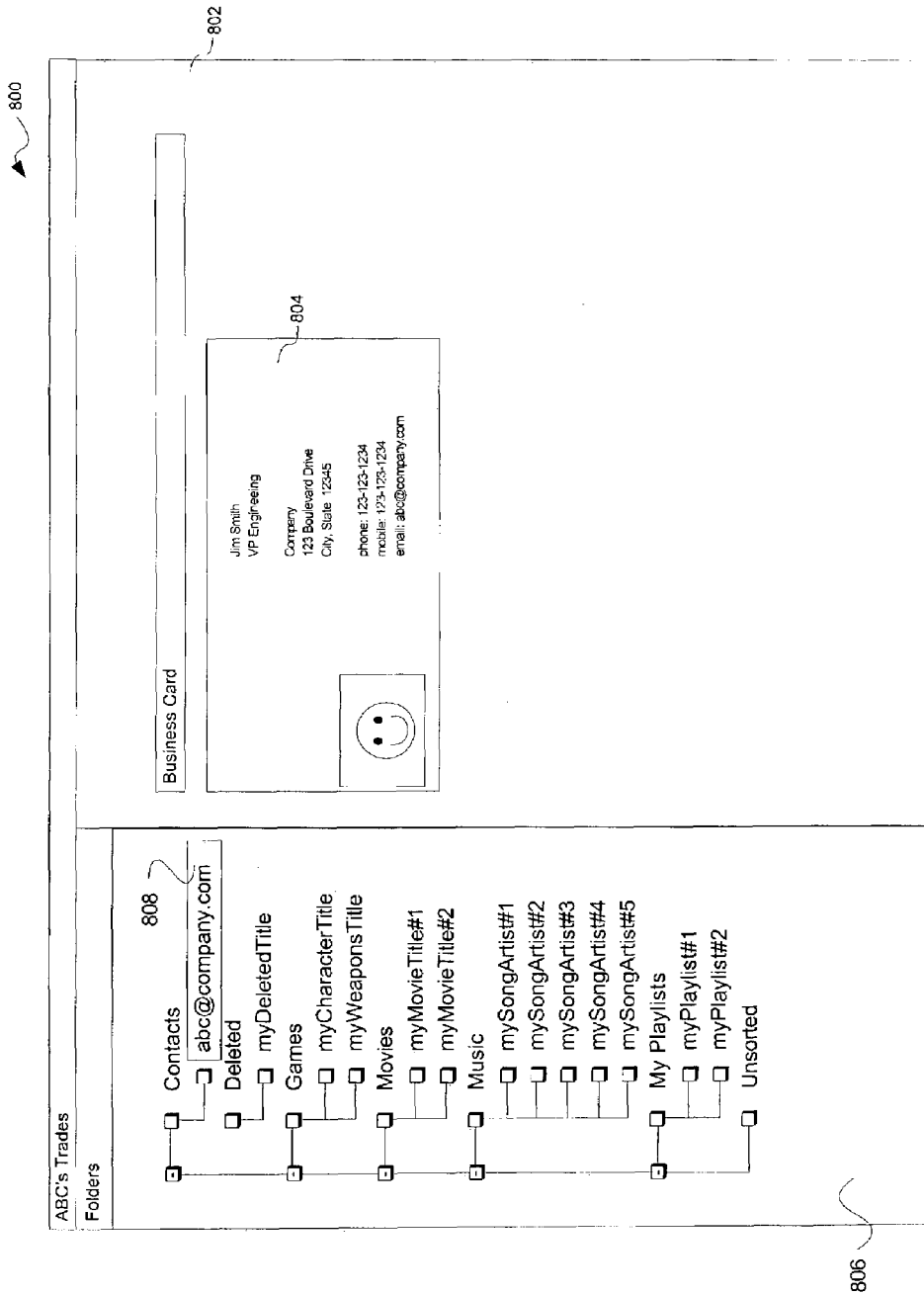
FIGS. 8A-E depict exemplary title management displays according to an embodiment of the invention.

Initially, the content creator 716 creates a digital content file, such as an MP3 song, as well as a title associated with the digital content file. The creating user interacts with a display as shown in FIG. 8A and described in detail below. The digital content file is transmitted across the network protocol 724 to hosting provider 720, where it is stored until a content publisher 714 desires to make it available to users with a client device 704. The content creator also transmits the title to the title manager 712 using network protocol 724.

Users desiring the digital content file may access the transaction maker 718 using the client device 704. Transaction maker 718 functions as a marketplace where digital content buyers and sellers can transact with each other in a secure environment. When a user agrees to buy the digital content file from a seller, in this case the content publisher 714, the transaction maker 718 communicates this to the title manager 712, which in turn, modifies the title of the digital content file with the new rights just purchased by the user. The user can now redeem the digital content file from the content publisher 714 and download it to the client device 704.

If the user desires to transfer the title to a new user, and the title's security indicia allows it, the user can become a digital content seller and post an offer to transfer the title on transaction maker 718. As before, when a new user agrees to buy the digital content file from the user, the transaction maker 718 communicates this to the title manager 712, which in turn, modifies the title of the digital content file with the new rights just purchased by the new user. The buyer can now redeem the digital content file from the content publisher 714 and download it to the client device 704. The seller can no longer access the digital content file on the content publisher 714.

FIG. 8A depicts an exemplary title management screen display 800 according to an embodiment of the invention. This display is used by a user to perform certain functions and access certain data based on their ownerships and permissions, in order to manage, resell, market, barter or auction their respective titles. The display is divided into two sections, a title folder pane 806 and a title content pane 802. The title folder pane 806 can further organize the titles into folders based on different attributes, such as the type of digital content, such as contacts, games, movies, music, playlists, and unsorted. Furthermore, deleted titles are placed a deleted folder. The title content pane 802 displays more detailed information about the digital content. In this example, the user selected title abc@company.com 808 in the title folder pane 806, and is displayed the corresponding business card 804 for a contact "Jim Smith."

Figure 8B:
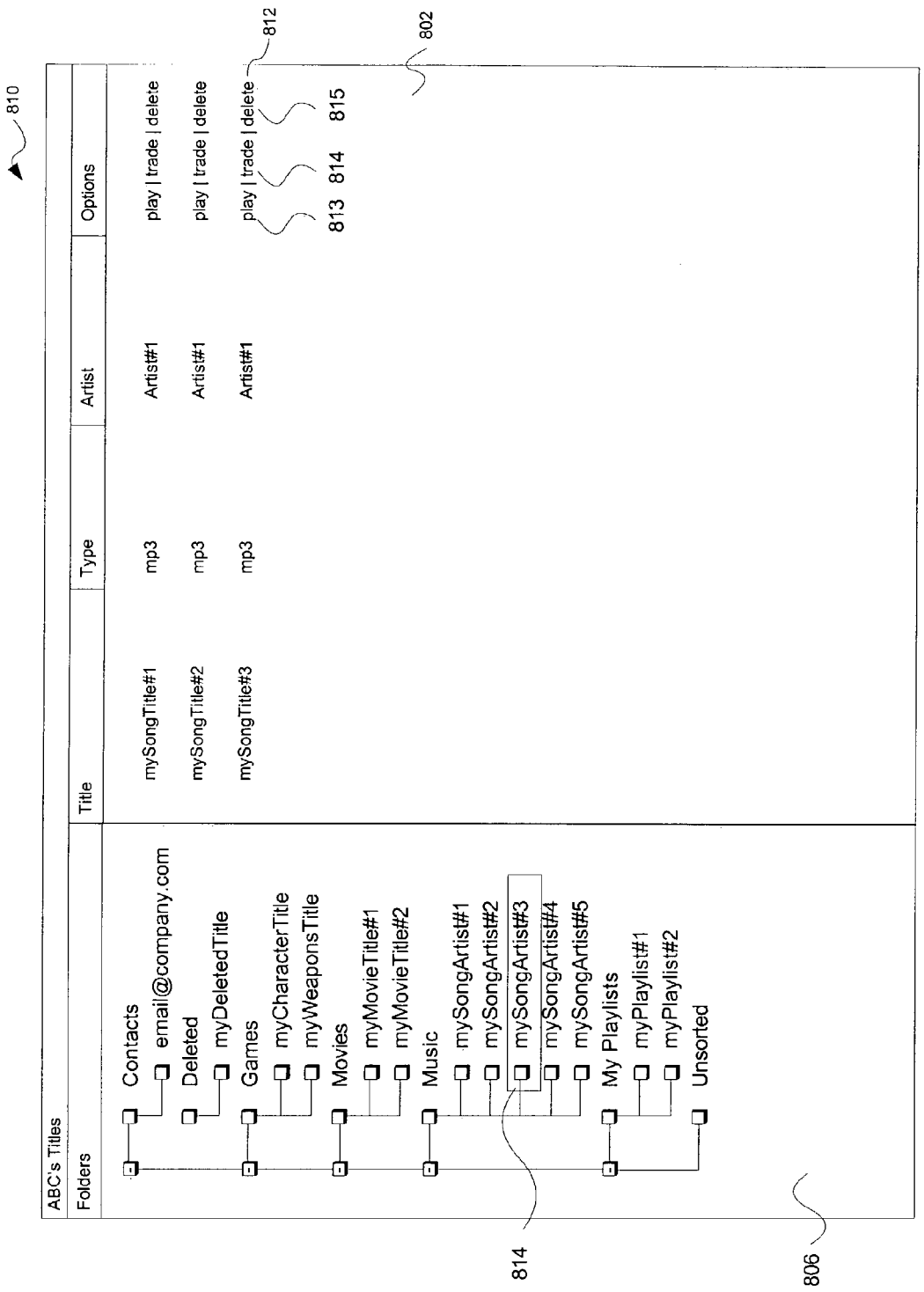

FIG. 8B depicts an exemplary title management screen display 810 according to another embodiment of the invention. As in FIG. 8A, the display is divided into two sections, a title folder pane 806 and a title content pane 802. Each title entry 812 in the title content pane 802 may have a play user selectable button 813, a trade user selectable button 814, and a delete user selectable button 815.

In this example, the user selected mySongArtist#3 814 in the title folder pane 806, and is displayed the owned titles to mySongArtist#3 songs 812. From this display, the user has the option to play 813 the song on the user's client computer, trade 814 the title to the song to another user, or delete 815 the title altogether.

Figure 8C:
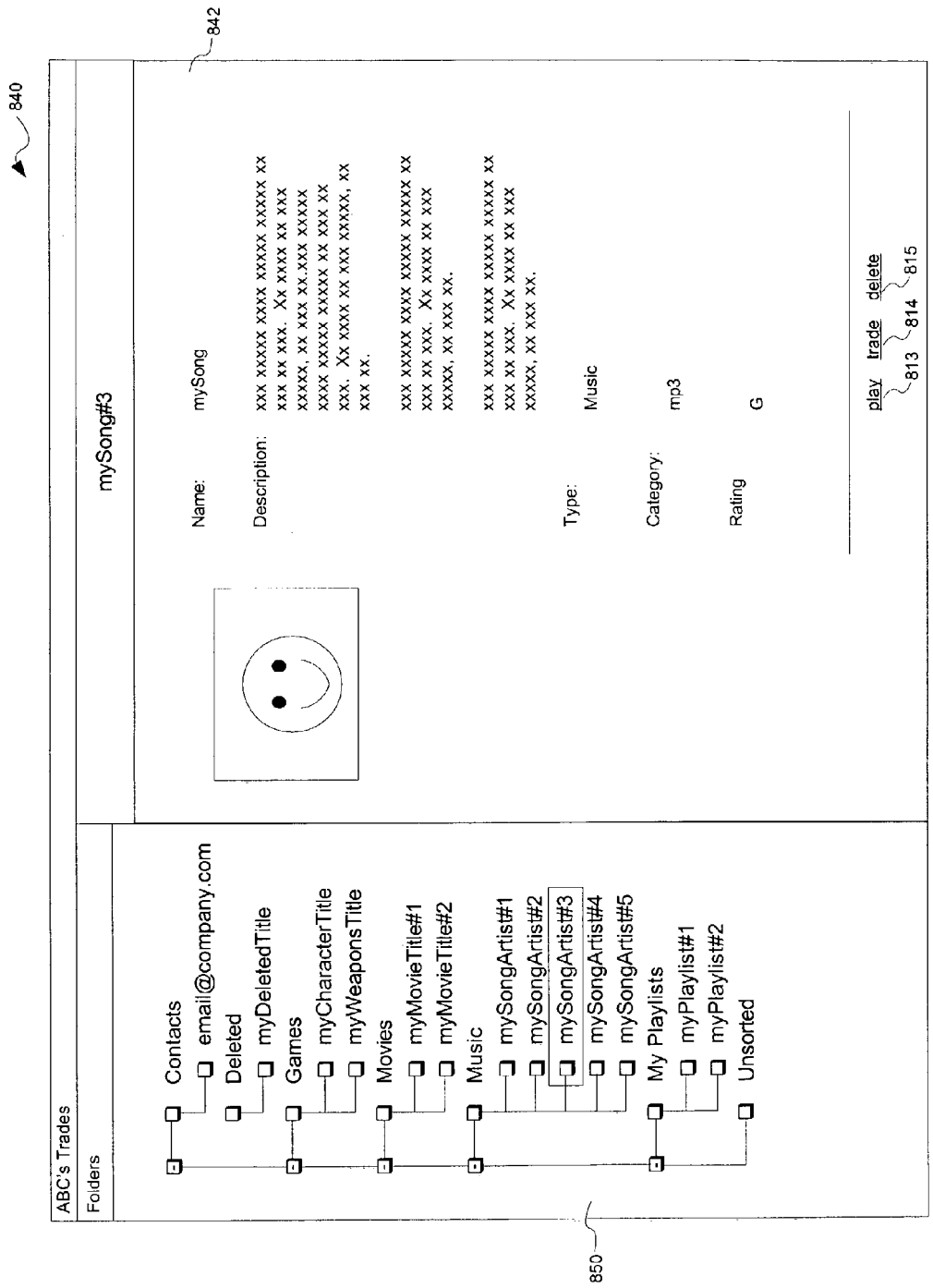

If the user selects one of mySongArtist#3 songs 812, a more detailed title content pane 842 appears, as shown in FIG. 8C. In this pane, a description of the song is displayed, along with the music type, category, and rating. A picture, such as an album cover, can be also displayed. As is FIG. 8B, the user has the option to play 813 the song on the user's client computer, trade 814 the title to the song to another user, or delete 815 the title altogether.

Figure 8D:
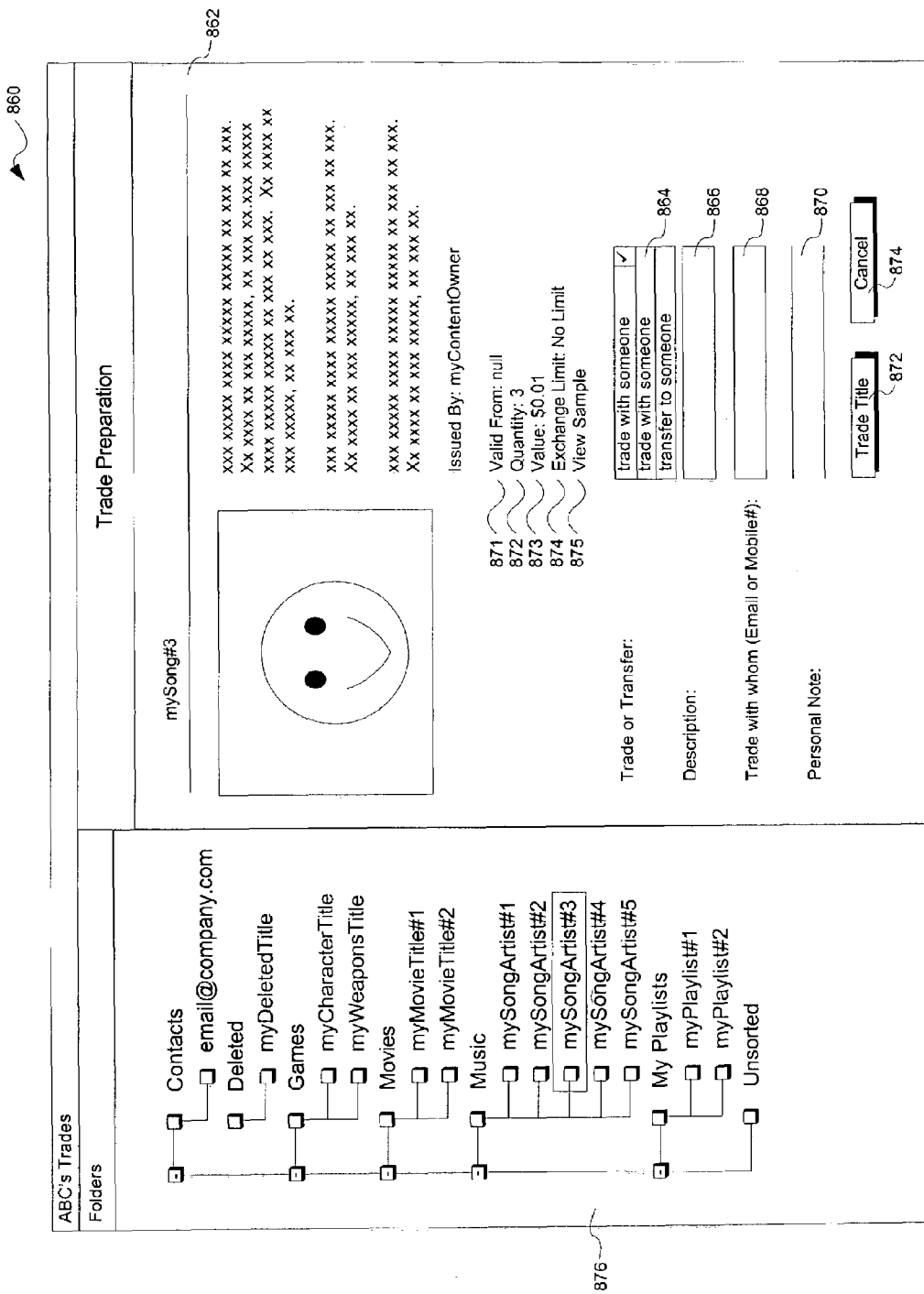

For example, if the user chooses to trade 814 mySong#3, a trade Preparation pane 862 appears, as shown in FIG. 8D. Aside from the information that was previously displayed in the title content pane 842 of FIG. 8C, additional information is displayed, such as a valid from date field 871, a quantity field 872, a value field 873, and an exchange limit field 874. The user can also view a sample 875 of mySong#3.

The user must select whether to trade or transfer 864 the title of mySong#3 with another user. Additionally, the user may be asked if they would like to list it on a barter site ("list on barter site") or post it to a transaction maker site ("post to transaction maker"). The user can enter description of the mySong#3 in the description field 866, as well as a note in the Personal Note field 870 to the user with whom the trade is being transacted. In the trade with whom field 868, the user enters the e-mail or mobile phone number of the user with whom they wish to trade. Once this information is substantially complete, the user selects the user selectable button trade title 872 to proceed, or the user selectable button cancel 874 to cancel the transaction.

The e-mail and mobile phone numbers are used to provide examples of identifying trading parties. The title transaction system has been designed with a flexible and extensible title format to accept and support a variety of naming schemes, including but not limited to domain name, phone numbers, X.500 naming, and LDAP.

Figure 8E:
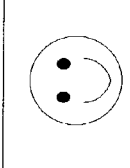

FIG. 8E depicts an exemplary title trades screen display 880 according to another embodiment of the invention. This display shows the current status of a user's title transactions. The display is divided into five sections, a title folder pane 890 a title status summary pane 882, a title bid pane 888, and a title offered pane 884, and an action pane with a series of user selectable buttons: counteroffer 891, cancel 892, and trade 846. In this example, the user selected mySong#3 883 was offered to trader#2, who has been notified. Once trader#2 makes an offer for trade, the user can counteroffer 891, cancel 892, or trade 846 and complete the transaction.

Figure 9A:
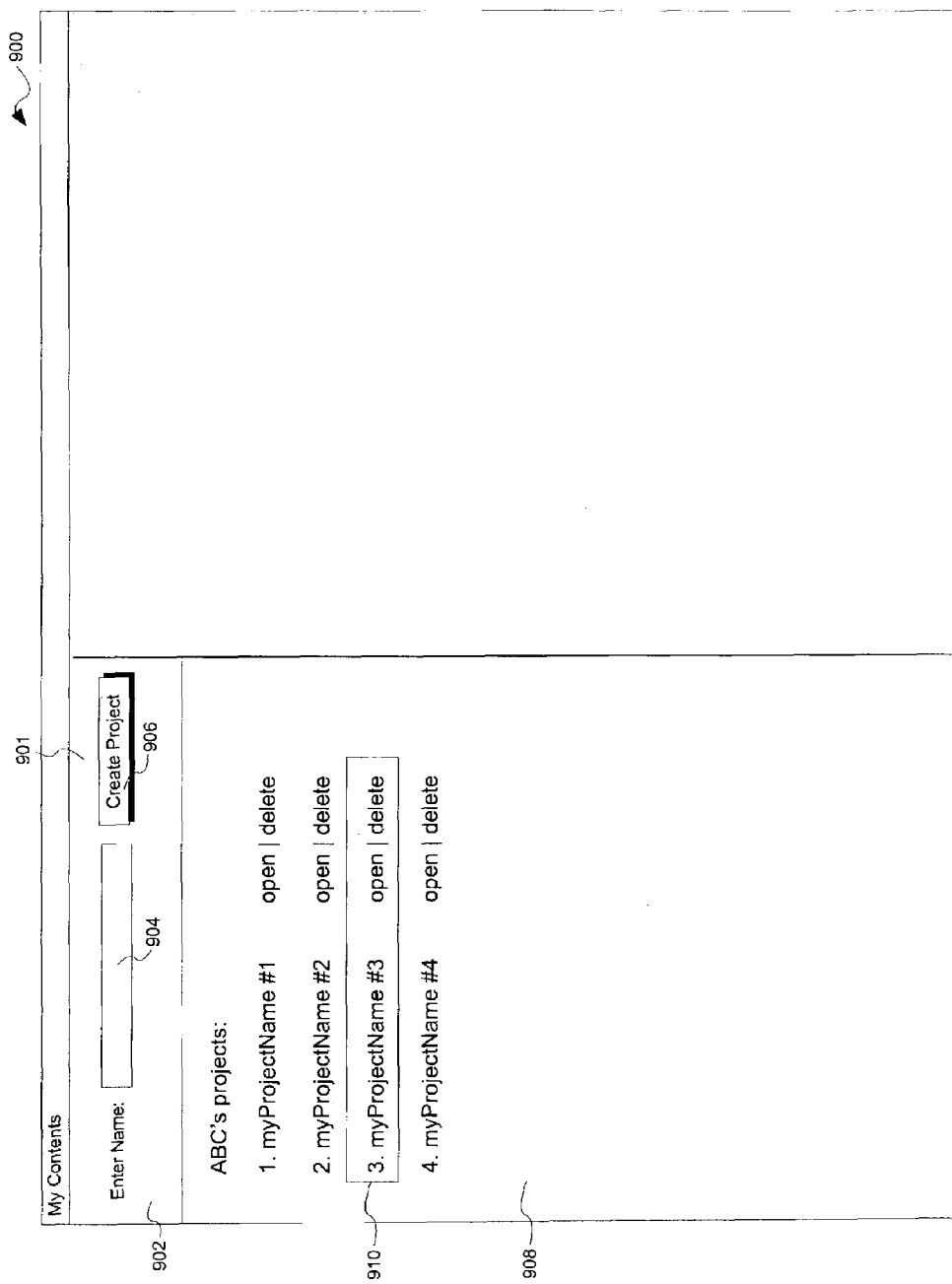

FIG. 9A depicts exemplary title creation screen display 900 according to an embodiment of the invention. The number of digital content files that a title can contain is substantial. Furthermore, the addressing or referencing scheme used by the content element is flexible to support numerous simple and complex structures such as URL's, object identifiers, domain names, alternate pointers, complex multi-part pointers, and even embedded content. With embedded content, the title actually contains the content and can optionally support a variety of encoding and encryption schemes The display is divided into two sections, a new project pane 902, and a project list pane 908. A project is a set of digital content files that share the same title object. If the user opens myprojectName#3, for example, a project detail display 920 appears, as in FIG. 9B.

Figure 9B:
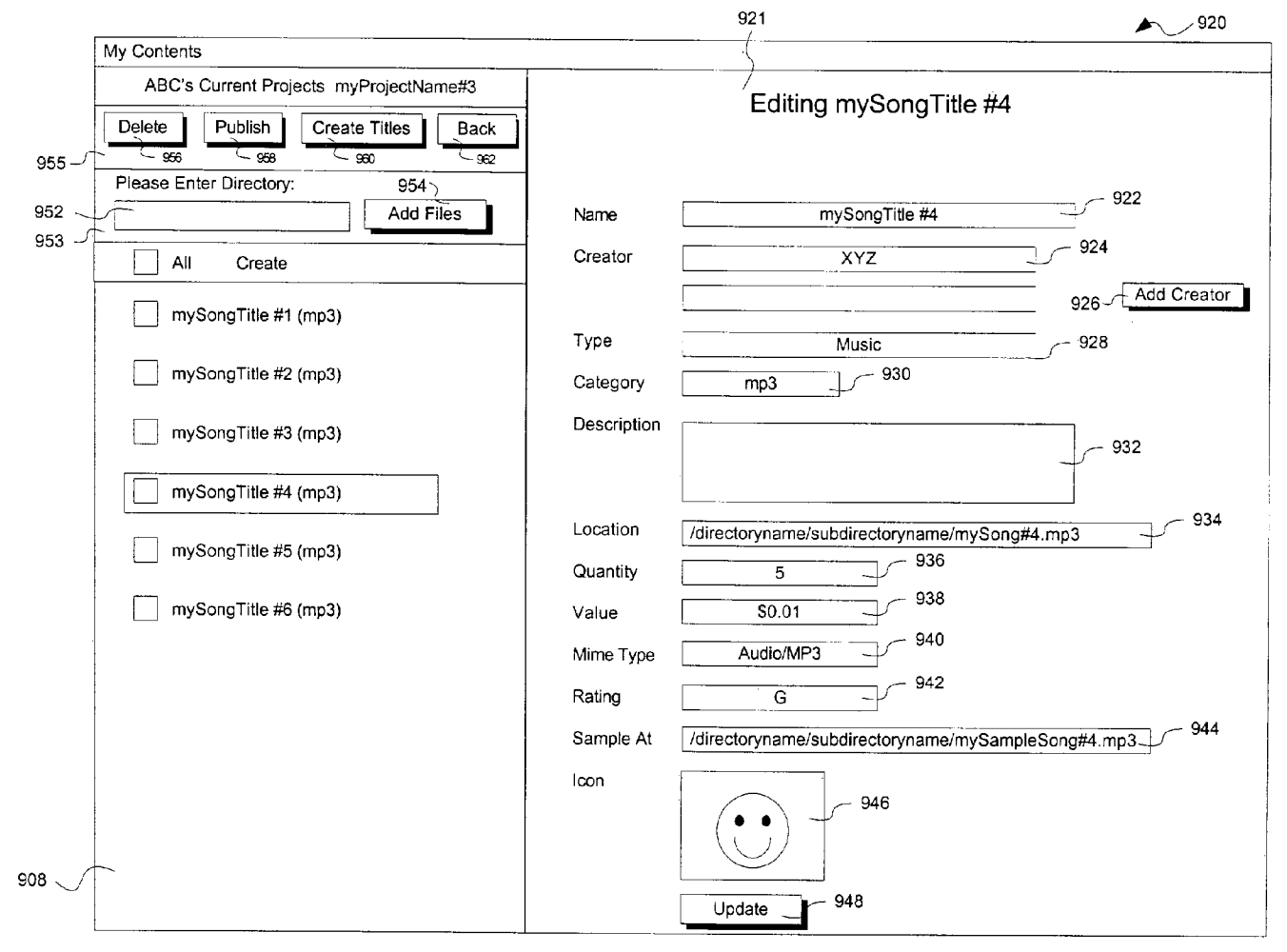

FIG. 9B depicts an exemplary project detail display 920 according to another embodiment of the invention. The display is divided into four sections. The first is an action pane 955 with a series of user selectable buttons: delete 956, publish 958, create titles 960, and Back 962. The second is an add file pane 953 with a user selectable button add files 954, and a field to enter the directory in which the files are stored 952. The third is a project list pane 908. And the fourth is a project detail pane 921.

Digital content files can be quickly added to a project by entering the name of the directory in which they are located into user input field 952, and selecting the add files user selectable button 954. Furthermore, information contained in the title is shown and can be modified through fields the project detail pane 921 such as: name field 922, creator field 924, type field 928, category field 930, description field 932, location field 934, quantity field 936, value field 938, mime type field 940, rating field 942, sample at field 944, and icon field 946. When the users wish to save the information in the title, the user selectable button update 948 is selected.

Figure 10A:
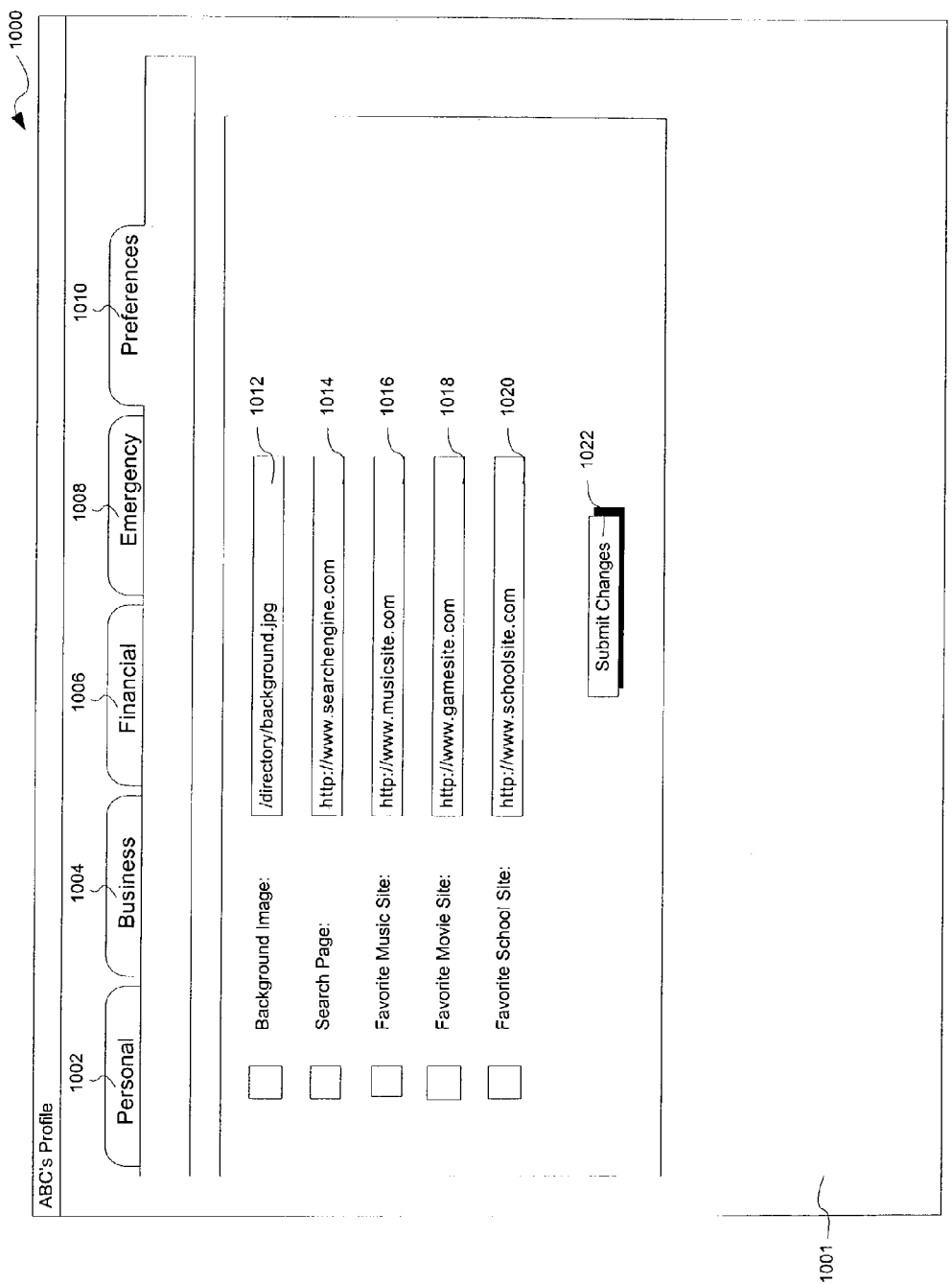

FIG. 10A depicts an exemplary administrative screen display 1000 according to another embodiment of the invention. This display is used to store administrative information about each user, preferences to customize the user interface, and custom rules that the user wants applied. The display is divided into 5 tabs: personal 1002, business 1004, financial 1006, emergency 1008, and preferences 1010. The preferences 1010 tab further contains the following fields: background image 1012, search page 1014, favorite music site 1016, favorite movie site 1018, and favorite school site 1020. When the users wish to save the information in the profile, the submit changes 1022 button is selected.

Figure 10B:
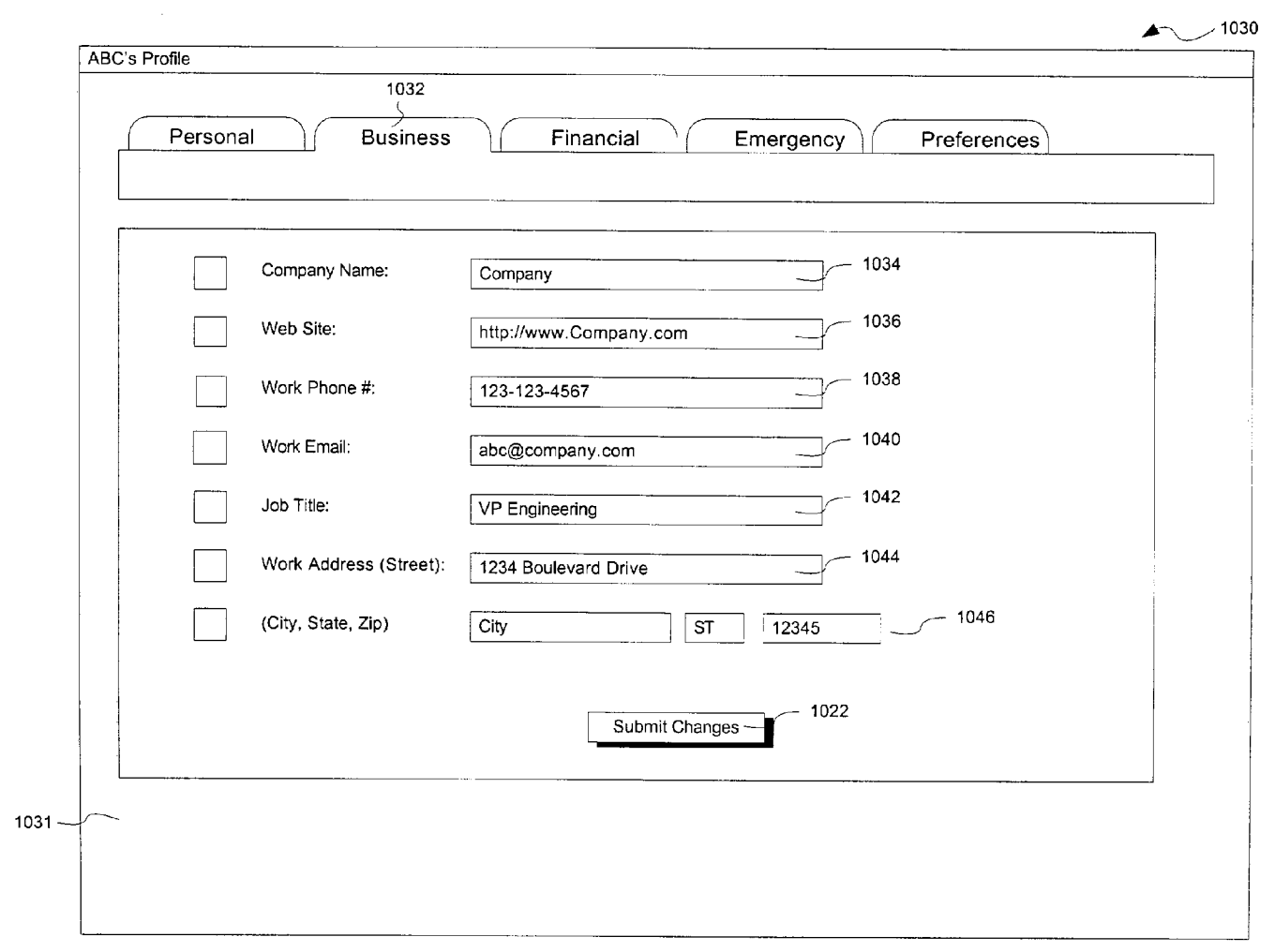

The business tab 1032, as shown FIG. 10B, contains the following fields: company came 1034, web site 1036, work phone # 1038, work email 1040, job title 1042, and work address 1044-1046. As in FIG. 10A, when the users wish to save the information in the profile, the submit changes 1022 button is selected.

Figure 11:
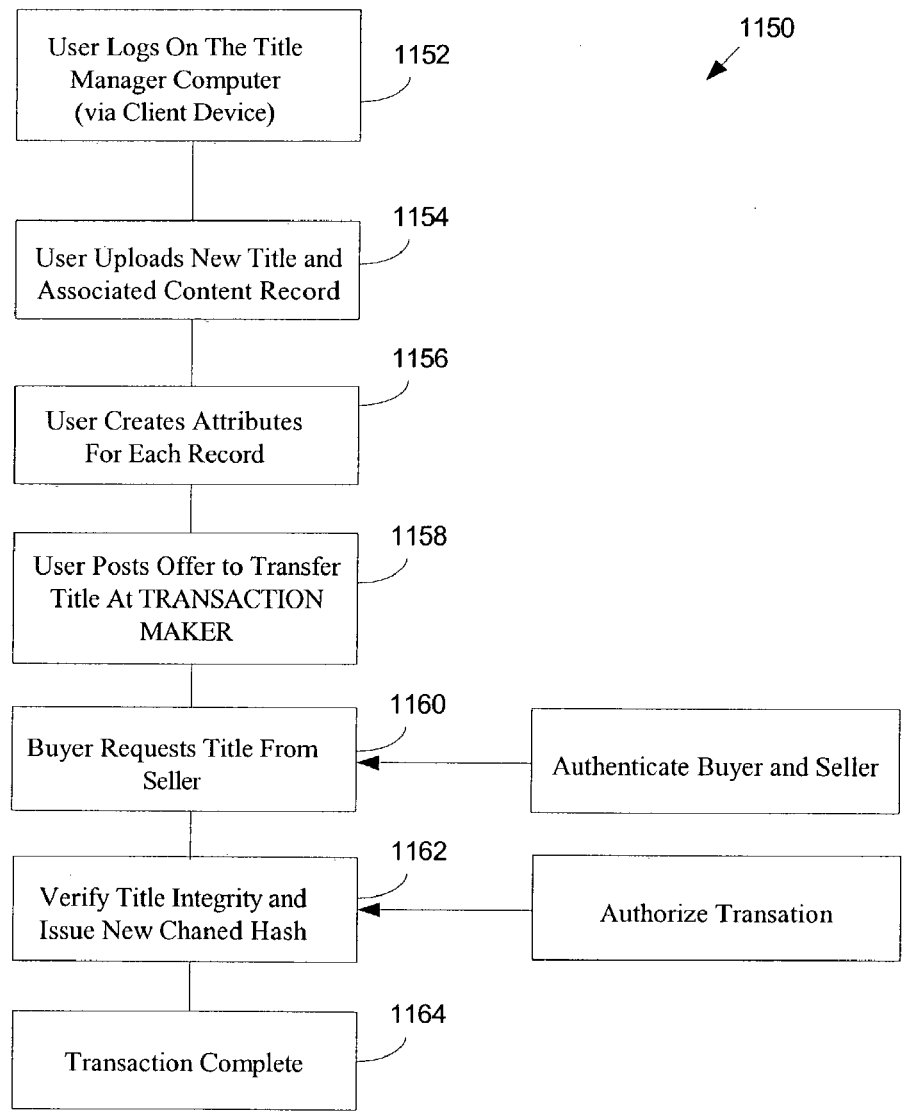
FIG. 11 is a flow chart showing steps for performing a title transfer according to an embodiment of the invention.

FIG. 11 is a flow chart showing steps for performing a title transfer according to an embodiment of the invention. Initially, the user logs on the title manager computer 1152 and uploads a new title and associated content record 1154. The user then creates attributes for each record 1156. The user then posts an offer to transfer the title on transaction maker 1158. A buyer who desires the digital content file requests the title from the seller 1160, whereby both the buyer and seller are authenticated. The title integrity is verified and a new chained hash is issued 1162, authorizing the transaction. When this is accomplished, the transaction is complete 1164.

C. METHODS OF FACILITATING MERCHANT TRANSACTIONS

Figure 12A:
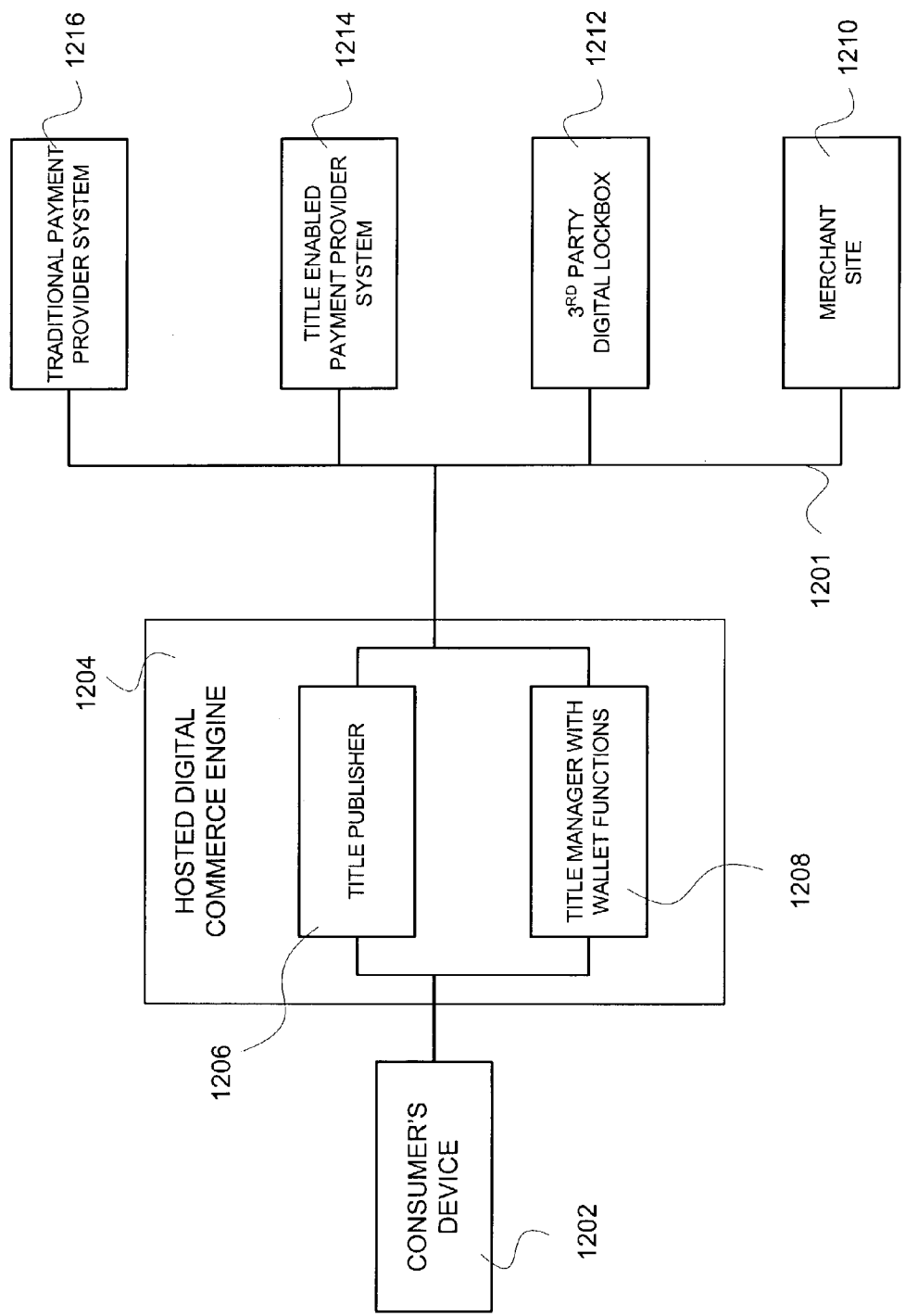
FIG. 12A depicts a title payment system according to an embodiment of the invention.

FIG. 12A depicts an exemplary diagram according to one embodiment of the invention, in which an online payment system is enabled through the exchange of titles. This embodiment addresses the importance of online payment systems for Internet merchants, since direct human interaction with customers is both costly and often inconvenient.

Current online payment systems commonly require bank cards, such as Visa or Master Card. In order to complete a purchase, customers must enter the bank card account information, along with personal contact information, into an online form at the merchant Internet site. Often, the information is stored by the merchant to simplify future customer purchases. For instance, instead of having to re-enter the information, the customer can just authenticate with a login and password, and complete the purchase.

Customer fears about data security and confidentiality, however, have inhibited ecommerce growth. And although security systems have greatly improved, criminal sophistication has also increased. Customers are not only inconvenienced with having to enter and re-enter account information at every merchants site, they are also concerned with propagation of their account information, protection of their privacy at each of the merchants site, and tracking of their habits and activities online.

Because of the distributed and anonymous nature of the Internet, online merchants are prone to both fraudulent bank card transactions and malicious hacking attacks. These same merchants, however, cannot remain in business if their attempts to increase security result in unintended customer frustration. Modern payment systems must both enhance the customer buying experience and be secure. A modern payment system must also support anonymous payment methods similar to the physical cash schemes that are currently in use throughout the world.

FIG. 12A is an exemplary diagram of a title payment system. The system in FIG. 12A comprises a consumer's device 1202 connected to an online, hosted digital commerce engine (DCE) 1204. The DCE is a hosted service that operates a title publisher 1206 and a title manager 1208. The DCE is typically hosted by a network provider such as an internet service provider, application service provider, and/or mobile operator. The title manager 1208 provides wallet functionality in order to handle the various payment processes and payment titles. The system in FIG. 12A also comprises a merchant site 1210, third party digital lockbox 1212, title enabled payment provider 1214, and a traditional payment provider 1216. In this example, all communications occur over a TCP/IP network 1201 but can be implemented using any number of protocols and communication implementations.

Consumer's device 1202 presents the user interface of the online title manager and wallet through which titles and digital content files are managed, transacted, and delivered. The device can be almost any type of computing device that can communicate with the DCE, including desktop computers, laptops, PDA's, and mobile phones. The title manager 1208 located in the DCE provides title management services to the consumer such as adding, viewing, and trading titles. Additionally, the title manager 1208 provides wallet functionality for viewing accounts, currencies, and receipts as well as handling payment processing on behalf of the consumer. Optionally, the functionality offered by both the consumer's device and the DCE can be packaged in a number of ways including a completely integrated application to be run on a consumer's device such as a desktop computer.

Figure 12B:
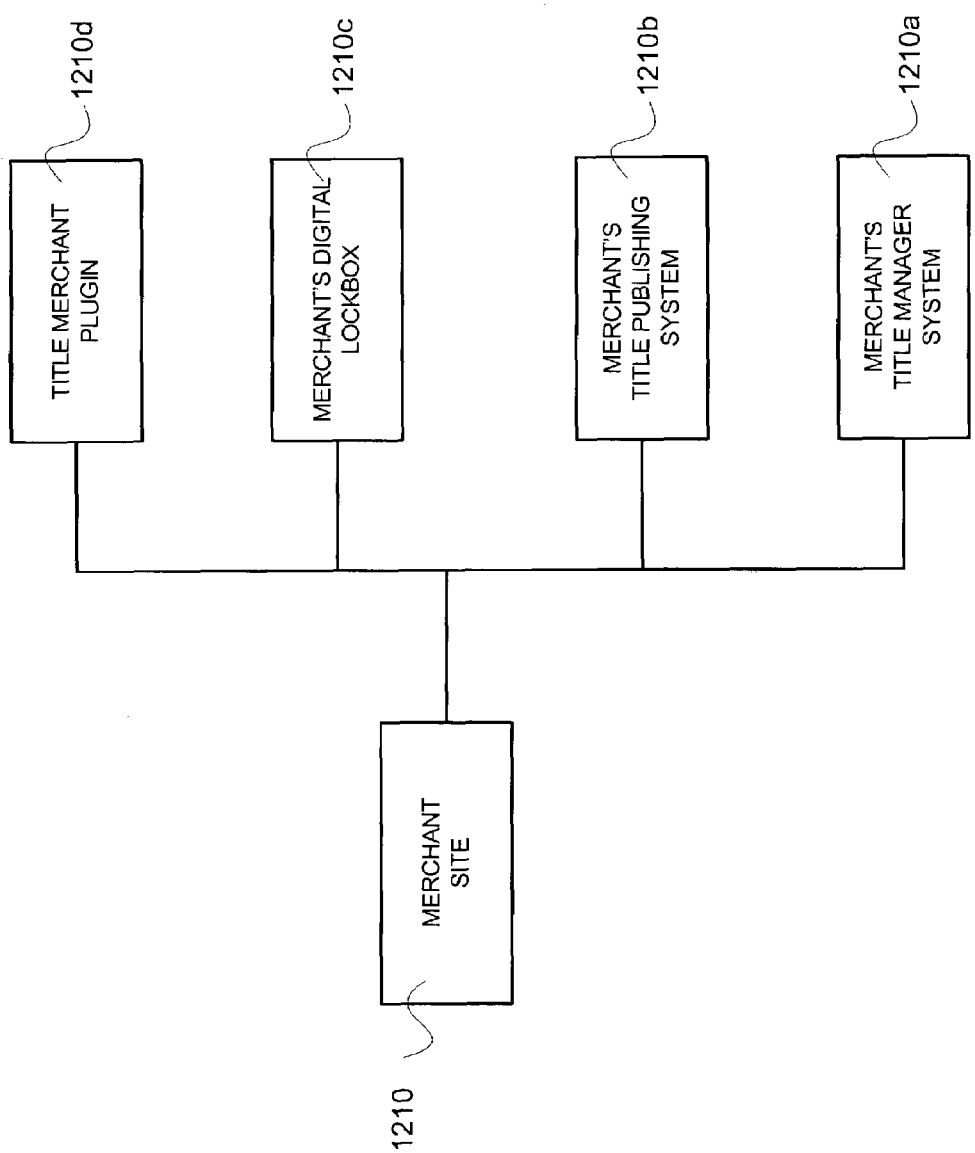
FIG. 12B depicts a title payment system with a digital lockbox according to an embodiment of the invention.

The merchant site 1210 is an online merchant system that provides both web-based and e-commerce functionality such as catalog, product information, product configurators, shopping pages, shopping cart, and payment services. While only one merchant site is shown in the diagram, the invention can support any number of merchant sites. The merchant site 1210 is further comprised of title-enabled components as shown in FIG. 12B. As shown in FIG. 12B, the merchant site can include a title manager 1210*a*, title publisher 1210*b*, digital lockbox 1210*c*, and title merchant plugin 1210*d*. All components are optionally operated by the merchant but are generally available to merchants that are title enabled. The title manager 1210*a* provides the merchant with management functions for titles that they own or potentially for customers. The title publisher 1210*b* allows the merchant to publish titles such as the titles that may be given to customers that reference customer's rights to digital content file s. The digital lockbox 1210*c* is an example where the merchant hosts the lockbox for trading purposes instead of a third party service. The title merchant plugin 1210*d* provides payment support services for the merchant including communication with digital lockboxes, title verification, and an interface with payment providers. While only one component of each type is shown, the invention can support any number of components to be hosted by the merchant.

The third party digital lockbox 1212 in FIG. 12A is an application that provides a temporary and secure safe harbor for all transaction titles until title rights are established. While only one digital lockbox is shown, the invention can support any number of digital lockboxes. It is generally hosted somewhere in the network by the merchant, or a trusted third party escrow service. For instance, a title may be released to the consumer from lockbox 1212 once the purchase is completed. As shown in FIG. 12B the merchant site can also host a digital lockbox 1210*c* to provide a mechanism for supporting the payment process, that is supporting exchange transactions, in lieu of a third party service.

Figure 12C:
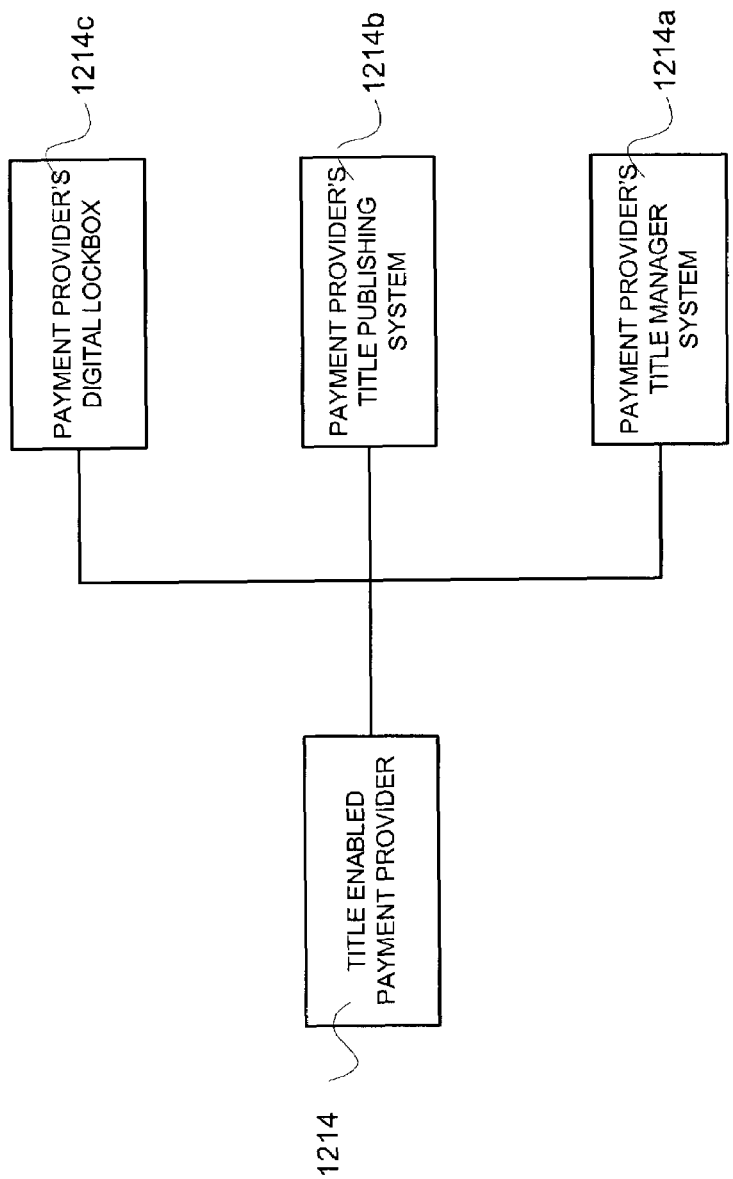
FIG. 12C depicts a title payment system with a digital lockbox, a title manager, and a title publisher according to an embodiment of the invention.

The title enabled payment provider 1214 is an online payment provider service that is title enabled, in that they can support title based transactions. While only one title enabled payment provider is shown, the invention can support any number of title enabled payment providers. In addition to supporting titles, a title enabled payment provider 1214 would provide services typical of a payment provider such as payment processing, gateways to payment networks, and merchant accounts. As shown in FIG. 12C a title enabled payment provider 1214 can operate title-enabled components such as title manager 1214*a*, title publisher 1214*b* and digital lockbox 1214*c*. These components would provide the same services to the payment provider as similar components provided to the merchant site 1210.

Each of the system elements shown in FIG. 12A, FIG. 12B, and FIG. 12C are coupled to the other using a network protocol 1201, such as TCP/IP over the Internet. Furthermore, consumers can access online title manager 1210*a* functions directly within merchant sites 1210 if they are permitted. For instance, payment options shown at the merchant site reflect those available in the online title manager 1208, but other options can be added.

As previously described, a title is an object that may have a number of elements and attributes including embedded digital content, ownership attributes, and copy permissions. In this example, a consumer wishes to buy a product or service from a merchant using a title transaction. A purchasing transaction generally comprises two or more separate titles: a product title or titles being offered by the merchant; and a payment slip title or payment titles being offered by the consumer. The product title or titles give the title owner specific rights to the product, for instance, the ability to play a song. The payment slip title is a financial instrument that authorizes a payment provider to pay the merchant for any product titles purchased. Once the transaction is complete, the consumer would be in possession of the product title or titles and the merchant would be in possession of the payment slip title or payment titles.

For instance, a customer would use a web browser on customer's device 1202 to access a merchant site 1210 through online title manager 1204. When the merchant site determines that the transaction is title-enabled, it presents the product title choices and displays the consumer's title payment options. Once items are selected for purchase, the merchant site places the product titles in a digital lockbox 1212, generates a pre-filled sales order title comprising transaction details including a transaction number, product title information, purchase detail, and information on the digital lockbox 1212. The sales order title functions as an electronic invoice or promise of payment for the merchant 1210.

The sales order is transmitted back to title manager 1204 and stored for the consumer to view, select payment type, and approve using the consumer device 1202. Once approved by the consumer, the title publisher 1206 may generate a payment slip title using the sales order title as a guide. The payment slip title is transmitted to the digital lockbox 1212 and the merchant 1210 is notified. The merchant 1210 verifies the payment slip title in the digital lockbox 1212 and completes the transaction by releasing the product titles to the customer. A receipt title can also be generated and included in the transaction if requested or required. The merchant 1212 then captures payment from the customer by forwarding the completed payment slip title to the title payment provider 1214 for payment. Alternatively, the merchant 1210 can use a standard collection process such as that used for credit card processing, and deal directly with a traditional payment provider 1216.

Figure 13A:
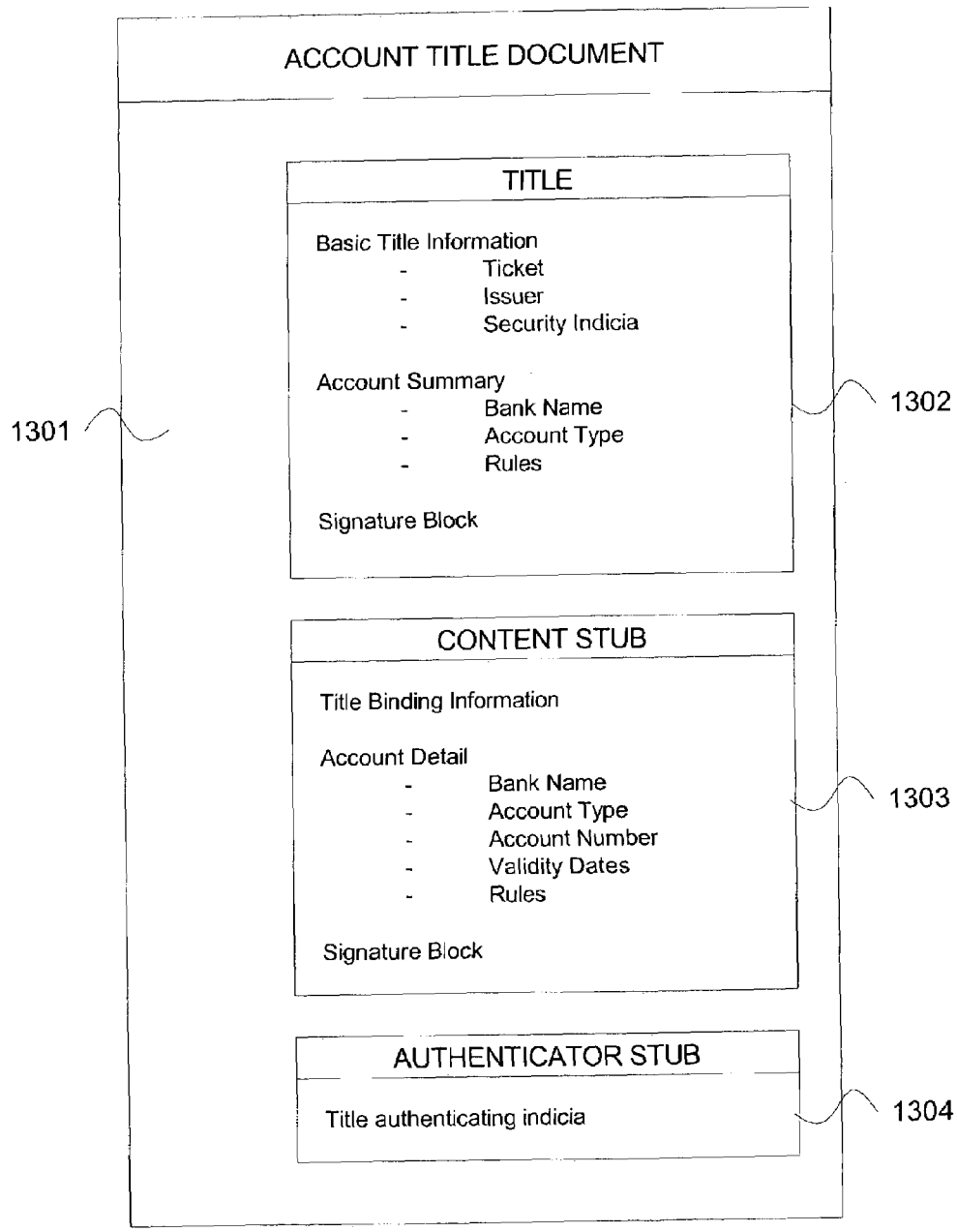
Figure 13B:
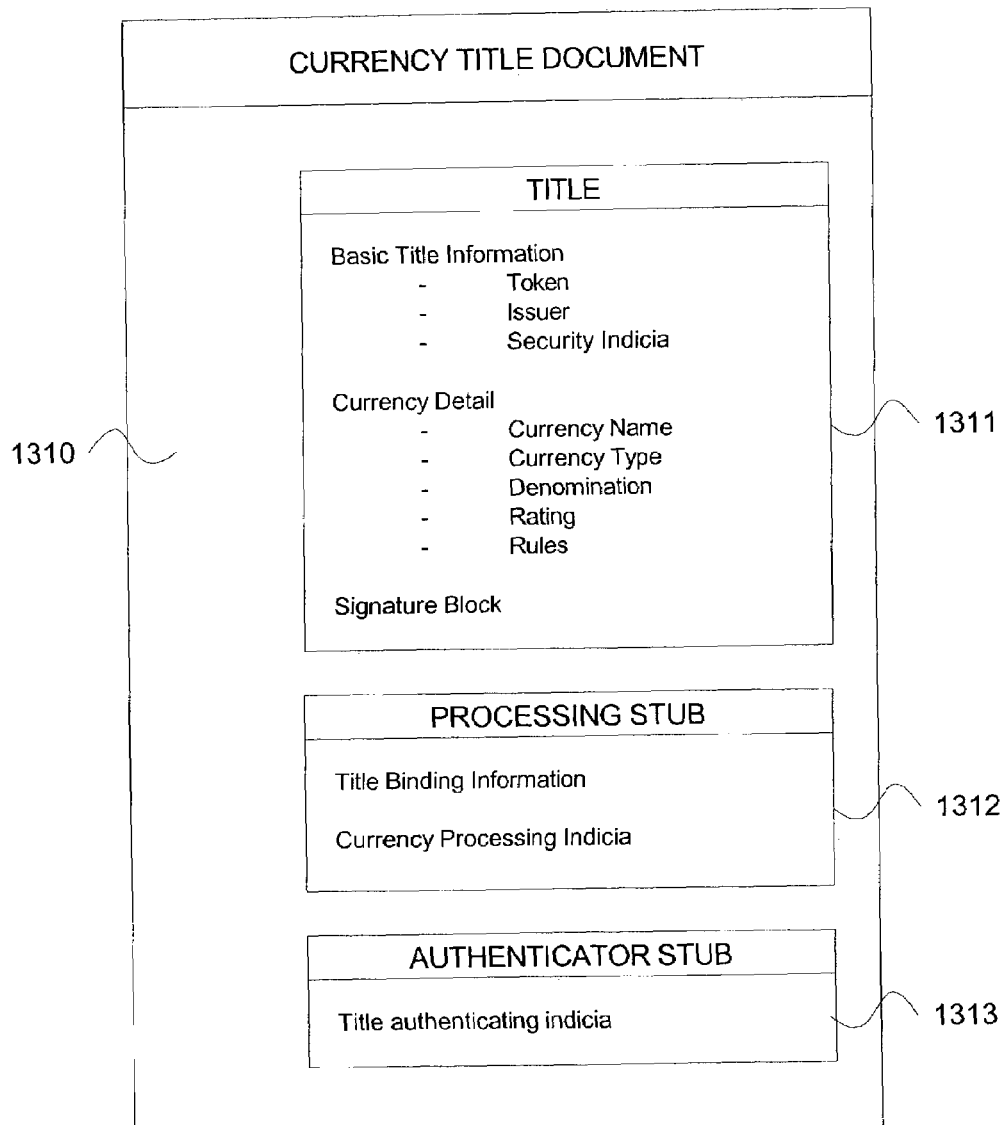
Figure 13C:
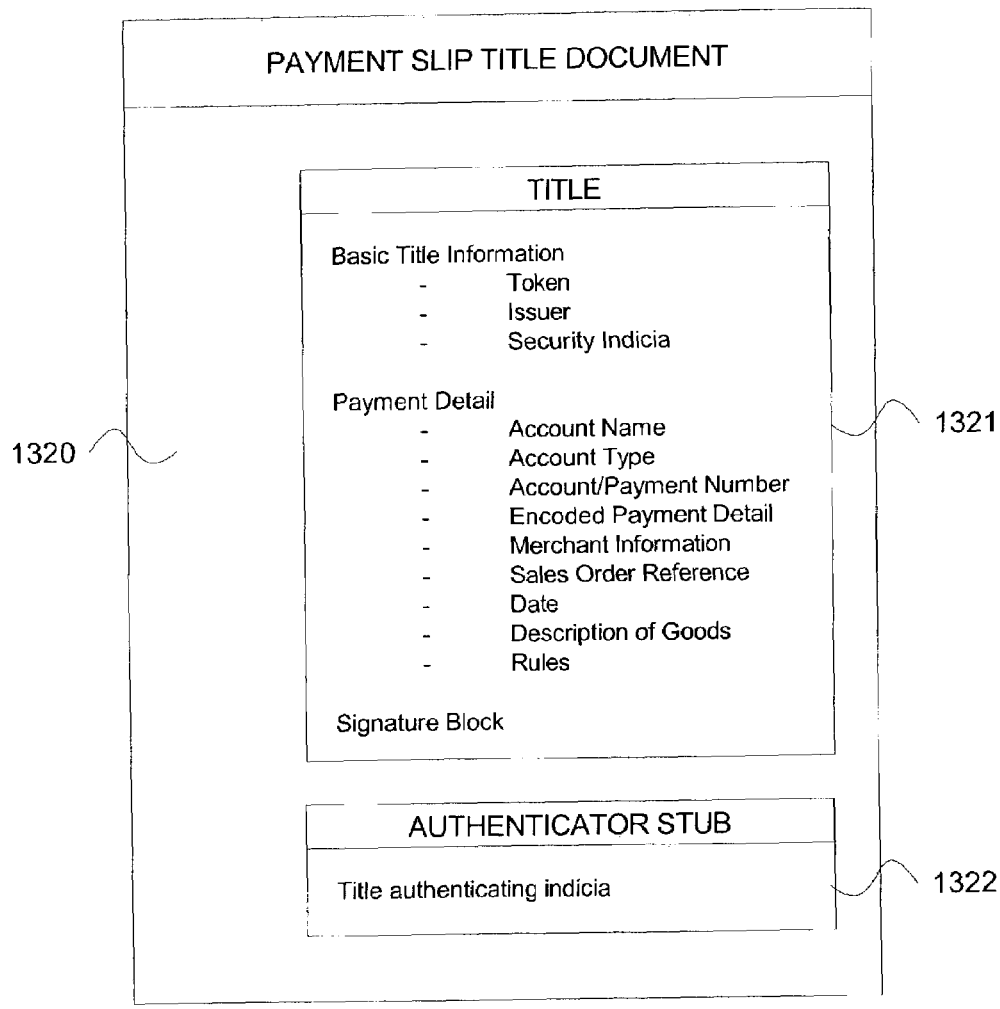

FIGS. 13A, 13B, and 13C depict exemplary payment transaction data structures according to an embodiment of the invention. Each data structure is maintained within the online title manager 1204, 1210a, and 1214a, previously displayed in FIGS. 12A, 12B, and 12C.

FIG. 13A displays an account title 1301. In this example, an account title represents a bank card or a debit card. Each account title 1301 can further contain sub-elements such as access information and other account details. The structure of an account title 1301 is that basic account information is contained in a standard title block 1302 and detailed account information is contained in a content stub 1303. Containing the detail in a content stub 1303 provides additional control and flexibility of what information is displayed, transmitted, and shared through a transaction. An account title is generally a ticket since it is issued to a particular person and cannot be traded. This is indicated in 1302 and as is standard with tickets an authenticator stub 1304 is included.

FIG. 13B displays a currency title 1310. Unlike a bank card, a currency functions as a pre-paid card or traveler's check that can be redeemed at the issuing title currency merchant. Currency is purchased in the issued denominations of that legal tender. For instance, in the case of U.S. Dollars, the denominations would be $0.01, $0.05, $0.25, $1.00, etc. Each currency title 1310 represents a specific currency and a specific denomination such as $1.00US. The currency title 1310 contains additional information regarding the currency such as issuer, type, and rules associated with the currency this is indicated in 1311. Unlike account titles, currency titles are generally tokens since ownership is dependent on possession and currency can be traded or transferred. As with all tokens an authenticator stub 1313 is included. In another example of a currency title 1310, the denomination may only be valid at time of issuance, and the title can be divisible, that is the currency title can be used for transactions requiring smaller denominations such as micro transactions. In this case, the currency title can contain a processing stub 1312 to hold processing indicia used during micro transactions.

FIG. 13C depicts an exemplary payment slip title according to an embodiment of the invention. A payment slip title 1320 is shown and is formatted similar to previous titles. The difference with a payment slip title is the content that it refers to and contains. The payment slip title 1320 has a payment detail section 1321 that contains specific information relating to the payment type used by the consumer. As previously described, the payment slip title is generated by the title publisher 1206 as shown in FIG. 12A, using the sales order title as a guide. The payment detail 1321 section of the title is actual title content and contains specific information relating to payment for the product. The information contained in payment detail 1321 may vary depending on the payment mechanism selected by the consumer such as account, blinded account, secure account, etc. Generally, the information may contain payment detail (such as amount), account name, type number, as well a basic order information including transaction number, merchant, date, description of product and any rules associated with payment. Some or all of this information maybe encoded such that only a title enabled payment provider 1214 or traditional payment provider 1216 can decode.

Figure 13D:
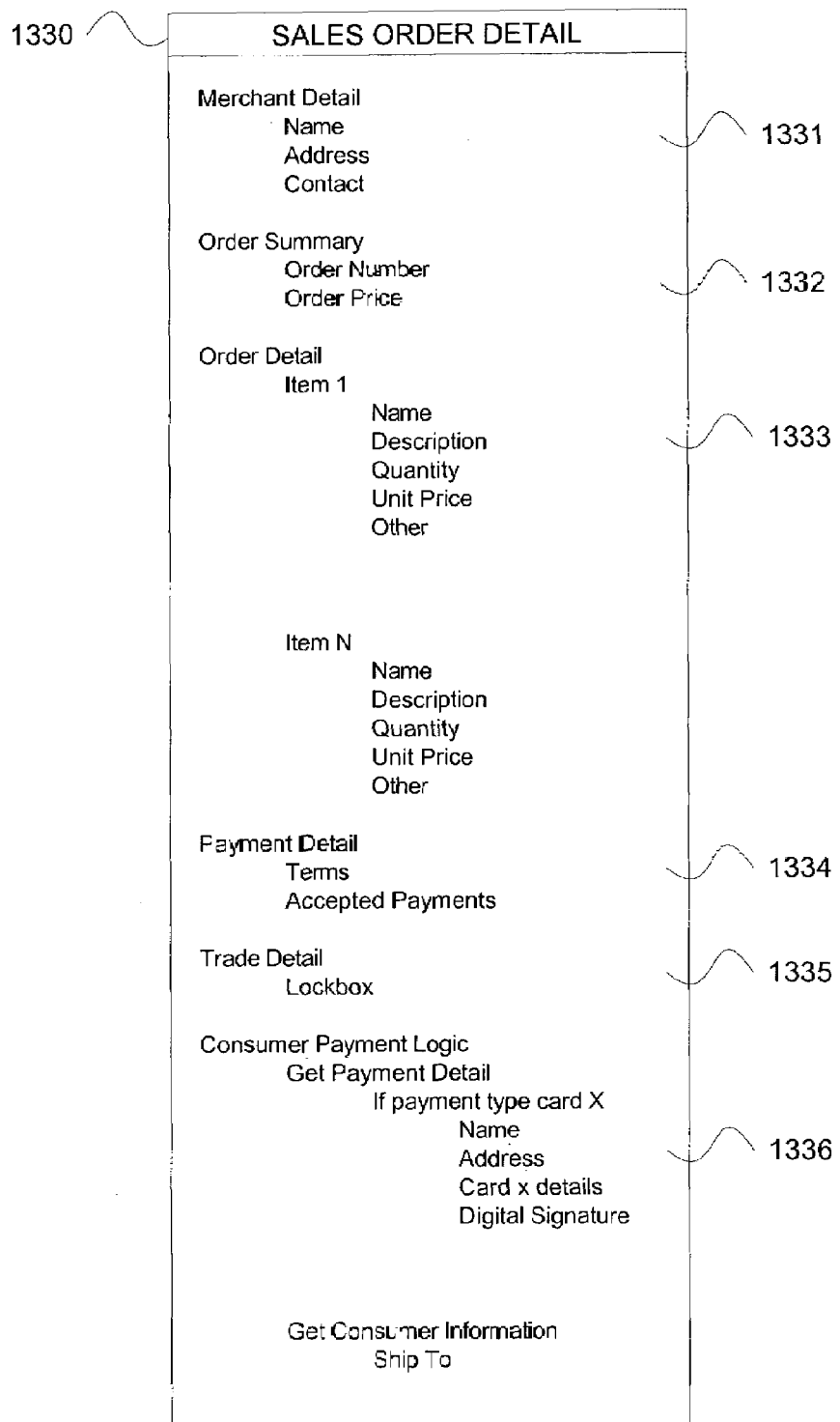

As described previously, a sales order title is created by the title publisher 1210b operated by the merchant site 1210 as shown in FIG. 12B. The sales order title is used as an invoice and sent to the consumer's title manager 1208 shown in FIG. 12A. The consumer's title publisher 1206 may create a payment slip title 1320 using sales order title as a guide. The sales order title is similar to previous titles but may instead contain sales order information within the content element. FIG. 13D depicts an exemplary sales order detail 1330 section that would be included within a title similar to the currency detail 1311 being included in 1310 and payment detail 1321 being included in 1320. The sales order detail 1330 contains merchant detail 1331, order summary information 1332, order detail 1333, payment detail 1334, trade detail 1335, and consumer payment logic 1336. Order summary 1332 provides summary information on the order including order number, total price, and taxes. Order detail 1333 provides line item detail for each product offered for sale, including unit and extended pricing. Payment detail 1334 provides detail definitions for the terms and conditions as well as the accepted payment types such as Visa, Mastercard, bank card, and cash. Trade detail 1335 provides information regarding the trade (product titles for payment titles) such as the location of the digital lockbox 1212. Consumer payment logic 1336 defines logic statements that can control how a payment slip is generated. These are basically instructions to the title publisher 1206 for handling specific payment mechanisms.

FIG. 13E depicts an exemplary title data table according to an embodiment of the invention. The title data table 1340 may be used by a title manager 1208, 1210*a*, 1214*a* to store all titles used in payment transactions. As shown in FIG. 13E, the table can contain any number of titles including currency titles 1342, account titles 1344, sales order titles 1346, and payment slip titles 1348.

Figure 14:
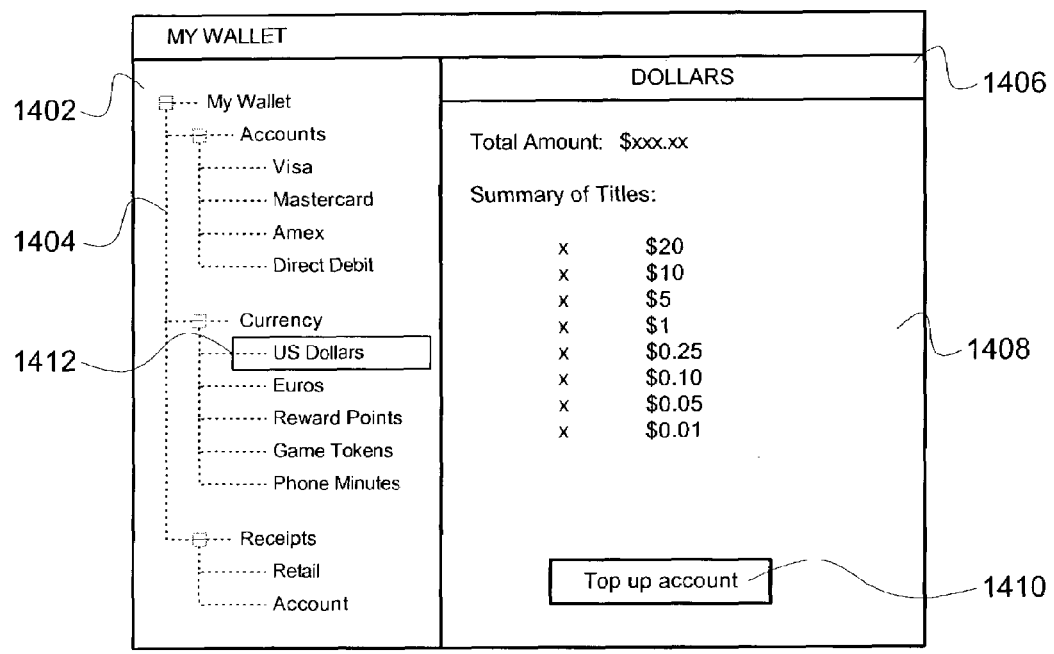
FIGS. 14-15 depict exemplary title management displays according to an embodiment of the invention.

FIG. 14 depicts an exemplary online title manager that is displayed in a browser on consumer's device 1202, as described in FIG. 12. The display is divided into two sections, a title folder pane 1402 and a title content pane 1406. The tile folder pane 1402 further organizes the titles into folders based on type 1404, although only my wallet titles are displayed. Examples include accounts, currency, and receipts. The accounts folder contains titles of bank cards, debit cards, and direct debit transactions. The currency folder contains titles of pre-paid currencies, as well as other pre-paid accounts that can be used for payment, such as gaming tokens and cell phone minutes. The receipts folder contains receipts for the customer's purchases, organized by type, such as retail and account.

The title content pane 1406 presents summarized information 1408 for account, currency, or receipt titles. Title content pane 1406 also allows the consumer to modify authorized entries within the titles. For example, the user has selected the dollars currency title 1412. This displays a summary of the currency amounts contained with the title, as well as allows the user to top up the account 1410 with additional currency.

Figure 15:
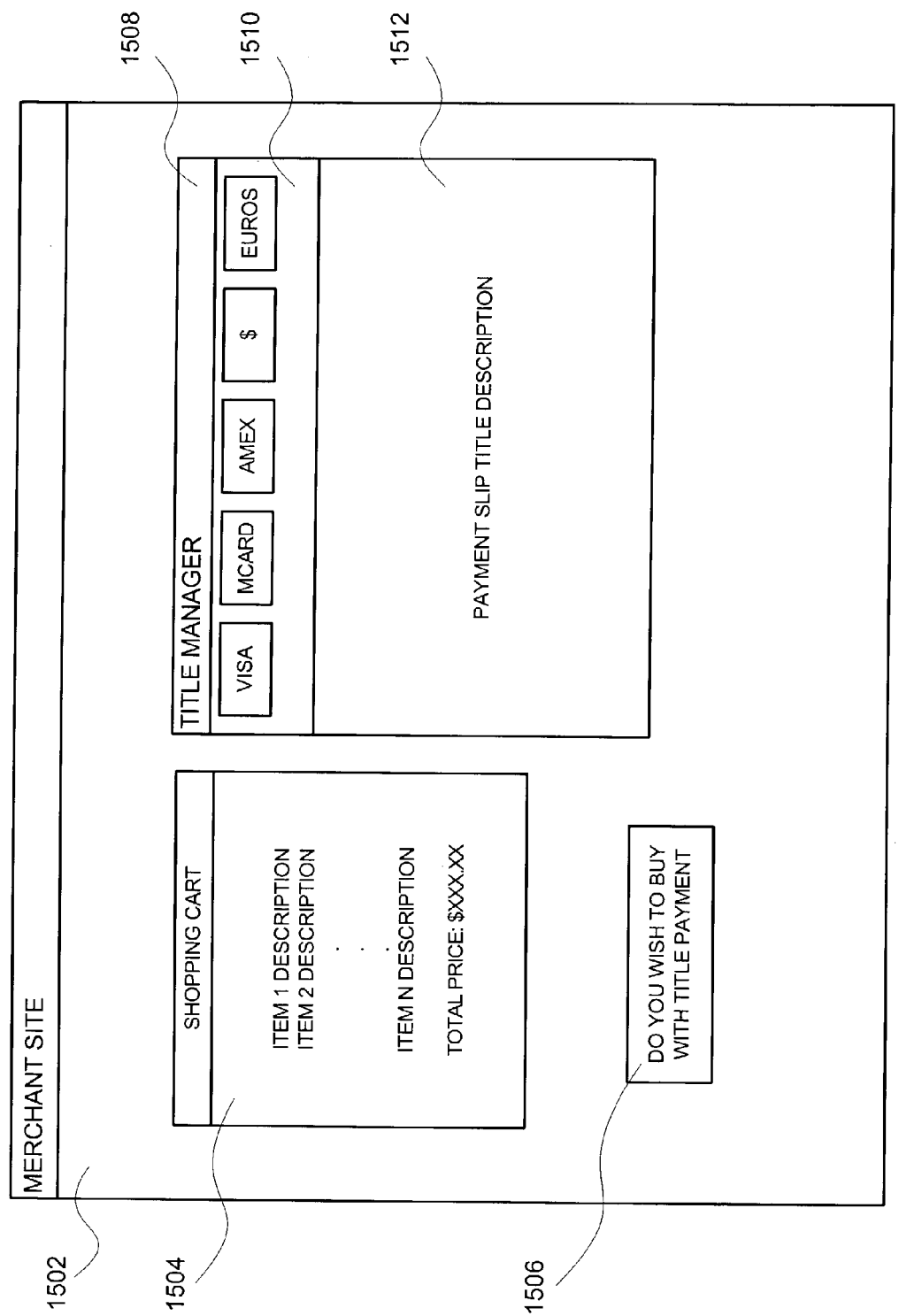

FIG. 15 depicts an exemplary merchant site 1502 that would be displayed in a browser on the consumer's device 1202, as described in FIG. 12. In addition to common merchant site elements, such as the shopping cart item description 1504, the consumer's title manager 1508 is displayed in a sub-window within or on top of the browser like a wallet application. In the title manager 1508, the device presents the consumer with available payment structures 1510, as well as a payment slip description 1512 when it is received from the merchant site 1210. Using the title manager window (i.e. the wallet application), the consumer can select a payment structure and make payment for the products presented in 1512.

Figure 16:
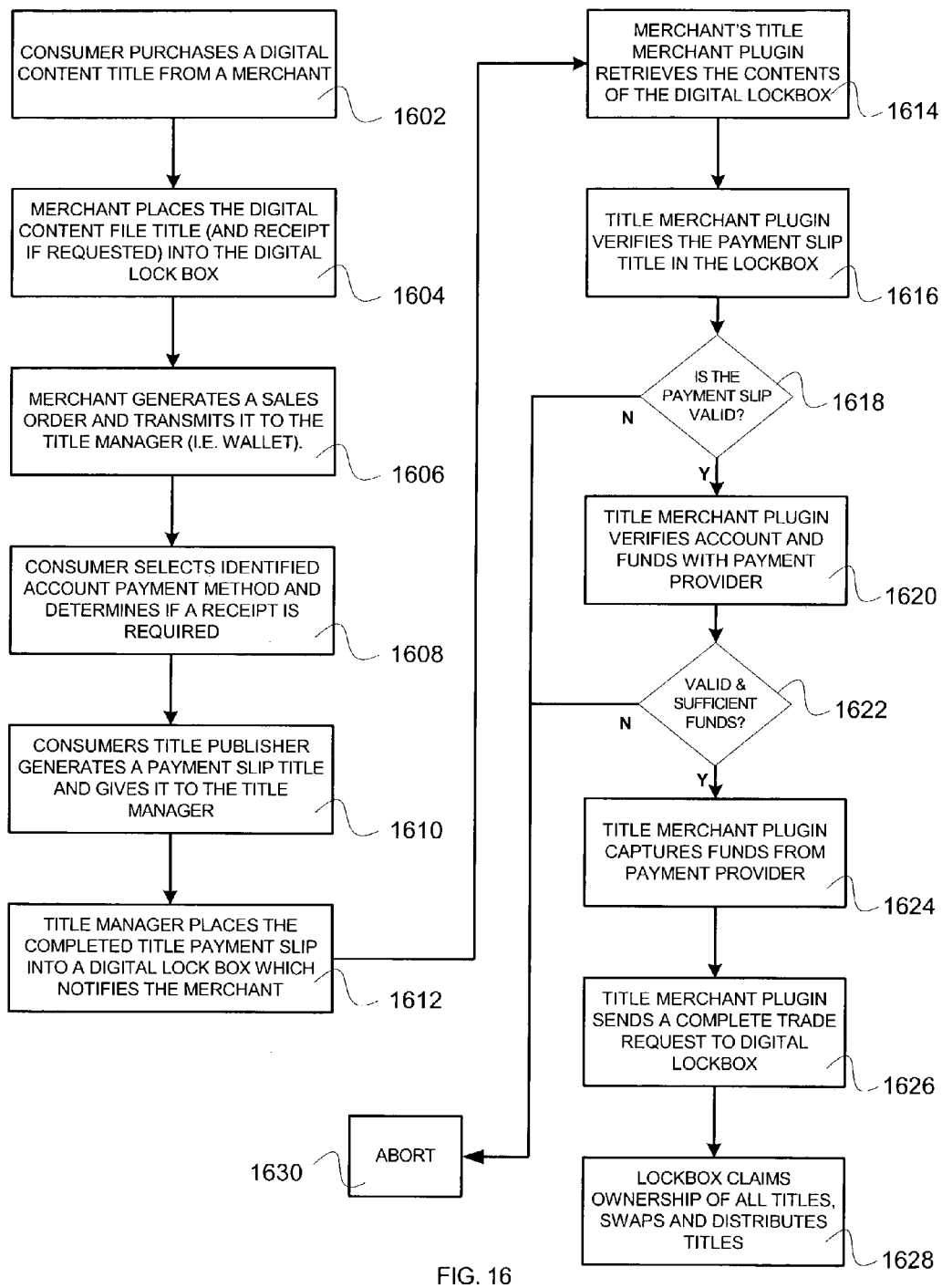
FIGS. 16-22B are flow charts showing steps for performing merchant transactions according to an embodiment of the invention.

FIG. 16 is an exemplary flow chart describing the steps in which the consumer chooses an identified account payment structure for the payment slip title. In this example, an identified (or named) account could be a Visa credit card account where the owner of the account is named on the card as well as the card number. This differs from a blinded account where the owner and account information is not divulged. This example is intended to show a typical credit card transaction where the title transaction system is setup to handle traditional payment mechanisms using current, traditional payment provider networks and technologies. In step 1602, the consumer purchases a digital content file title from a merchant, such as MerchantStore.com. In step 1604, the merchant places the titles expressing rights to the digital content files and if requested a digital receipt into the digital lockbox 1212. In step 1606 the merchant generates a sales order title and transmits it to the consumer's title manager 1208. In step 1608, the consumer then selects the desired form of payment and if a receipt is required from the merchant. In this example, the consumer would select a Visa credit card account. In step 1610, the consumer's title publisher 1206 creates a payment slip title and in step 1612 the title manager 1208 places it into the digital lockbox 1212 which then notifies the merchant. In step 1614, the merchant's title merchant plugin 1210*d* retrieves the contents of the lockbox. In step 1616, the title merchant plugin 1210*d* verifies the payment slip title and if valid (step 1618) may verify the identified account and funds in step 1620. If the account is valid and sufficient funds are available (step 1622), the title merchant plugin may capture funds from the payment provider 1216 (step 1624). In step 1626 the title merchant plugin sends a complete trade request to the digital lockbox. In step 1628 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 17:
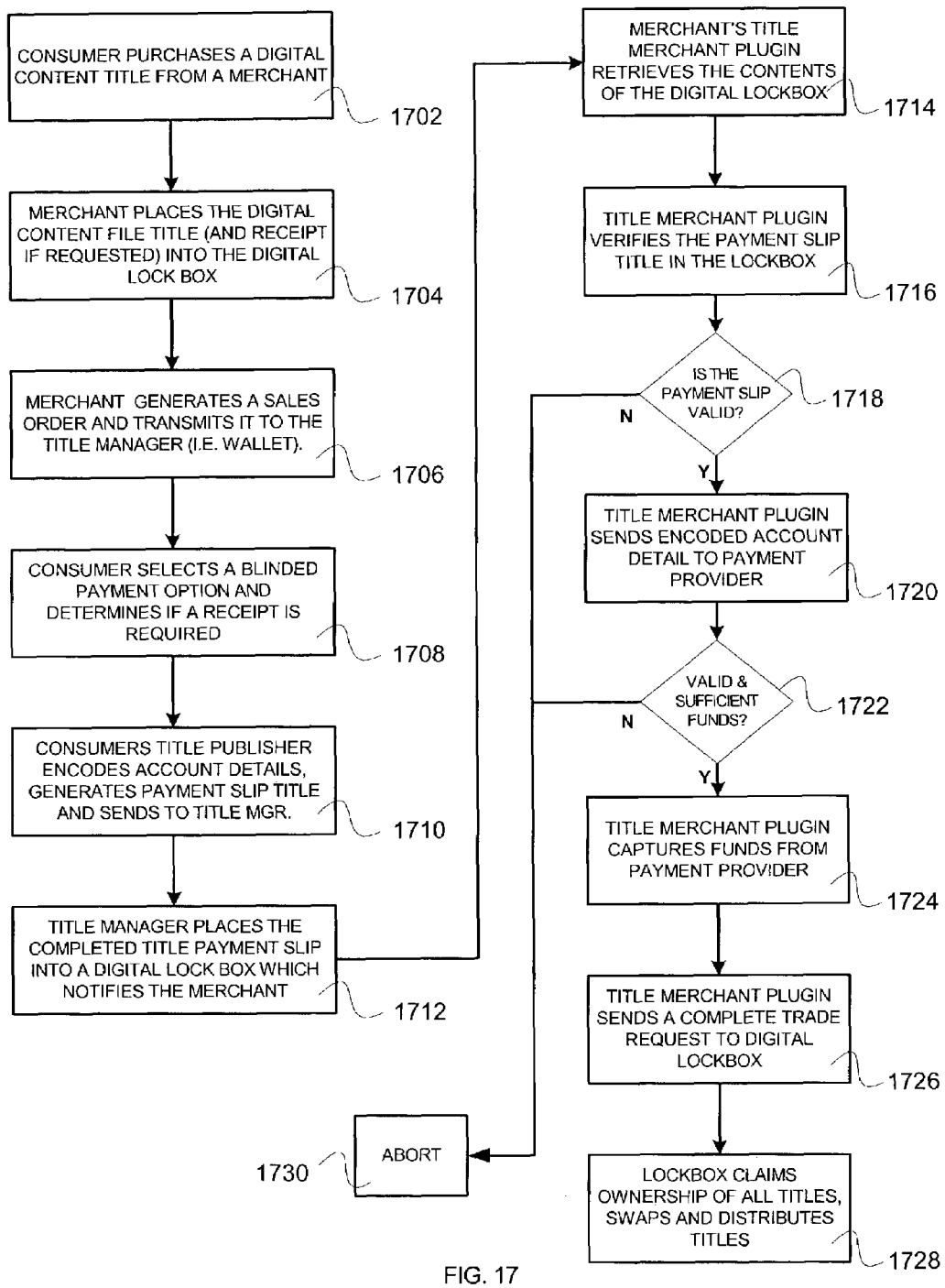

FIG. 17 is an exemplary flow chart describing the steps in which the consumer chooses a blinded payment structure for the payment slip title. In this example, a blinded account is used as the payment mechanism in order to protect the account holders name and the account number. The actual account in this case can be a credit card, bank card or other account or even some other payment mechanism. In step 1702, the consumer purchases a digital content file title from a merchant, such as MerchantStore.com. In step 1704, the merchant places the titles expressing rights to the digital content files and if requested a digital receipt into the digital lockbox 1212. In step 1706 the merchant generates a sales order title and transmits it to the consumer's title manager 1208. In step 1708, the consumer then selects the desired form of payment and if a receipt is required from the merchant. In this example, the consumer would select a blinded Visa credit card account. In step 1710, the consumer's title publisher 1206 creates a payment slip title using encoded account information (rather than clear text account information) and in step 1712 the title manager 1208 places it into the digital lockbox 1212 which then notifies the merchant. In step 1714, the merchant's title merchant plugin 1210*d* retrieves the contents of the lockbox. In step 1716, the title merchant plugin 1210*d* verifies the payment slip title and if valid (step 1718) sends the encoded account information to a payment provider for approval in step 1720. If the account is valid and sufficient funds are available (step 1722), the title merchant plugin may capture funds from the payment provider 1216 (step 1724). In step 1726 the title merchant plugin sends a complete trade request to the digital lockbox. In step 1728 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 18:
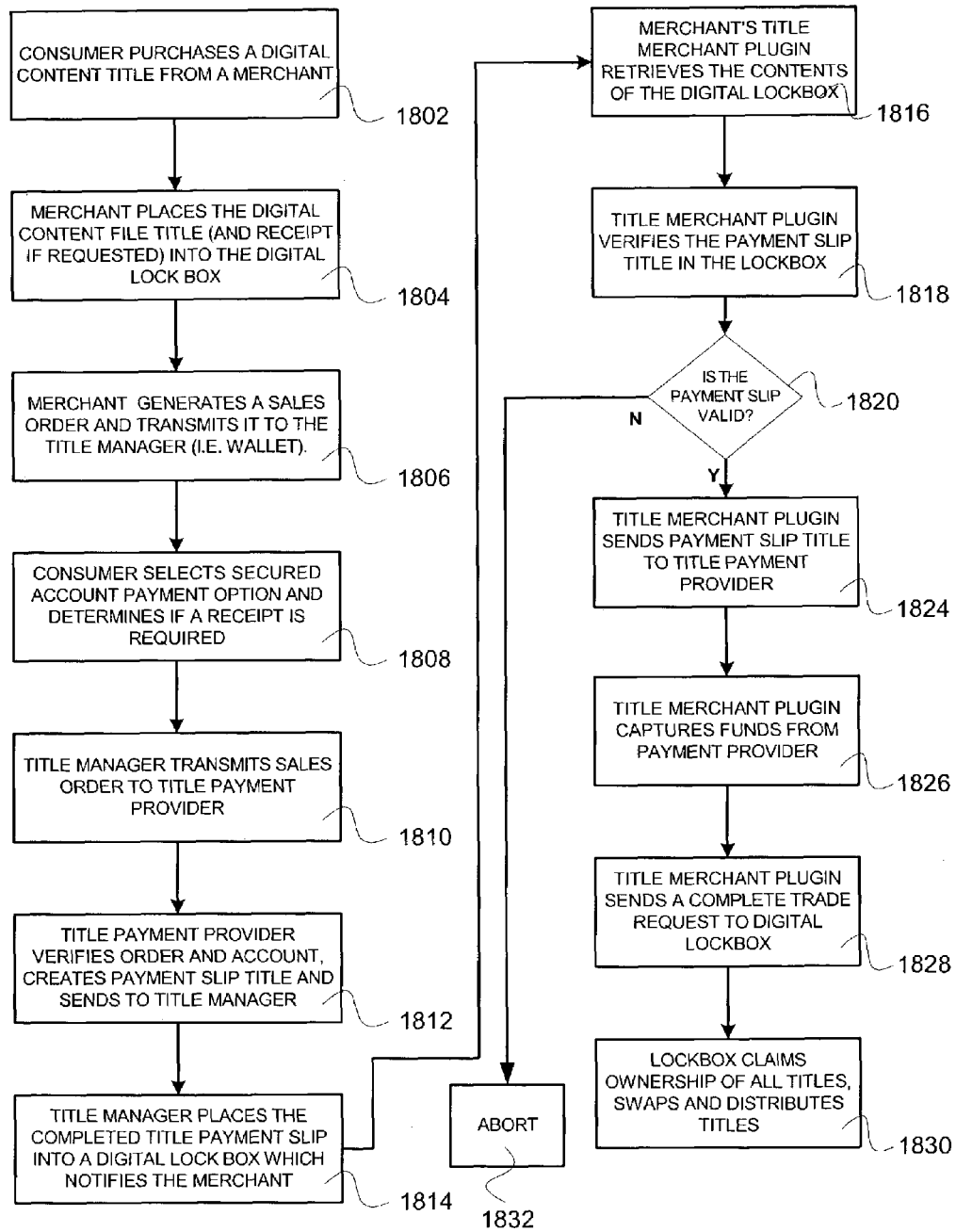

FIG. 18 is an exemplary flow chart describing the steps in which the consumer chooses a secured account payment structure for the payment slip title. In this example, a secure account is used as the payment mechanism in order to protect the account holders name and the account number. The actual account in this case can be a credit card, bank card or other account or even some other payment mechanism. In this example, a secured account differs from a blinded account in that the secure code used for approving the release of funds is obtained by the consumer rather than the merchant. This example is intended to show the flexibility of the title transaction system in supporting a variety of transaction processes. In step 1802, the consumer purchases a digital content file title from a merchant, such as MerchantStore.com. In step 1804, the merchant places the titles expressing rights to the digital content files and if requested a digital receipt into the digital lockbox 1212. In step 1806 the merchant generates a sales order title and transmits it to the consumer's title manager 1208. In step 1808, the consumer then selects the desired form of payment and if a receipt is required from the merchant. In this example, the consumer would select a secured account payment option. In step 1810 the consumer's title manager 1208 transmits the sales order to the title payment provider 1214. In step 1812 the title payment provider 1214 verifies the order and account, and if the account is valid and sufficient funds are available, creates a payment slip title and transmits it back to the consumer's title manager 1208. In this example, the title enabled payment provider's title publisher 1214*b* creates the payment slip. Also in this example, the title enabled payment provider creates an approval code that the merchant can verify. In step 1814, the consumer's title manager 1208 places it into the digital lockbox 1212 which then notifies the merchant. In step 1816, the merchant's title merchant plugin 1210*d* retrieves the contents of the lockbox. In step 1818, the title merchant plugin 1210*d* verifies the payment slip title and if valid (step 1820) sends the payment slip title to the title enabled payment provider 1214. In step 1826 the title merchant plugin may capture funds from the title enabled payment provider 1214. In step 1828 the title merchant plugin sends a complete trade request to the digital lockbox. In step 1830 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 19:
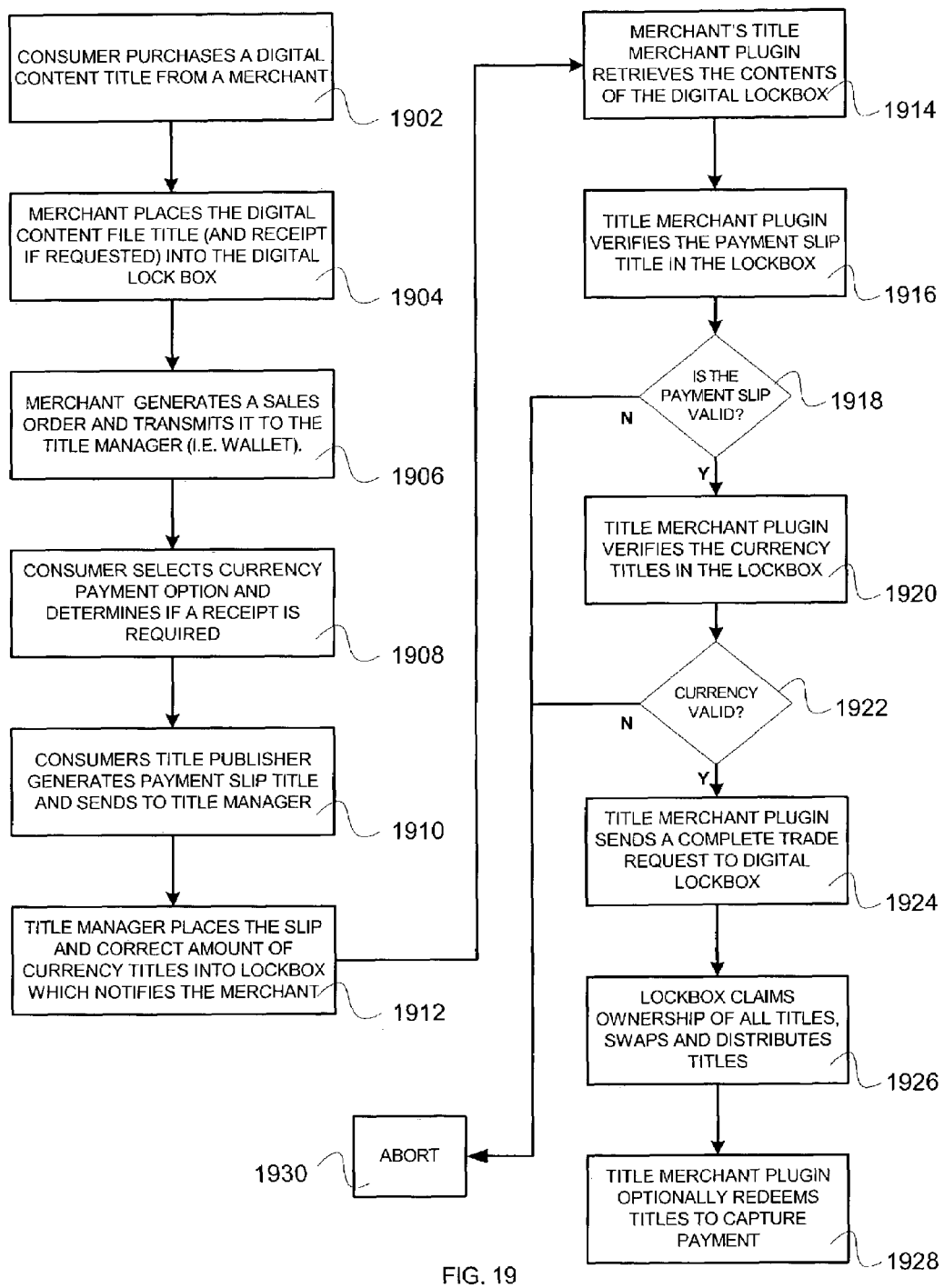

FIG. 19 is an exemplary flow chart describing the steps in which the consumer chooses a currency payment structure for the payment slip title. In this example, currency titles (such as US dollars) are used as the payment mechanism. This is similar to a physical cash transaction. The currency can be any type of currency supported by the merchant and/or their payment provider. For example, the merchant could support Euros or even reward points as valid currency. In step 1902, the consumer purchases a digital content file title from a merchant, such as MerchantStore.com. In step 1904, the merchant places the titles expressing rights to the digital content files and if requested a digital receipt into the digital lockbox 1212. In step 1906 the merchant generates a sales order title and transmits it to the consumer's title manager 1208. In step 1908, the consumer then selects the desired form of payment and if a receipt is required from the merchant. In this example, the consumer would select US dollars currency. In step 1910, the consumer's title publisher 1206 creates a payment slip title referring to the US dollar currency and in step 1912 the title manager 1208 places the payment slip title and the correct amount of currency titles into the digital lockbox 1212 which then notifies the merchant. In this example, the payment slip title is provided but maybe optional in currency title transactions since the currency titles are valid themselves and do not refer to a user held account. Additionally, the title manager 1208 can process the currency titles to ensure that the exact amount of currency titles is placed in the digital lockbox 1212. This processing depends on the currency type being supports, for instance the title manager may need to divide the currency or go through a process where in the title manager exchanges the currency in the wallet for change. In step 1914, the merchant's title merchant plugin 1210*d* retrieves the contents of the lockbox. In step 1916, the title merchant plugin 1210*d* verifies the payment slip title and if valid (step 1918) verifies the currency titles in step 1920. If the currency titles are valid (step 1922) the title merchant plugin sends a complete trade request to the digital lockbox in step 1924. In step 1926 the digital lockbox completes the trade by claiming ownership over the titles in the lockbox, swapping the titles, and distributing them to the appropriate party. In this example, the consumer may receive the digital content file titles, and the merchant may receive the payment slip title and the currency titles. The merchant can optionally redeem the currency titles to capture payment in their account as indicated in step 1928.

Figure 20:
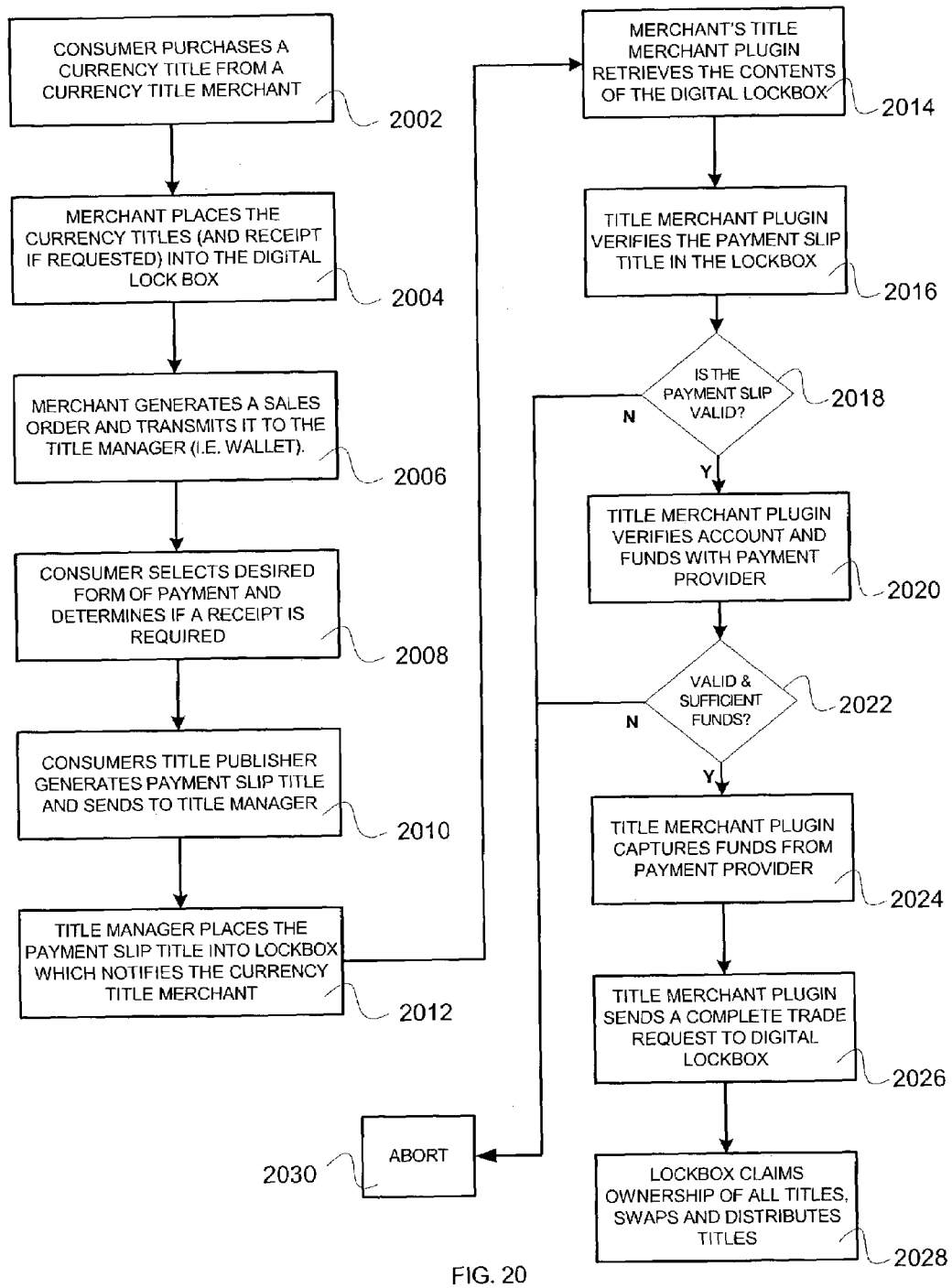

FIG. 20 is an exemplary flow chart describing the steps in which the consumer purchases additional currency title using an account payment structure for the payment slip title. In this example the user is using a credit card (identified) account in order to get currency titles. In step 2002, the consumer purchases the currency title from a merchant, such as BankStore-.com. In step 2004, the merchant places the currency title and if requested a digital receipt into the digital lockbox 1212. In step 2006 the merchant generates a sales order title and transmits it to the consumer's title manager 1208. In step 2008, the consumer then selects the desired form of payment and if a receipt is required from the merchant. In this example, the consumer selects a checking account. In step 2010, the consumer's title publisher 1206 creates a payment slip title and in step 2012 the title manager 1208 places the payment slip title into the digital lockbox 1212 which then notifies the merchant. In step 2014, the merchant's title merchant plugin 1210*d* retrieves the contents of the lockbox. In step 2016, the title merchant plugin 1210*d* verifies the payment slip title and if valid (step 2018) verifies the account and funds in step 2020. If the account is valid and sufficient funds available (step 2022) the title merchant plugin sends a complete trade request to the digital lockbox in step 2024. In step 2026 the digital lockbox completes the trade by claiming ownership over the titles in the lockbox, swapping the titles, and distributing them to the appropriate party. In this example, the consumer may receive the digital content file titles, and the merchant may receive the payment slip title.

Figure 21:
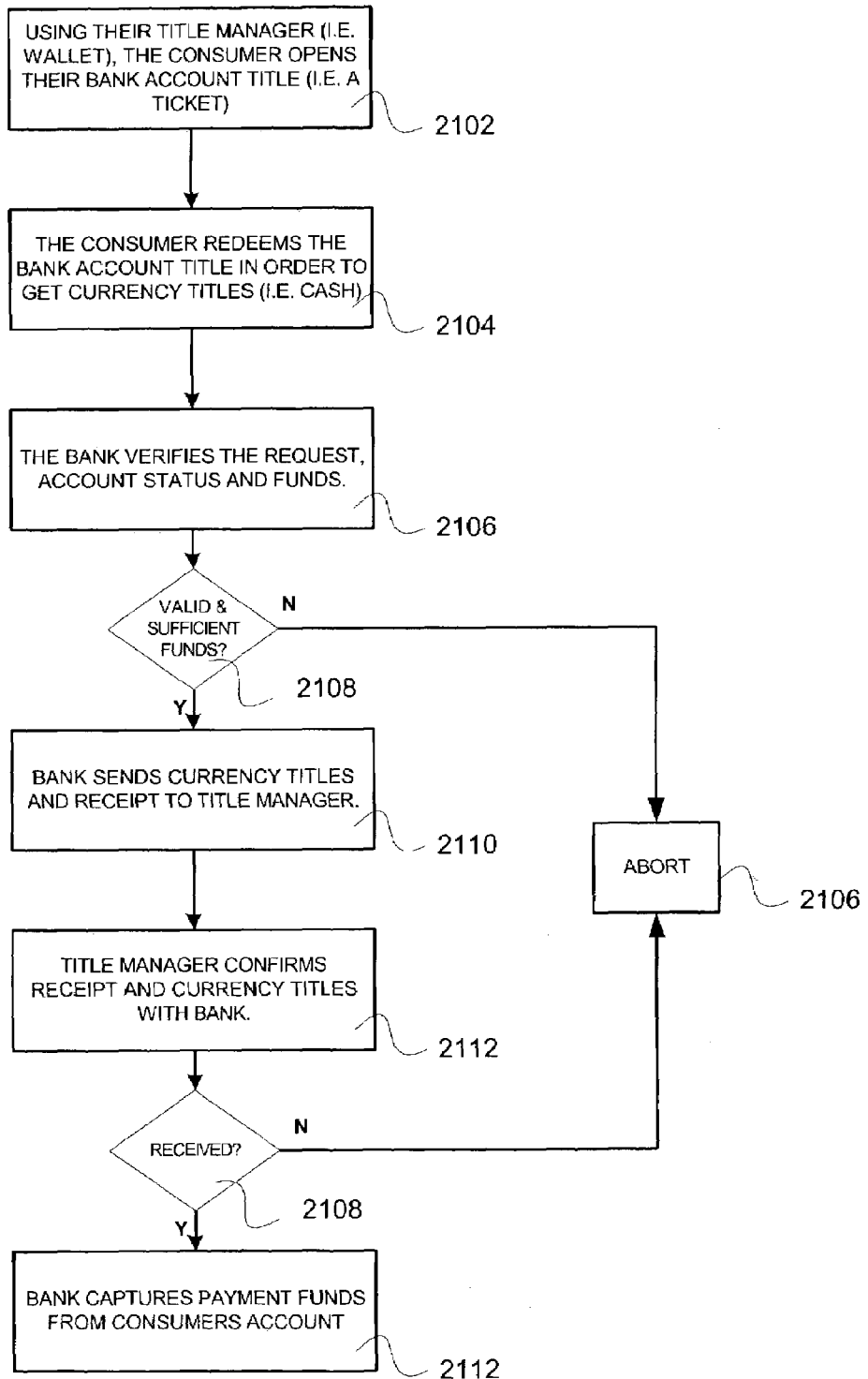

FIG. 21 is an exemplary flow chart describing the steps in which a consumer uses a bank checking account title to purchase currency titles. This flow is an alternate and simplified flow to that shown in FIG. 20 and is intended to demonstrate how a consumer can obtain currency similar to obtaining cash at an ATM. In step 2102 the consumer views their bank account title using the wallet function in the title manager 1208. Since this title accesses the consumer's checking account, it would be a ticket. In step 2104, the consumer redeems the bank account title in order to get currency titles (e.g. cash). The redemption process could be one of many redeem methods that the bank account title supports and could be displayed to the consumer simply as "get cash". In step 2106 the bank verifies the request, account status, and ensures that sufficient funds are available. The bank processes this redemption request because of the instructions contained within the title and, in this example, the bank would be title enabled similar to the merchant site 1210. If valid and sufficient funds (step 2108), the bank sends the correct amount of currency titles to the consumer's title manager 2110. If the account is invalid or insufficient funds are available, then the process is aborted in step 2106. In step 2112 the title manager confirms receipt and currency titles with the bank. If the acknowledgement is received (step 2108) by the bank, then the bank completes its end of the transaction and captures payment funds from the consumers account in step 2112.

Figure 22A:
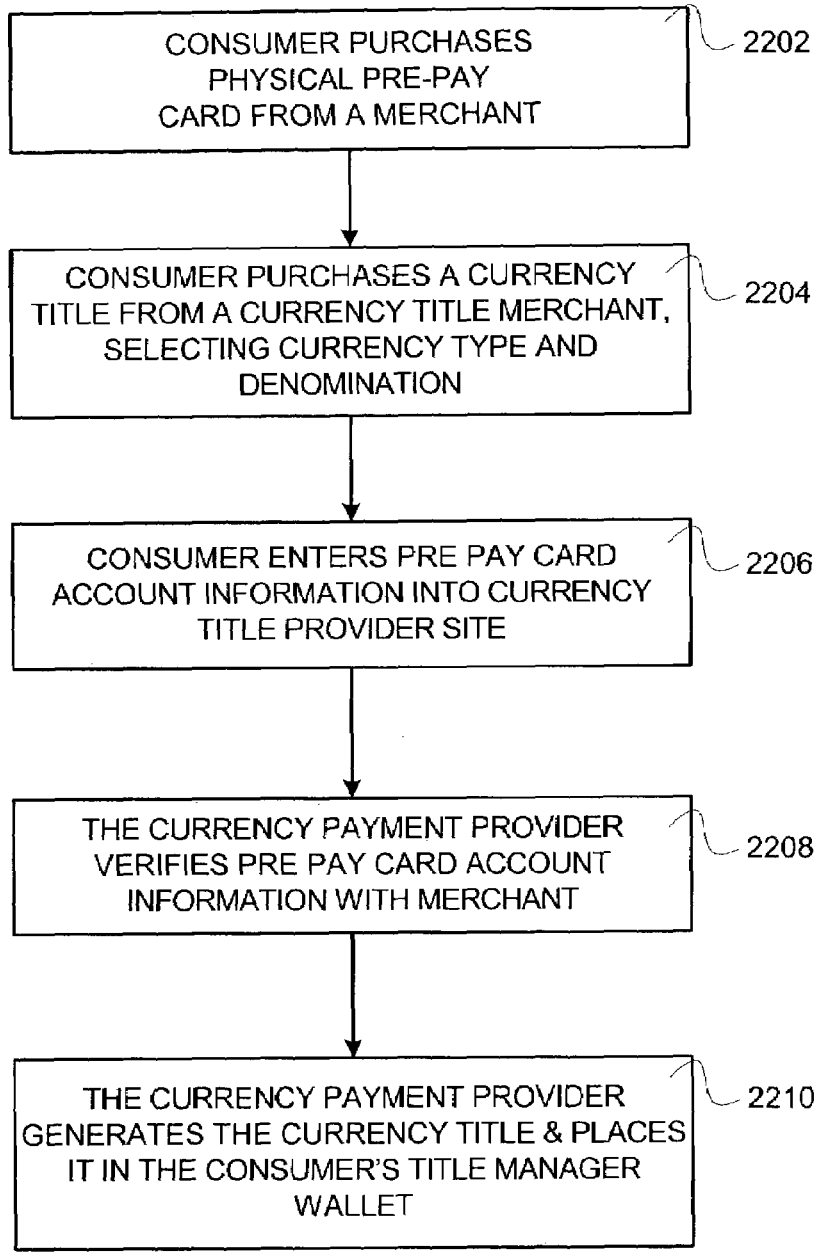

FIG. 22A is an exemplary flow chart describing the steps in which consumer uses a pre-pay card to purchase a currency title. In step 2202, the consumer purchases a physical pre-pay card from a merchant. In step 2204, the consumer then uses the pre-pay card to purchase a currency title from a currency title merchant, selecting a specific currency type and denomination, for instance, $5.00. In step 2206, the consumer enters the pre-pay card account information into the currency title provider web site. In step 2208, the currency payment provider verifies the account information with the merchant. In step 2210, if the pre-pay card is valid, the currency payment provider generates the currency title and places it in the consumer's title manager wallet.

Figure 22B:
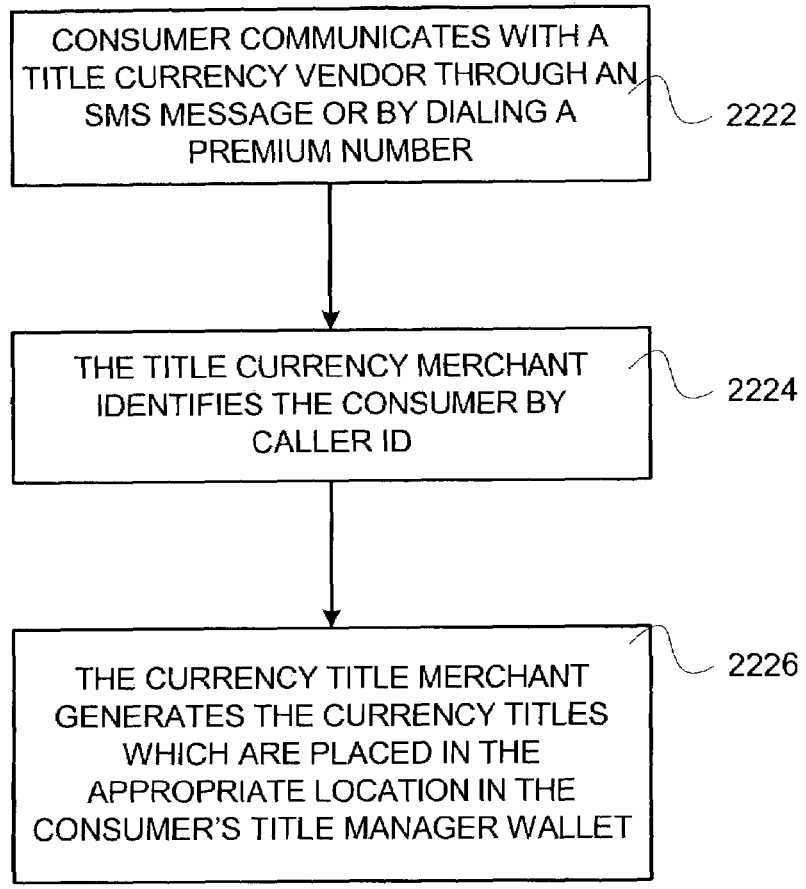

FIG. 22B is an exemplary flow chart describing the steps in which consumer bills the purchase of a currency title to a telecommunications account, such a mobile phone bill. In step 2222, the consumer communicates with a title currency vendor through an SMS message or by directly dialing the premium number. Upon receipt or connection in step 2224, the title currency merchant identifies the consumer by caller identification. In step 2226, the currency title merchant then generates the currency title which is placed in the appropriate location in the consumer's title manager wallet.

D. METHODS OF FACILITATING CONTACT MANAGEMENT

Figure 23:
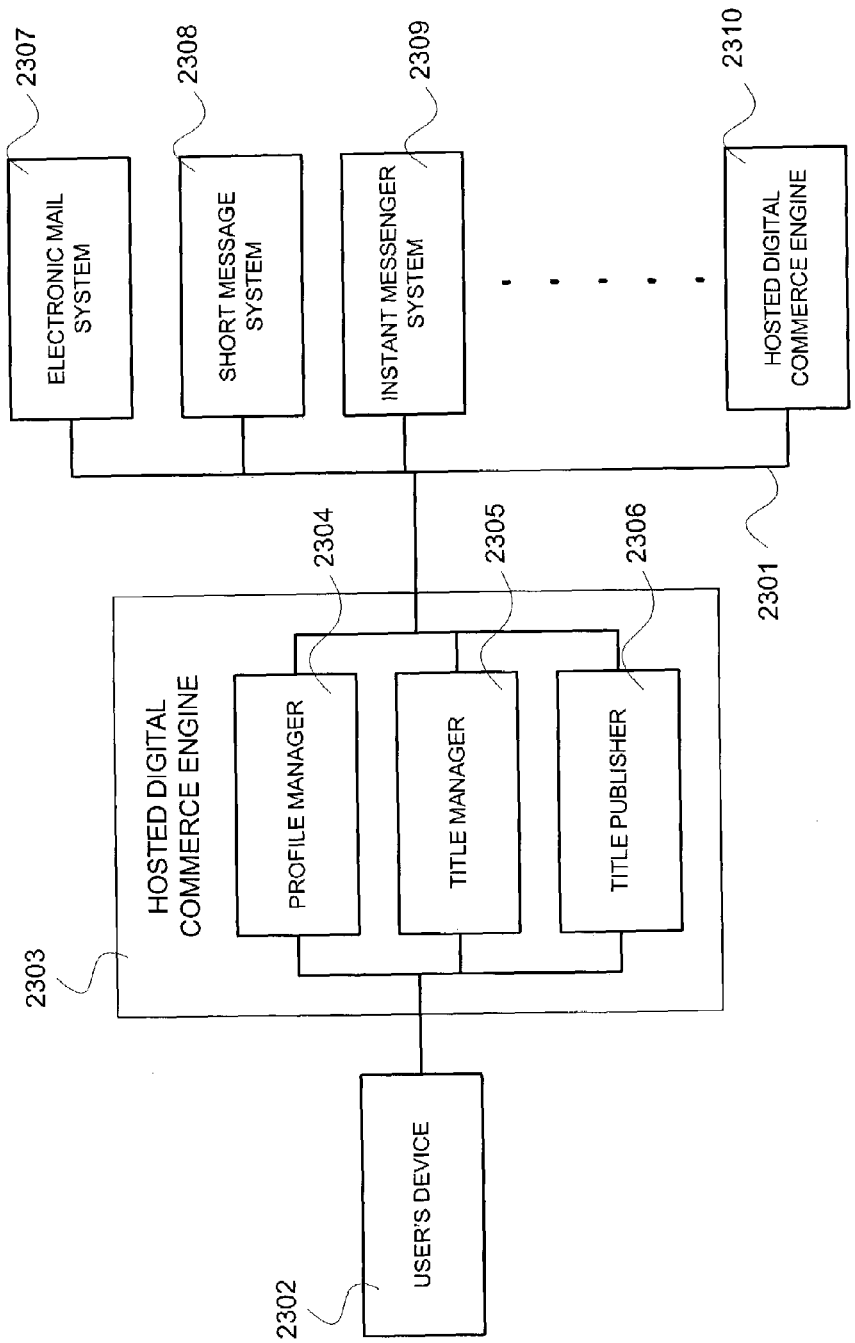
FIG. 23 depicts a simplified diagram in which an online contact management system is optimized through the redemption of titles, according to an embodiment of the invention.

FIG. 23 depicts a simplified diagram according to one embodiment of the invention, in which an online contact management system is optimized through the redemption of titles.

The exchange of paper business cards has been a familiar part of business for many years. The advent of the Internet enabled business cards to be digitized, and the exchange to be electronic. And while this was certainly easier and faster, digital business cards still suffered from the static content inherited from paper business cards. Previously, there had been no optimal way to update transmitted digital business cards short of permanently maintaining distribution lists and re-transmitting the updated digital business cards themselves.

FIG. 23 is an exemplary diagram of an online contact management system. This system is comprised of a user's device 2302, a hosted digital commerce engine 2303 that supports a profile manager 2304, title manager 2305, and title publisher 2306, as well as an electronic mail system 2307, a short message service system 2308, instant messenger system 2309, and additional hosted digital commerce engine 2240. While only these exemplary examples are depicted, any number can be supported by the invention. Each of the system elements is coupled to the other using a network protocol 2301, such as TCP/IP over the Internet.

The hosted digital commerce engine 2303 (DCE) is intended to depict an example implementation of the invention whereby the DCE hosts the title enabled systems on behalf of consumers that use devices 2302 to access the DCE. The title enabled systems include the profile manager 2304 that stores and manages the consumers profile information including their contact information, the title manager 2305 that stores and manages the consumer's titles, and the title publisher 2306 that generates titles for the DCE. In other embodiments of the invention, these title enabled systems may reside independently of each other, or even be integrated into a desktop application.

The electronic mail system 2307, short message service system 2308, and instant messenger system 2309 depict external systems that can be used to transmit and deliver titles to other consumers that may or may not use an online title enabled solution. Each of these systems would transmit Titles using their own network protocols and network systems. For example, an electronic mail system 2307 can deliver a title as an attachment to an electronic message using the SMTP protocol. The recipient can retrieve the message using the POP3 protocol, and open the attachment in a title enabled application.

An additional hosted digital commerce engine 2310 is shown in FIG. 23 to demonstrate that consumers on separate DCEs can share contact information between each other. In this case the hosted digital commerce engine 2310 provides the same title enabled components and service as the first engine 2303.

As previously described, a title is an object that may have a number of elements and attributes including embedded digital content, ownership attributes, and copy permissions. In this example, a contact title can redeem a single contact record, such as an electronic business card, or a contact list composed of multiple contact records, as in business directory. The contact record contains information that would be commonly found in a business card, such as full name, company name, address, phone number, email, etc. The contact title comprises as a pointer to the location of the contact record or contact list. That is, it directs the title management system to the specific online profile manager 2304 upon which the contact record or contact list resides.

For instance, a contact owner creates a single contact record and stores it on a specific profile manager 2304. The owner then requests a contact title, which would then be generated by the title publisher 2306 and stored in the title manager 2305 for distribution by the contact owner to users. Users could then use the contact title to redeem the latest contact record whenever needed.

The profile manager 2304 can store any type and quantity of information on behalf of the user including business, personal, financial, preference, and emergency information. Furthermore, any variation of contact titles can also be generated by the title publisher 2306 on behalf of the user. The titles can be any number of tags, tickets, or tokens as deemed necessary by the user. For instance, a tag can be published that points to business contact information as described previously. This tag can then be freely copied and distributed to other business recipients. By redeeming the tag, the recipient will only be able to dynamically read the business contact information from the profile. Alternatively, a ticket can be published that points a trusted business associate to financial information. This ticket can be redeemed by the business associate to dynamically read certain financial records within the profile to support the users business needs. Another example would be to give a ticket to a spouse in order to read and update certain profile records.

Figure 24A:
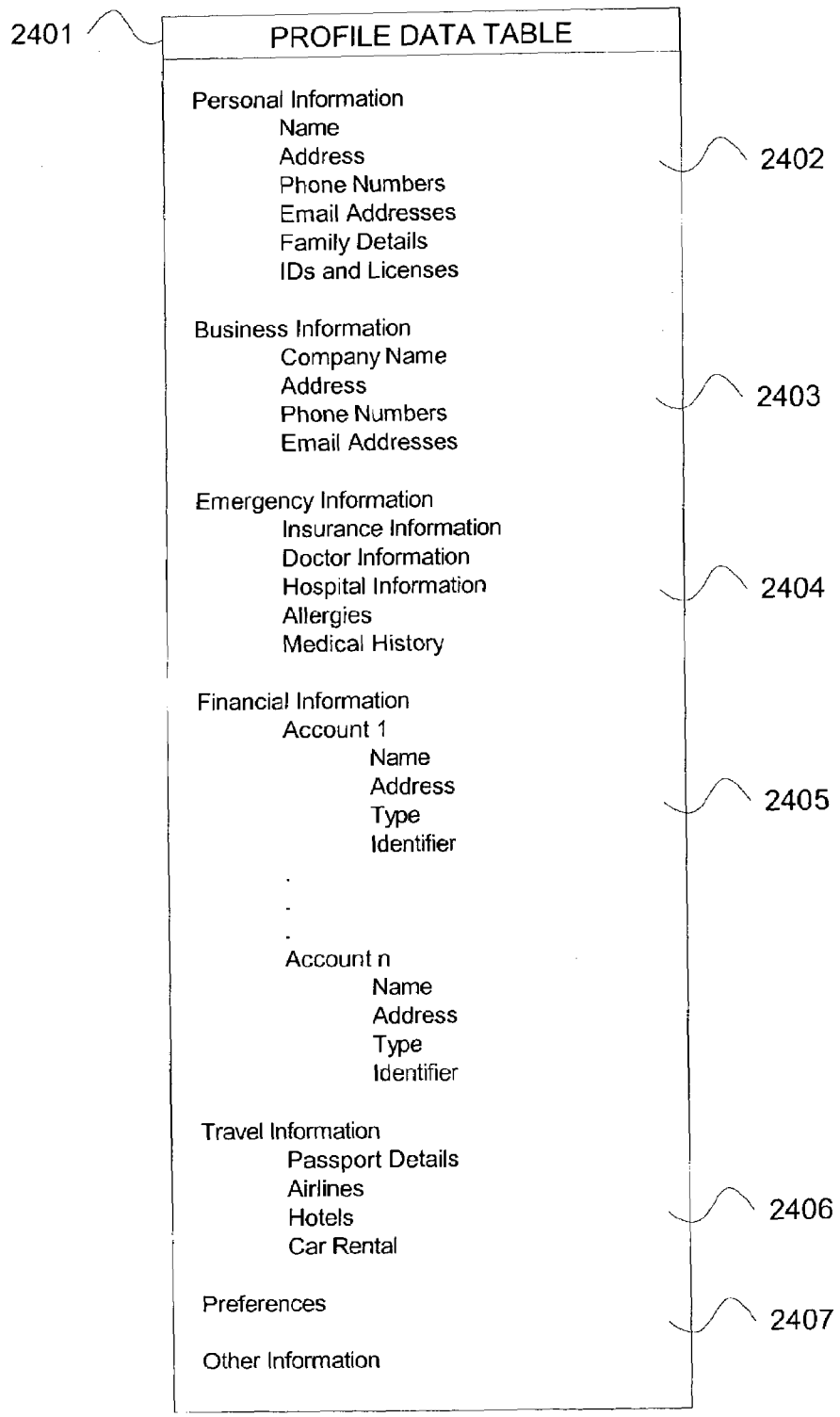

FIG. 24A provides an example of a profile data structure 2401 that would be stored by and managed by the profile manager 2304, as shown in FIG. 23. The profile data will be based on a well defined schema that can vary from implementation to implementation. Generally the structure of the data will be flexible to accommodate a variety of information and data types. As shown in FIG. 24A, the example data structure consists of several profile sections. The personal information section 2402 provides personal information on the user, including name, address, and contact information. The business information section 2403 provides business information including company name, address, and contact information. The emergency information section 2404 provides emergency information on the user such as medical insurance numbers and doctor contact information. The financial information section 2405 provides financial information on the user such as bank accounts and credit cards. The travel information section 2406 provides detailed information on the users travel related activities such as preferred airlines, reward programs, and car rental agencies. The preference section 2407 will provide a list of preferences of the user including system preferences, interface preferences, and notifications. Other information can be contained in the profile. Additionally, each informational element within the profile can be a pointer to an external system, third party profile system, or even a title.

Figure 24B:
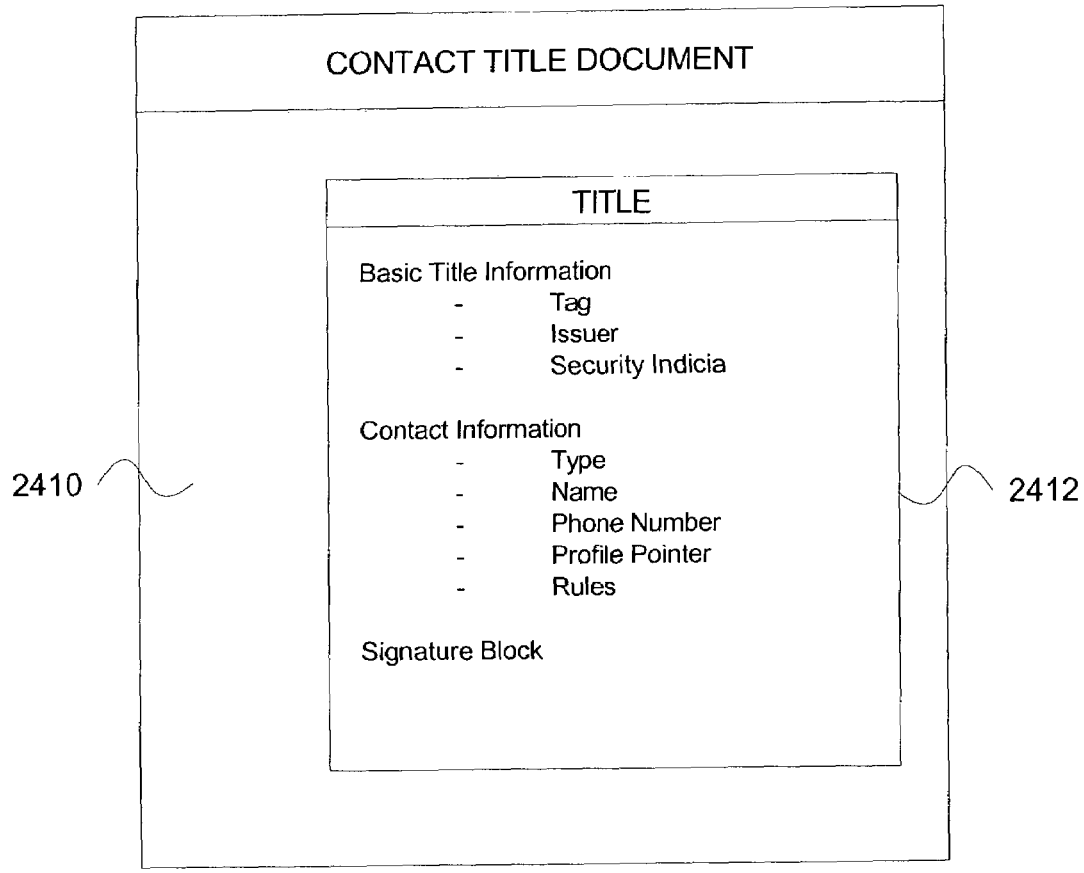

FIG. 24B is an exemplary diagram depicting a contact title. The contact title 2410 provides a pointer back to the profile stored in the profile manager 2304. In this example, the contact title 2410 is a tag and can be freely copy and distributed. Since the title is a tag it does not have an authenticator stub. The title portion of the document contains basic title information including issuer and any applicable security indicia. The contact information 2412 portion of the title would be contained with content elements within a title. The contact information 2412 provides basic information on the contact as well as a pointer to the actual profile. The basic information can contain simple contact information for reference purposes and in the event that the online profile is not available and no cached copy is available. The contact information 2412 portion of the title also contains a rules element that defines any usage rules regarding the profile such as what information, when it can be obtain, and how it maybe obtained. Furthermore, this element can contain a query statement or even many query statements restricting or opening the information available to the owner of the contact title. The query statement or statements can be used by the profile manager 2304 to execute queries against the profile database. The integrity of the queries can be protected within a title by the title infrastructure or even by an applied digital signature. If confidentiality of the query is required, then an appropriate encoding structure can be implemented and conveyed within the title.

Figure 24C:
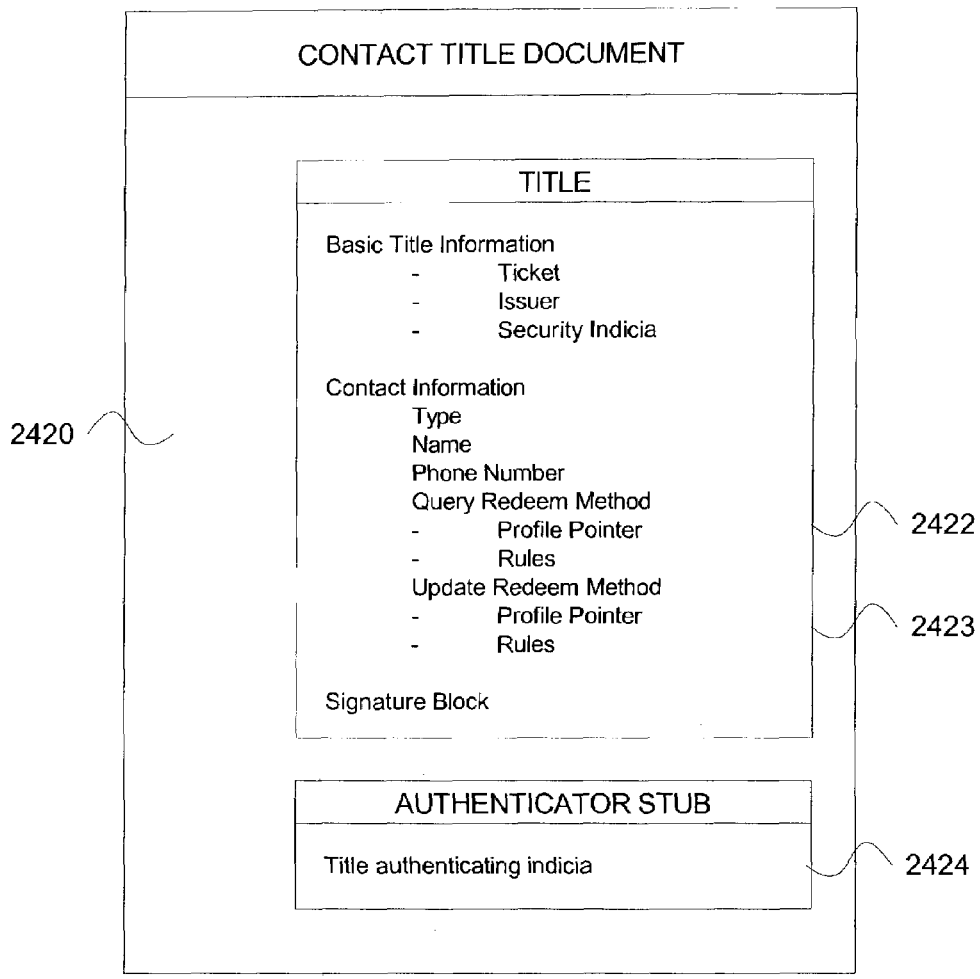

FIG. 24C is an exemplary diagram depicting another contact title. This contact title is a ticket and provides two distinct redemption methods. This differs from the previous example in FIG. 24B which had a single query redemption method. The query redeem method 2422 allows the owner of the ticket to query the profile to obtain information. The update redeem method 2423 allows the owner of the ticket to update the information contained within the profile. This structure provides very fine grained control over the viewing and updating of information within a profile. It is also an efficient structure with which to implement confidentiality policies in that certain people cannot view information but are allowed to enter or update information. Such a policy maybe implemented in government agencies or even in corporations where highly confidential information can be entered but not viewed after it has been committed. The rules and query statements can be applied to the title as a whole and/or separately within the redeem methods. Since the title depicted in FIG. 24C is a ticket it will have an authenticator stub 2424.

FIG. 24D depicts an exemplary contact title table according to an embodiment of the invention. The contact title table 2423 will be used by a title manager 2305 to store all titles obtained by the user including contact titles. These titles maybe stored separately from other titles as shown in FIG. 24D or stored as one large collection of all the user's titles. As shown in FIG. 24D the table can contain any number and type of contact title including tags 2425 and tickets 2427.

Contact titles can refer to individual contacts or a list of contacts, or set of lists of contacts, or even to other contact titles. This allows groups to be established and easily shared among members, with each member gaining controlled and granular access to dynamic and up to date information on other members. These types of titles would be similar in structure to the titles shown in FIG. 24B and FIG. 24C and would also be stored and managed by the title manager 2305. The rules within these titles can establish dependencies such as the user must be a member of the group in order for the title to be valid. Furthermore, these types of titles can be used between hosted digital commerce engines 2303 for collaboration, backup, and redundant operations.

Figure 25:
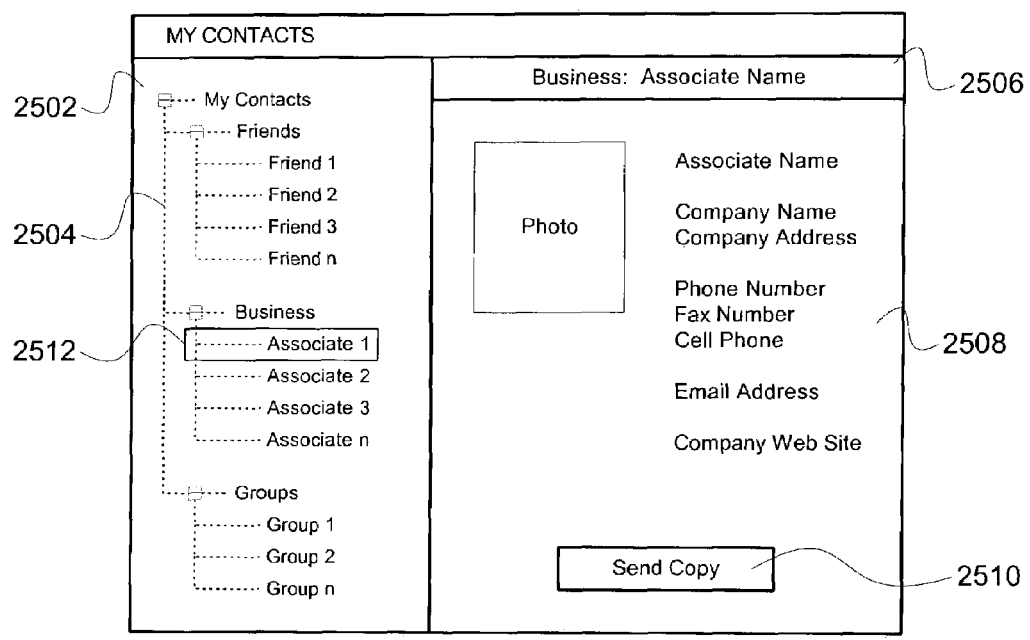
FIG. 25 depicts exemplary title management displays according to an embodiment of the invention.

FIG. 25 displays a simplified online title manager interface as would be displayed in a browser on user's device 2302, as described in FIG. 23. The display is divided into two sections, a title folder pane 2502 and a title content pane 2506. The tile folder pane 2502 further organizes the titles into folders based on the type of contact 2504. In this example only contact titles are displayed since it is assumed the user would be viewing their contact information rather than viewing all titles in their repository. Examples include friends, business, and group contact lists. Other types of categorizations can be setup by the user based on the taxonomy of the titles. The title content pane 2506 presents the contact details 2508 referenced by the selected contact title 2512, such as name, company name, company address, telephone number, fax number, cell phone number, email, and a picture. If permissible, the user can send a copy of the contact information to another associate or friend by selecting the send copy button 2510 on the interface. By sending a copy, the user is sharing the contact information and this would only occur if allowed by the title. It is assumed for this example, that the title is a tag and can be freely copied. If the title was a ticket or token, then a shadow copy may be allowed to be shared that provides anyone with a shadow copy to have very limited contact information, but not the full access privileges of the original ticket or token. This method of sharing information is more convenient, flexible and controlled than traditional or historical physical or electronic methods.

Figure 26:
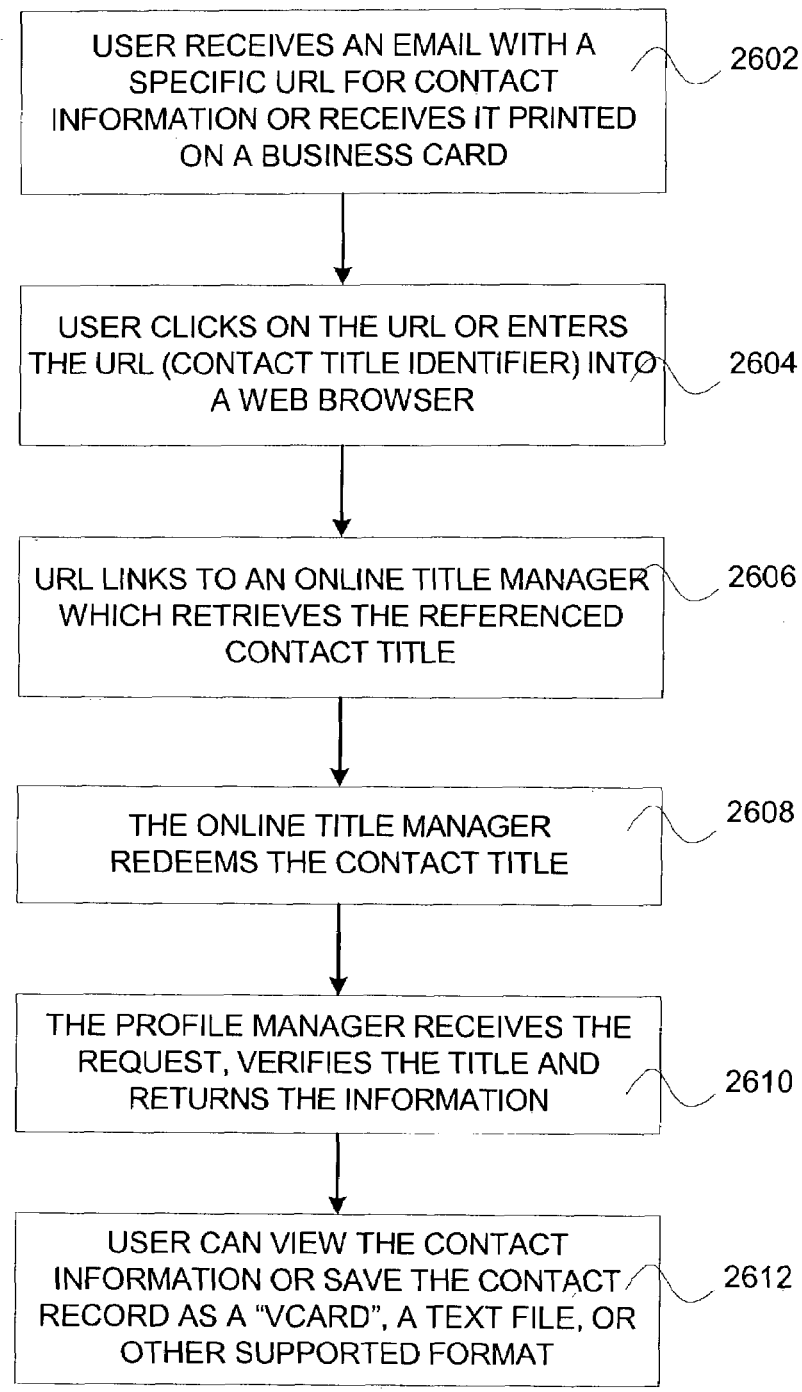
FIGS. 26-28 are flow charts showing steps for facilitating contact management, according to an embodiment of the invention.

FIG. 26 displays a simplified flow chart describing the steps in which a user redeems a contact record (i.e. certain profile information elements) with the contact title identifier. Each contact title has a unique alphanumeric string associated with it, called a contact title identifier. This contact title identifier can be expressed as a URL and by entering this URL (i.e. a string) into the address on the web browser, the contact title, and hence its contact record, can be redeemed, displayed, and downloaded. The user does not even need to be aware of the existence of title management system at all, simply entering the contact title identifier into a browser. This example assumes that the actual title is a tag that is readily available, or the user will be accessing a shadow copy of a ticket or token. This example is useful for sharing contact information outside of the title ecosystem. In step 2525, the user receives an electronic message with a URL linking to an associates business contact information. The URL is a unique identifier for the contact information and can even be printed on a physical business card. An example of the URL can be http://somedce.com/contact?id=xxxx-xxxx-xxxx-xxxx where the id can be a specially encoded sequence of characters that becomes the unique identifier. In step 2527 the user clicks on the URL link in the email message or enters the URL into the address field of their browser. By clicking the link the user is connected to an online title manager 2305 which in turn retrieves the title referenced by the unique identifier as indicated in step 2536. In step 2538 the title manager 2305 redeems the title. In step 2540 the profile manager 2304 verifies the title and if valid retrieves and returns the information according to the rules within the title. In step 2542 the user views the contact information in their browser and can optionally (if supported) save the contact information as a v-card, text file or other supported format.

Figure 27:
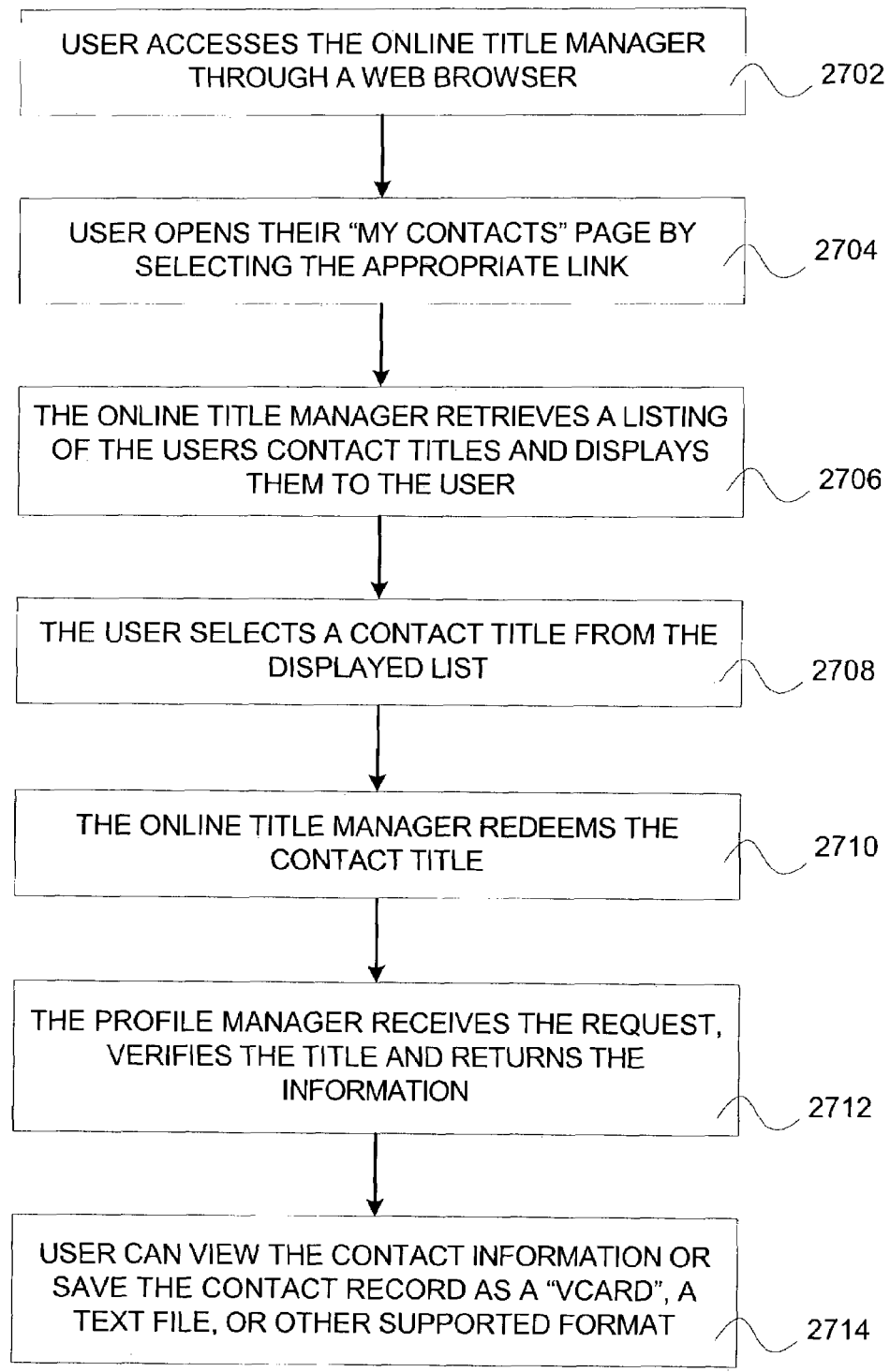

FIG. 27 displays a simplified flow chart describing the steps in which a user views a list of their contact titles and redeems a contact title. In this example, the user is registered with the DCE 2303 and uses title manager 2305, as shown in FIG. 23. In step 2702, the user accesses the online title manager through a web browser. In step 2704, the user opens their "my contacts" page by selecting the appropriate link. In step 2706, the title manager 2305 retrieves a listing of the users contact titles and displays them to the user in a view similar to that shown in FIG. 25. In step 2708, the user selects a contact title from the displayed list. In step 2710 the online title manager 2305 redeems the contact title. In step 2712, the profile manager (in another DCE such as 2240) receives the request and verifies the title. If the title is valid, the profile manager retrieves and returns the contact information according to the rules within the title. In step 2714, the use views the contact information in their browser and can optionally (if supported) save the contact information as a v-card, text file or other supported format.

Alternatively, the user can use an application such as a Microsoft Windows application (e.g. Microsoft Outlook) or a Macromedia Flash application to access the title manager and request title listings. In this case, these applications can have the added benefit of caching contact information, to enhance performance, reduce network traffic, and work offline. In this case, the application can retrieve contact information as the user requests and cache it for further reference, or can automatically retrieve contact information in the background and update it on a frequent and scheduled basis. This type of support allows the user to remove their device 2302 from the network and still view contact information. Another alternative is to have the title management functionality incorporated directly into the application along with the title data table.

Figure 28:
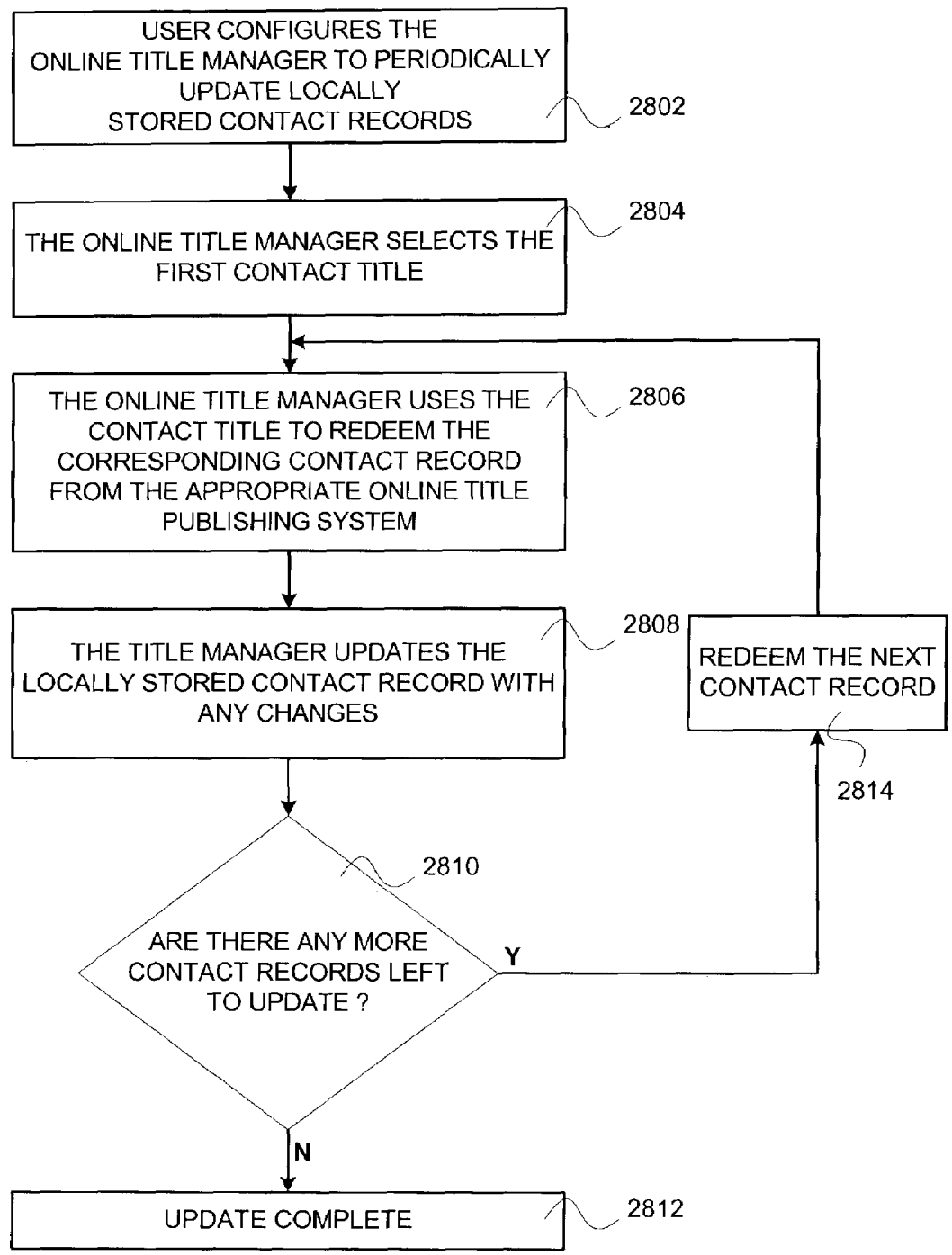

FIG. 28 displays a simplified flow chart describing the steps in which the online title manager works with a locally run application to automatically update locally stored contact records with contact information. In step 2802, the user configures the online title manager to periodically update locally stored contact records. In step 2804, the online title manager selects the first contact title 2804. In step 2806, the online title manager uses the contact title to redeem the corresponding contact record from the appropriate online title publishing system. In step 2808, the title manager updates the locally stored contact record with any changes 2808. Step 2810 determines if any more contact records are left to update. If so at step 2810 then at step 2814, the next contact record is redeemed. If not at step 2810, then the update is complete at step 2812.

E. TITLE STRUCTURE & MANAGEMENT

In another embodiment, a title structure is employed to optimize the description, creation, management and use of titles. Although, the structure of title objects as described herein maybe representative of certain technologies and formats such as XML, this is only as an example and to demonstrate one embodiment. A title object can be represented in a number of formats including XML, ASN.1, or other proprietary formats including textual and binary structures.

Although certain examples of the title structure are presented, the structure is intended to represent any number of digital and physical assets such as digital content, including music, images, video, and text, as well as physical goods such as computers, cameras, vehicles, and appliances. Furthermore, a title can be used to represent virtual assets such as an online experience created through a series of activities and events, and can also represent currencies such as cash. In one an embodiment, a title structure can be used to represent both a digital and physical asset such as the identity of a person, whereby the person has physical assets associated with their identity and also digital assets associated with their identity.

Figure 29:
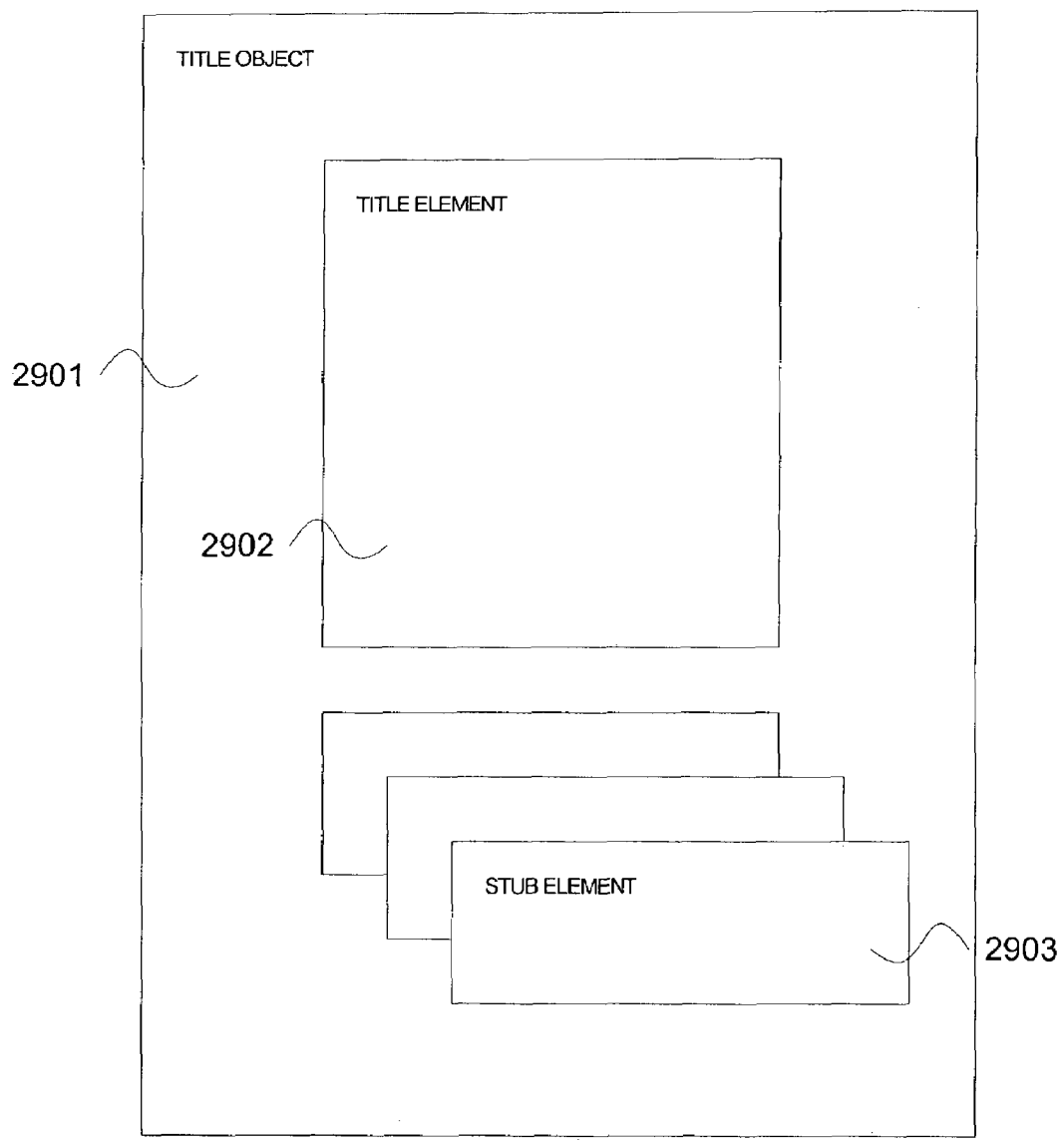
FIG. 29 depicts a title object in which a set of stub elements are employed to optimize titles, according to an embodiment of the invention.

Referring now to FIG. 29, title object 2901 is displayed in which a set of stub elements 2903 are advantageously employed to optimize titles. Although several stub elements are displayed within the title object, in other embodiments, a title object may have no stub elements or may just have one stub element.

In one aspect of the invention, a set of stub elements can be coupled to a specific title, to further optimize a title's content, attributes, and security indicia. In another aspect of the invention, a stub element can be created and coupled to the title, after the title is created. In yet another aspect of the invention, a stub element can be coupled to a set or group of titles as specified in the stubs binding information. This permits efficient coupling of stubs to titles.

Title element 2902 comprises a structure used to describe the title and the content (or asset), and express the rights associated with title object 2901. Title object 2901 can be issued for a specified period of time or can be left infinite. The integrity of title object 2901 can be further protected by the use of cryptographic algorithms. In one embodiment, a digital signature is used. In another embodiment a chained hash is used. Information within title element 2902 can be overridden by information contained within stub element 2902, as long as stub element 2902 was issued by the same entity as title object 2901, and further specifies what information is being overridden. In another embodiment of the invention, the issuer of a title object can delegate authority, thereby permitting other authorities to issue stubs on its behalf.

In one embodiment, title element 2902 is the only substantial piece of a title object 2901 that can be stored in a lockbox and inspected by participating parties in a trading transaction. This embodiment provides for separation between the descriptive information provided within a title element (2902) and security indicia, and/or content, and/or additional value-add information that maybe contained in stub elements (2903) that are coupled to the title. As an example, an effective separation permits trading parties to inspect the title that is being traded without comprising the security of the security indicia.

Stub element 2903 is a flexible extension mechanism to the title object 2901, and can be used to convey any related and appropriate information such as value-add content or additional rule processing. Each stub element 2903 can be issued and signed by different entities and can have different lifetimes. In one embodiment, stub element 2903 is optional for a tag. In another embodiment, an authenticator stub must be included for all valid tickets and tokens. The authenticator stub contains the security indicia that are used to authenticate a valid instance of a ticket or token.

Figure 30:
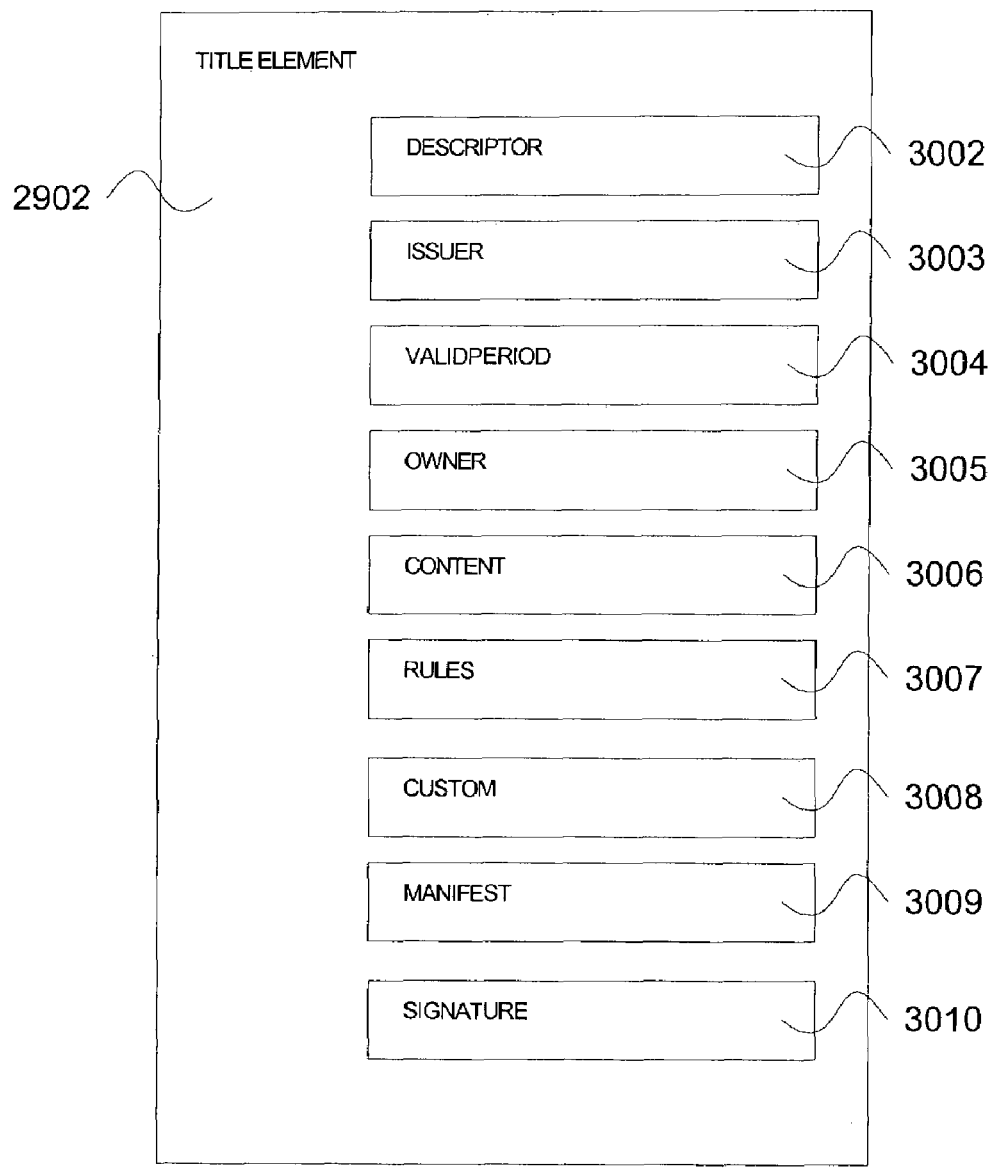
FIG. 30 depicts a simplified diagram in which components of title element are further displayed, according to an embodiment of the invention.

FIG. 30 depicts a simplified diagram according to one embodiment of the invention, in which components of title element 2902 of FIG. 29 are further displayed. Descriptor component 3002 comprises primary descriptive information regarding title object 2901 of FIG. 29, including ID, type, name, description, membership, and other technical elements used for processing. Issuer component 3003 comprises the "issuer" (e.g. the creator) of title object 2901. In one embodiment, issuer component 3003 can comprise a textual name string. In another embodiment, issuer component 3003 can comprise an alpha-numeric ID string. The textual name string can be informal or formal in context to participating parties, and if formal, may follow standard naming conventions such as an Internet Domain Name or even an X.500 Distinguished Name. Validperiod component 3004 comprises the range of dates of which title object 2901 is valid. In one embodiment, validperiod component 3004 includes a valid from date and valid to date. This time frame can further be specified as a UTC time value. Furthermore, the validity period of title object 2901 may be extended by attaching a stub element 2902 that overrides validperiod 3004.

Owner component 3005 comprises any valid type of identity indicia in context to the applications that create, manage, and use titles. The identity indicia maybe formal or informal depending on the requirements for the applications. For example, the identity indicia for the owner can be a name, email, phone number, X.500 Distinguished Name, user ID, tag pointer, etc. The identity indicia can include technical detail used to authenticate the owner. For example, the identity indicia may provide technical detail sufficient for an application to prove identity through the use of X.509 digital certificates or through the use of a biometric device. Similarly, the invention can utilize the identity indicia to instruct an application relying on the title to properly authenticate an owner through trusted sources such as a remote access server, or through a domain controller and rely on that trusted sources to properly authenticate the owner using standard means such as username and password. In one embodiment, owner component 3005 is optional for a tag and a token, but is required for a ticket.

Content component 3006 can comprise applicable information pertaining to an asset such as a digital content file associated with title object 2901. In one embodiment, content component 3006 comprises a pointer defining the location of the digital content file. In another embodiment, content component 3006 comprises a query that can be used to obtain the digital content file. Content component 3006 can further comprise additional information such as ID, name, creator, rating, etc. A single title object 2901, as shown in FIG. 29, can express rights to multiple digital content files, with the information regarding each in separate content components 3006. For example, a title object 2901 can express rights to a music album where the album is comprised of multiple songs, sheet music, pictures, and lyrics. Each content piece such as a song or lyrics in this case can be described in multiple content components 3006. In one embodiment, the content component 3006 can provide detailed information relating to a physical asset instead of a digital asset. In this case, sufficient information is contained within the title content component to identify the physical asset such as SIC, manufacturer, manufacturer ID, model number, serial number, etc. In another embodiment, the content component can contain industry or technology specific identifiers such as that used by the IANA, Rosettanet or even technologies specifications such as RDF.

Rules component 3007 comprises statements specifying the specific rules that are applied to the use of the title, as well as procedures for monitoring events associated with title object 2901, as shown in FIG. 29. In one embodiment, XSLT statements are used to define the rules and are executed in a compliant XSLT processor. In another embodiment, XrML statements are contained within the rules component to express rights associated with the title. In another embodiment, application specific rules are expressed in a proprietary format within the rules component 3007 and can be executed by applications that understand, interpret, and execute the rules. In another embodiment, the rules can be expressed through pointers, references, and links such as the rules component 3007 containing a set of URI references to rule logic contained within a dictionary. The rules component can contain business logic associated with the title and are not exclusively used for access control, authentication, or rights expression. Business logic rules can be incorporated for additional processing, pre-processing, event processing, triggers, callbacks and other business logic that maybe associated with the title. For example, rules can be implemented to perform event processing based on a certain action being taken, or a specific state of the title. The rules expressed within this component can trigger off certain state information that maybe contained within stub components along with information contained within the title. The rules can even be used to query information on other systems in order to perform a certain event. Rules component 3007 may have attribute elements provided within its structure for properly identifying the rules language that is being described.

Custom component 3008 comprises custom information desired by title object 2901 publisher. In one embodiment, custom 3008 can contain any text and/or valid XML, which in turn can be referenced throughout title element 2901 or stub element 2902. The custom component may also contain pointers, references, or links to additional information or resources that are applicable to the title object.

In one embodiment, manifest component 3009 comprises reference information that must be included as part of title object 2901. For example, if a stub element must be included along with title object 2901, then it could be referenced here. In another embodiment, external data that must be included as part of title object 2901, can also be referenced within the manifest component. Applications that process the title can also process the content or referenced content within the manifest, and in another embodiment use this manifest as part of an integrity check of the title object.

Signature component 3010 comprises cryptographic information used to verify the integrity of title element 2902. In an embodiment of the title object, the signature component can be an XML Digital Signature block in compliance with the W3C. In another embodiment, the signature component may contain proprietary cryptographic information used to verify the integrity of the title, as well as provide functionality generally associated with digital signatures.

Figure 31B:
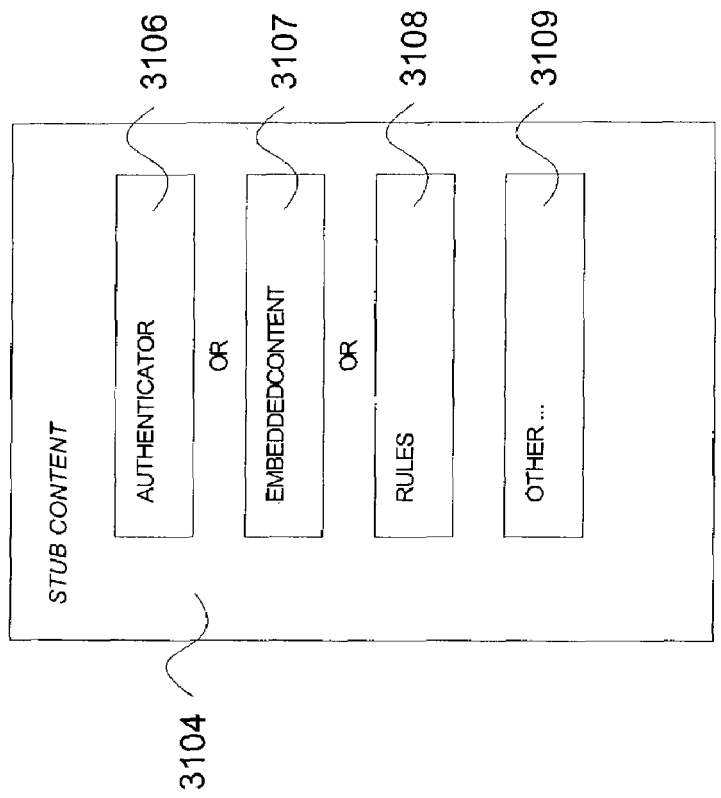
FIGS. 31A-B depict simplified diagrams of components of the stub element, according to an embodiment of the invention.
Figure 31A:
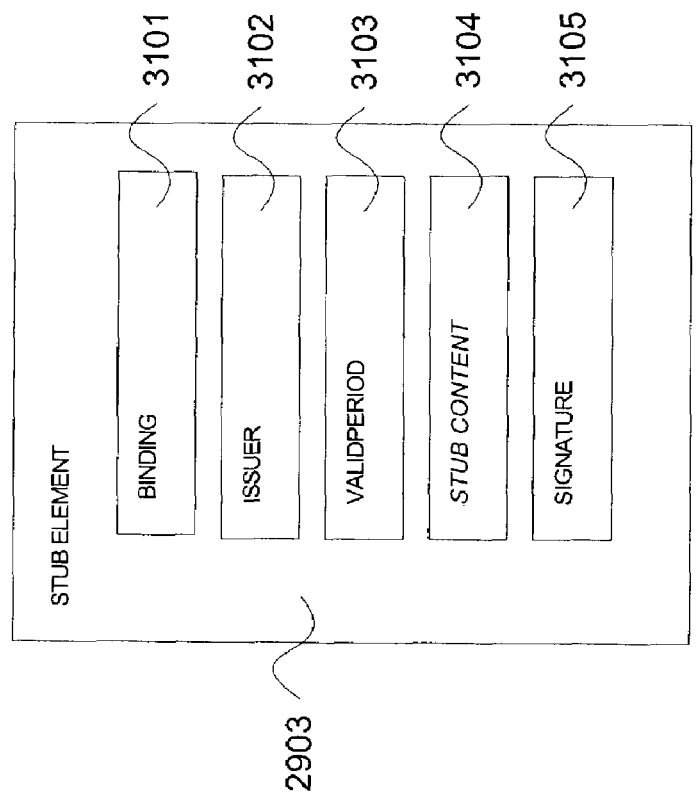

FIGS. 31A-B depict simplified diagrams according to one embodiment of the invention, in which components of stub element 2902, as shown in of FIG. 29, are further displayed. Referring now to FIG. 31A, binding component 3101 comprises detailed information on how a stub will be bound to a title or set of titles. In one embodiment, the binding information can be as simple as a single title ID. In another embodiment, the binding information can be a complex statement where the stub is bound based on a set of properties or parameters. Another embodiment can bind a stub to a title or set of titles based on a specific reference such as an XPointer. Issuer component 3102 comprises the "issuer" (e.g. the creator) of stub element 2902. In one embodiment, as with issuer component 3003, as shown in FIG. 30, issuer component 3102 can comprise a textual name string. In another embodiment, issuer component 3102 can comprise an alpha-numeric ID string. The textual name string can be informal or formal in context to participating parties, and if formal, may follow standard naming conventions such as an Internet Domain Name or even an X.500 Distinguished Name. Validperiod component 3103 comprises the range of dates of which stub element 2902 is valid. In one embodiment, validperiod component 3103 includes a valid from date and valid to date. This time frame can further be specified as a UTC time value. Signature 3105 comprises cryptographic information used to verify the integrity of stub element 2902 utilizing similar conventions to the signature component 3010 in the title element.

Referring now to FIG. 31B, stub content component 3104 as shown in FIG. 31A is further described. In one embodiment, authenticator component 3106 comprises information that can be used by title transaction system applications to authenticate title object 2901. In another embodiment, authenticator component 3106 can verify that title object

2901 is a valid, single instance of a title object. Tickets and tokens within the title ecosystem will have authenticator stubs associated with the title in order to properly authenticate the title object, and validate that it is the correct instance of the title object. In another embodiment, a tag or shadow title may not have an authenticator stub as it may not be required for authentication and validation. In this example, a shadow title would be a title that is a "copy" of the valid and authenticate title, although by itself is not valid. Shadow titles, in this instance, are valuable techniques for sharing content, such that a shared title can still give the recipient access to sample information, or limited content such as a restriction for one time only use, or access to a low quality version of a song. In an embodiment, the authenticator stub contains the security indicia associated with the title, and the structure of the security indicia would be dependent on the authentication technique applied by the publisher of the title.

In one embodiment of authenticator component 3106, a chained hash technique can be employed to authenticate the title. Authenticator component 3106 would contain the encrypted seed for the hash, a copy of the current valid hash in the hash chain, and an algorithm identifier, all of which would be used by a state server to authenticate the title in conjunction with an index that the state server maintains. In another embodiment, a hash tree can be implemented within the authenticator stub to support divisible titles. The hash tree technique can be employed by titles that represent cash or some form of currency that can be divided.

In another embodiment, stub content 3104 comprises embeddedcontent 3107, which can further include a digital content file. Embeddedcontent 3107 can be also be used by issuers who wish to provide an option to their customers for embedding content directly into title object 2901. Advantages includes additional functionality in processing title object 2901 (for example, while executing a trade only title objects are included in the lockbox, therefore eliminating any potential security exposure by having embedded content directly inside the title object 2901). In another embodiment, the embeddedcontent can contain textual information or even XML structured information.

In another embodiment, stub content 3104 comprises rules component 3108. In another embodiment, a rules component 3108 procedure can override rules component 3007 procedure, as shown in FIG. 30. The structure of the rules would be similar to that of the rules component 3007 in the title element.

Other component 3109 comprises other functionality that may be included in stub content 3104 and defined by the publisher of the title and understood, interpreted, and processed by applications involved in the title transaction ecosystem.

Figure 32:
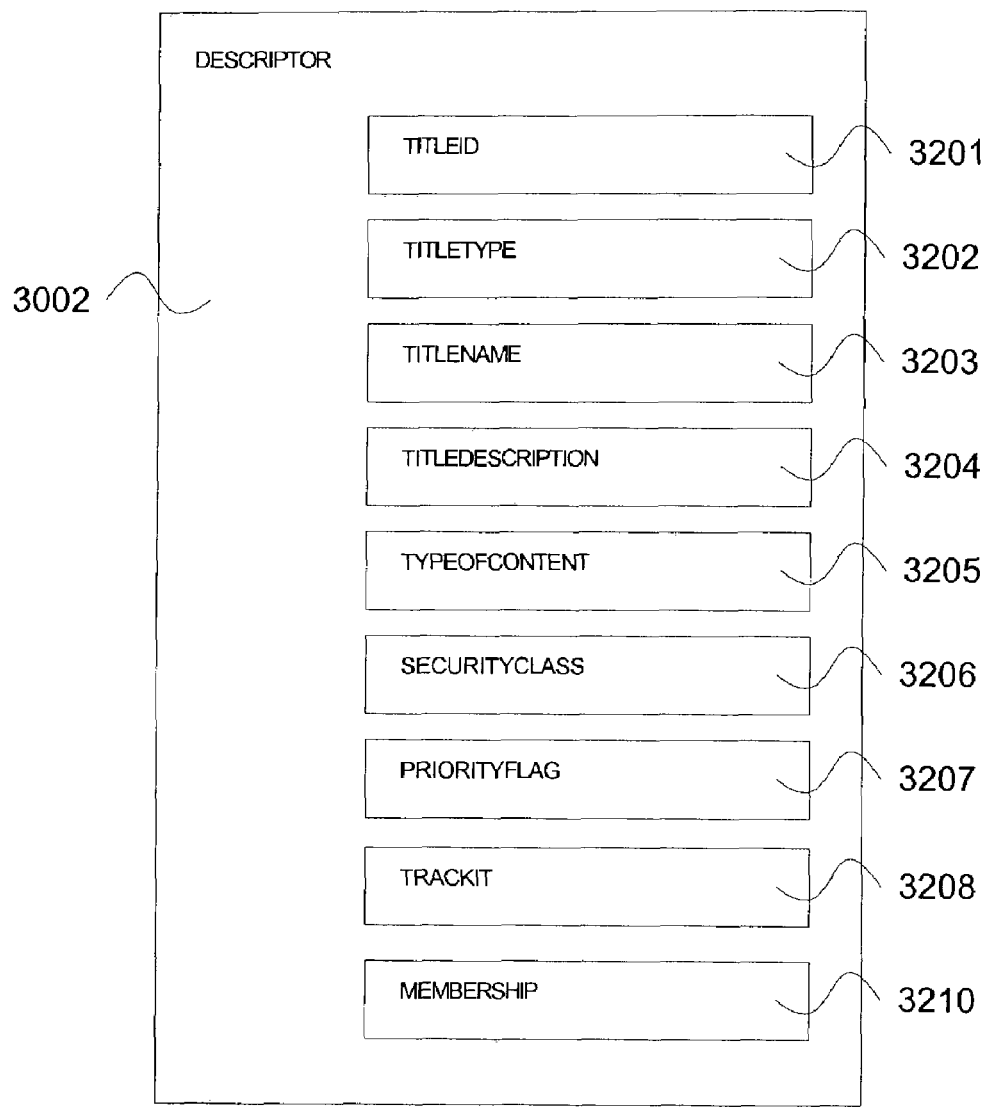
FIG. 32, depicts a descriptor component, according to an embodiment of the invention.

Referring now to FIG. 32, descriptor component 3002 as shown in FIG. 30 is further described. Descriptor component can function as a "header" element for title object 2901, as shown if FIG. 29, and provides descriptive information related to the title. The descriptor can be used by system applications used in processing the title, and can be used by system applications involved in generic processing of titles such that they only interpret and act upon title specific information regardless of the content they contain, reference, or express rights to. For example, a system application may only be concerned with the type of title that is being processed such as tag, ticket, or token. Likewise, another system application may only be concerned with the security classification and the priority setting associated with the title.

Titleid component 3201 comprises the unique identifier associated with the title. In one embodiment the titleid is a GUID (globally unique identifier). In another embodiment, the titleid is a unique identifier within all titles created by a single issuer. The identifier used in title id can be formal or informal, registered or not registered. Titletype component 3202 comprises the type of the title object 2901 such as tag, ticket, or token and states the type in this component. The type can be specified as a textual string element such as "Tag", "Ticket", or "Token", or in another embodiment can be specified through formal or informal identifiers such as a registered OID (object identifier). In another embodiment, titletype can provide a formal structural hierarchy to the title such that title can be associated with a family of titles, and can be used to describe how the title was formed based on a type of inheritance. The titletype would contain specific title-typing indicia such that the processing applications can retrieve, understand, interpret, and process properties associated with ancestor titles. In another embodiment, the titletype can be used to reference the template that was used to create the title.

Titlename component 3203 is a short text string used to name the title object 2901, and is similar to a file name. Titledescription 3204 comprises a longer text string, and can be used to contain primary descriptive information regarding title object 2901, including ID, type, name, description, and technical elements used for processing. Typeofcontent 3205 comprises the type of content referred to by title object 2901. In one embodiment, Typeofcontent 3205 can include terms such as "mixed", "music" or other descriptive term. In another embodiment, typeofcontent can contain more formal definitions such as MIME type classifications or industry standard codes such as that used in Rosettanet and EDI systems. Additionally, typeofcontent can be used to specify a title content such that other titles may be embedded within or specified by this title. In this example, a title can refer to other titles and convey additional rules or taxonomy regarding the referred to or contained titles.

Securityclass component 3206 comprises security classification identifiers that can be used by processing applications. In one embodiment, the classification can be as simple as a numerically ordered scheme that identifies the security processing level required of this title from an range of low to high. In another embodiment, the classification scheme can be a registered scheme or even a more technically descriptive classification such as that used in ASN.1 encoding schemes for X.509 certificates. Priorityflag component 3207 comprises a priority indicator to be used by processing applications to apply appropriate levels of processing such is the case for service level agreements, or quality of service guarantees. For example, a high priority setting can indicate to processing applications that this titles requires priority processing (that is, preferred status) and can be placed at the front of the queue. In an embodiment, the priorityflag can be textual, numerical, or structured information to be used by processing applications. In another embodiment, the priorityflag can provide or reference technically descriptive service level agreement detail that can be directly processed by applications, such as that used in Policy Based Networks or Directory Enabled Networks.

Trackit component 3208 comprises indicators for the level tracking information that should be maintained by processing applications, such as if title object 2901 must be tracked on every event. In another example, the trackit component can specify that both the transaction request and response information be tracked in the log. In another embodiment, the trackit component can specify that every action must be tracked in a stub element 2903 of the title object 2901. By tracking transactions and events in the stub, the title can maintain a journal of activities and provide a self contained log. The logging activity within a single stub or multiple stubs can be used as a record of the activities that comprise the titles experience. This can be used as an effective tool for analysis and reporting, and is also an essential aspect for titles creating and representing an experience, whereby the title maintains its own state. For example, a title can be used to create a digital treasure hunt, where the owner of the title redeems it for each step in the treasure hunt. Completing each step requires that the title maintain its state and also record the activities completed by the owner. When the treasure hunt is complete, the owner is entitled to receive a prize. The trackit component 3208, along with the recording ability of stubs, permits the title to create this experience. The title also becomes a record that can prove a sequence of steps. The tracking ability enabled by the trackit component 3208 and stubs can be used by rules components for fine-grained control over a title and for event processing. For example, based on a specific step within an experience, the title can initiate certain actions. This would require understanding of the current state and the sequence of steps that led up to the event.

The membership component 3210 comprises title membership information such as the group or family that a title may belong. In one embodiment this could be implemented as a group identifier and in another embodiment this could be implemented through references.

Figure 33:
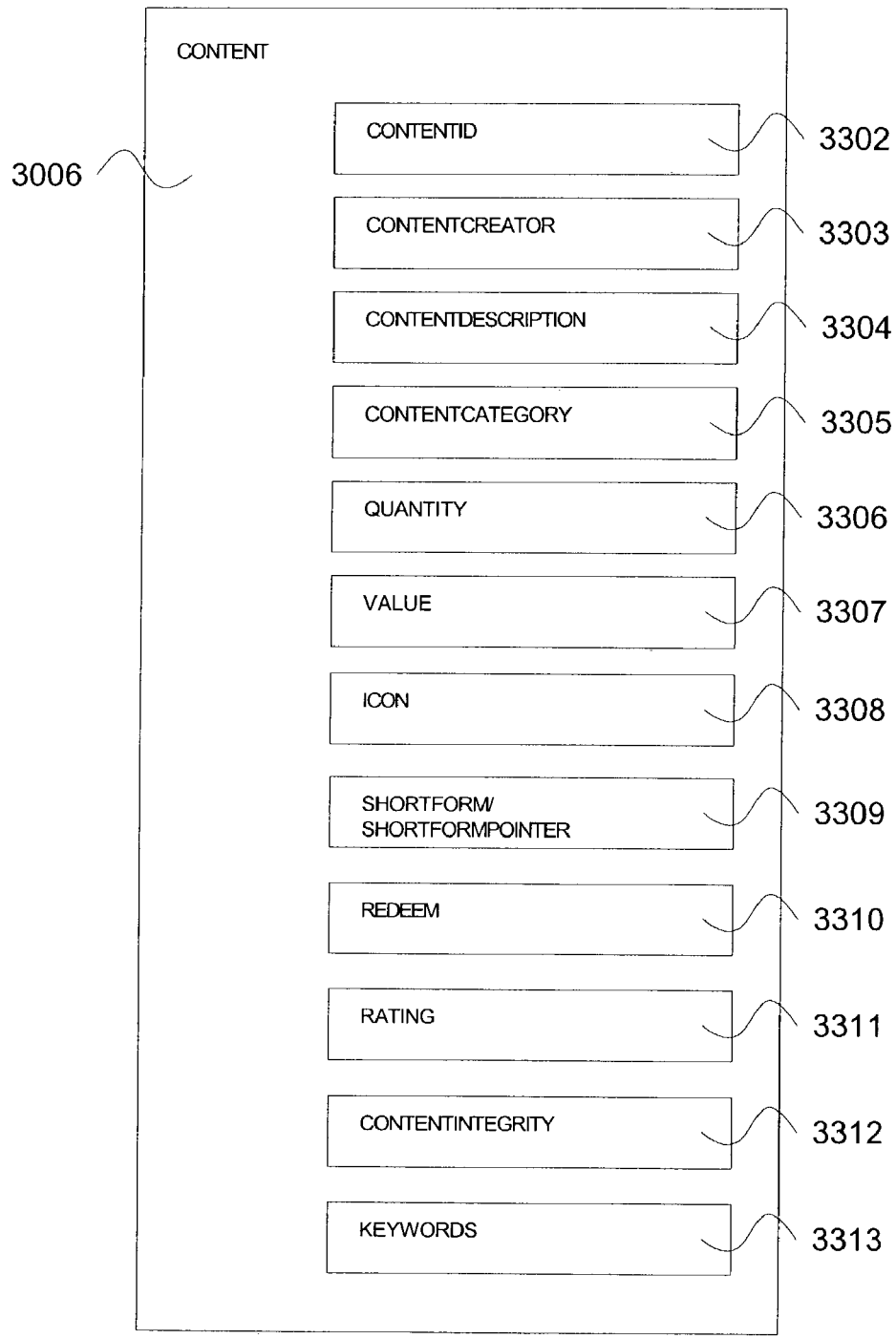
FIG. 33 depicts a content component, according to an embodiment of the invention.

Referring now to FIG. 33, content component 3006 as shown in FIG. 30 is further described. The content component is used to describe the content or asset to which the title expresses rights. In the case of digital content, the information would specifically refer to the detail associated with that digital content such as an encoded song or video. In the case of a physical asset, the content information would provide detailed information regarding the physical asset such as location, coordinates, SIC, manufacturer, model number, part number, and/or serial number.

ContentID component 3302 comprises an identifier for the content. In one embodiment, contentID component 3302 can be used to convey any type of content ID used by content publishers such as DOI, OID, or a proprietary scheme. In another embodiment, the identifier could be a serial number. Contentcreator component 3303 comprises a text string identifying the creator of the content such as a digital content file or asset. The contentcreator component can be a textual string, an identifier, or even structured identity indicia on the creator as described in other identity related components such as the owner component 3005. Contentdescription component 3304 comprises a longer text string, and can be used to contain primary descriptive information. Contentcategory component 3305 comprises the categories or taxonomy of content referred to by title object 2901. In one embodiment the contentcategory can be a simple text label, while in another embodiment the contentcategory can be a structured component with detailed taxonomy on the content referred to by the title object.

Quantity component 3306 comprises the instances of a single digital content file associated with title object 2901. Value component 3307 comprises the economic price associated with title object 2901. Icon component 3308 comprises the computer icon to be displayed in the title management system or by processing applications. Shortform/shortformpointer component 3309 comprises a pointer to a sample of the content or asset such as an image, thumbnail image, short sample audio, or low quality audio. In another embodiment, the shortform component can contain the actual sample such as textual information. For example, the shortform can contain a name and email address for a contact record. In this case, the shortform provides quick and immediate access to information, whereas the title provides access to the entire contact information. Shortform and shortformpointer and useful components when titles are traded and shared.

Redeem 3310 component comprises methods for the redemption of the title object. Redemption of the title object can be obtaining the digital content that the title refers to, or can also be the trading of the title or the sharing of the title. The redeem component is a structured component that has one to many methods describing in detail how the title may be redeemed. This structure is flexible to accommodate a variety of redemption processes and procedures that are required by publishers and consumers of title objects.

Rating component 3311 comprises a content rating for the digital content file, such as the MPAA rating of "G", "PG", etc. The detail within the rating component is context specific according to the content or asset referred to by the title object. Contentintegrity 3312 comprises a cryptographic message digest which is used for verification of digital content integrity. The contentintegrity component provides attributes to identify the method employed for integrity checking such as the SHA-1 algorithm. Keywords component 3313 comprises a list of keywords associated with the content or asset. This can be used during queries, searches, and categorizations.

Figures 34A, 34B:
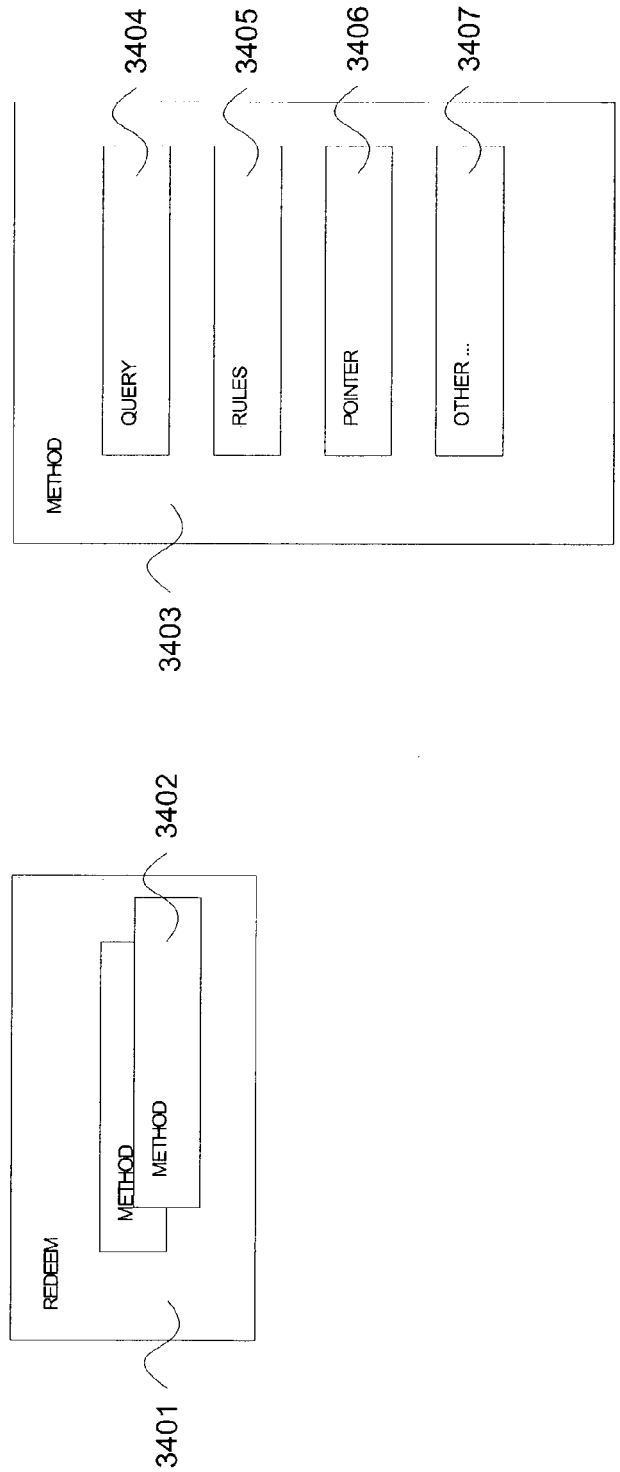
FIGS. 34A-B, depict a redeem component, according to an embodiment of the invention.

Referring now to FIGS. 34A-B, redeem component of FIG. 33 is further described. Redeem component further comprises a set of methods 3402, including a query component 3404, a rules component 3405, a pointer component 3406, and other component 3407. As mentioned, the redeem component can include from one to many methods, with each method describing how the title object can be redeemed. In one embodiment, a method can describe how the digital content maybe obtained. In another embodiment, a method may describe how digital content maybe obtained in a streaming version. In yet another embodiment, a method can describe how the title object can be shared, traded, sampled, archived, destroyed, communicated, or processed depending on the specific requirements of the publisher and the consumer application. In another embodiment, a redemption method can be used to specify how a new title can created based on the current title object being redeemed. A redeem method may include one, some, or all of the components identified in FIG. 34B.

In another embodiment, a query component 3404 comprises searching procedures for the digital content file. This component has attributes to identify the query mechanism being described. In one embodiment, the query component can contain SQL queries in order to obtain dynamic information from a database. In another embodiment, the query component can contain an XQuery statement to obtain data from an XML data set or document collection. In another embodiment, the query component can contain computer executable statements to process some query business logic in order to calculate or process the results. The rules component 3405 comprises statements specifying the specific rules that are applied before, during, and after redemption. The structure and statements contained within the rules component is similar to that described for the rules component 3007 in the title object, in that it can contain and describe any type of rules statement such as XSLT, XrML, BRML; and can also contain pointers or references to external rules. However, this rules component is specifically associated with a redemption method.

The pointer component 3406 specifies a pointer to the content or asset being referenced by the title object. The pointer structure is specified in the component and in one embodiment can be a simple URL. In another embodiment this may be a URI, XPointer, XLink, coordinates or other pointer description to the content or asset.

Other component 3407 comprises additional functionality that may be added to the set of methods 3402. The other component accommodates proprietary or custom information to be used during redemption and should be understood, interpreted, and processed by applications.

Figures 35A, 35B:
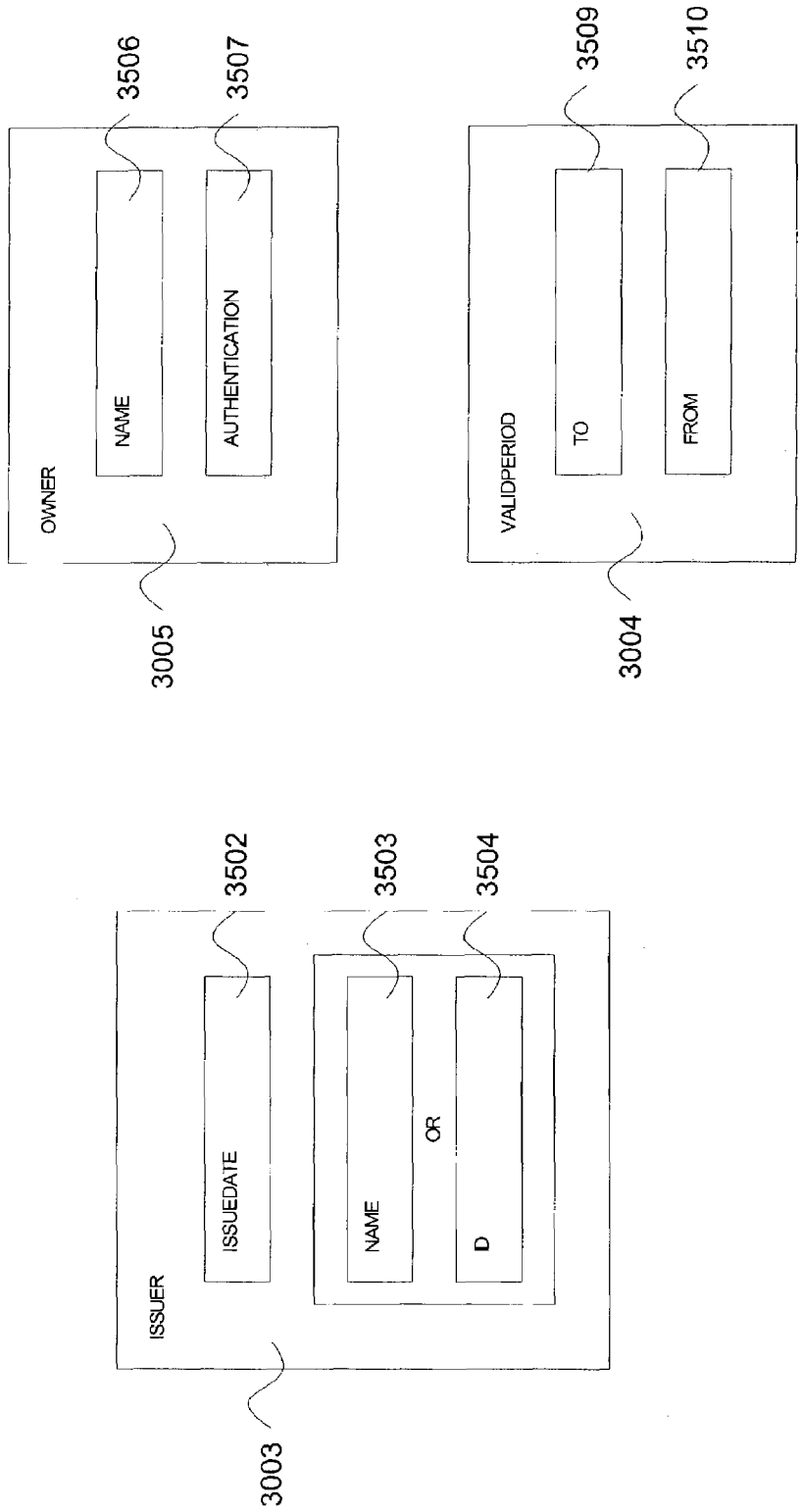
FIG. 35A depicts an issuer component of a title element, according to an embodiment of the invention.
FIG. 35B depicts an owner component of a title element, according to an embodiment of the invention.

Referring now to FIG. 35A, issuer component of title element 2902 as shown in FIG. 30 is further described. Issuedate 3502 comprises the date that title object 2901 was issued. In one embodiment, name component 3503 comprises a textual name string for the issuer of title object 2901. As described earlier, the name component can be a formal name for the issuer of the title such as a registered Internet Domain Name or X.500 Distinguished Name. In another embodiment, ID component 3504 can comprise an alpha-numeric ID string for the issuer of the title object 2901. As described earlier, the ID component can be a formal or informal identifier.

Referring now to FIG. 35B, owner component 3005 of title element 2902, as shown in FIG. 30, is further described. Name 3506 comprises a textual name string for the owner of title object 2901 or as described earlier for the owner component can be a formal name definition such as a X.500 Distinguished Name. Authentication component 3507 comprises technical detail such as cryptographic information that can be used to verify the identity of the title object 2901 owner. The technical information will be sufficient enough for the processing application to correctly identify and authenticate the owner of the title. Information contained in this component can be cryptographic information used in processes such as biometric identification or even for identification through the use of digital certificates and a public key infrastructure. Component 3510 comprises the activation date for title object 2901. Title object processing applications may use the information contained within the validperiod component 3004 to ensure that a title object will not be processed before it becomes valid as specified in the from component 3510 and not processed after it becomes invalid as specified in the to component 3509. The date can be specified in the UTC date/time format.

Figure 36:
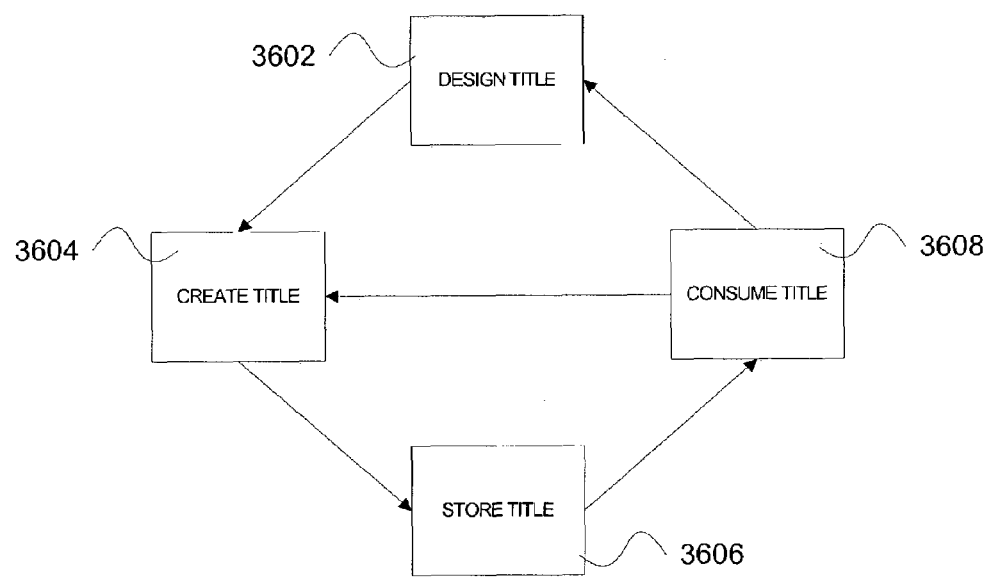

Referring now to FIG. 36, a simplified diagram displaying title object 2901 lifecycle and management steps is displayed, according to one embodiment of the invention. Initially, a title is designed at step 3602. The design process would take into consideration the source content or asset and identify properties that should be included in the title. The design process must also carefully consider the redemption methods that are appropriate for the content (or asset) and clearly specify the redemption processes that will be described in each method. All taxonomy, security, rule processing, business logic, and descriptive information will be identified, described, and documented during the design phase of a title object. As an output to the design phase, a title object template will generally be created and identified. The template is used as a technical guideline, script or set of instructions that can be used during the creation process to generate a title object. Templates can be stored for re-use. An application that assists or implements the design aspects of a title can provide typical design functions such as collaboration, planning, scheduling, and reporting. Collaboration in title design can be an effective tool for creating complex title objects that consist of multiple elements. As an example, a digital album can involve several parties for design of covers, images, audio, text, and sheet music elements. Scheduling aspects maybe required to schedule the creation of titles. For instance, titles can be created on demand on created in batch.

The next step in the lifecycle and management is the production or creation stage, as shown in create title 3604. The create title 3604 stage involves a "factory" or similar process to produce titles. Production can be on-demand, in bulk, or as scheduled depending on the requirements of publishers. Implementations of the create title 3604 process can consider request, complexity, reporting, control, and performance factors to ensure that production demands are satisfied. Additional functionality supported by the create title 3604 process can include warehousing and distribution of titles that are created. Warehousing and distribution functions can be used to service requests by several parties involved in the title object lifecycle such as in syndication and content distribution networks. The creation process is described further in FIG. 37A. The output from this stage would be title object instances.

The next stage in lifecycle and management is the storage of titles as depicted in 3606. This stage would include typical title object storage and management functions including securing title objects as they are stored, properly authenticating owner's access to title objects, and viewing title objects that maybe stored. Storage functions can be implemented as server applications or incorporated directly into client applications that run directly on consumer computing devices such as desktop computers and mobile devices. Server applications can be implemented to support a community of users. Storage of title objects can be a critical stage in the lifecycle as a title object may tend to spend a majority of its life in storage. Therefore, it will be essential for applications involved in this stage to provide proper handling such as ensuring that security requirements are satisfied.

The next stage in the lifecycle and management is the consuming of titles as depicted in 3608. Consuming of titles primarily involves the use of titles in order to experience the content. This is accomplished by redeeming the title using the variety of redemption methods defined within a title object. Applications that are involved in this stage can be complex as they must effectively process the title object, including rule processing, business logic processing, interpretation of descriptive information, resolution of references and pointers, and most importantly the authentication of titles and owners. In an embodiment of the lifecycle there would also be the communication, interpretation and processing of fine-grained trust between all parties involved in the lifecycle. In one embodiment, the title manager, resolver, state server, content proxy, and content server would all be involved in the consumption of a title object.

Consume title 3608 component can tie back to the design title 3602 and create title 3604 components to complete the lifecycle. In one embodiment, the detail obtained through the consumption and use of title objects will be essential information used in the design of subsequent and additional titles. In another more direct embodiment, the consumption of title can be effectively tracked and directly used by one title object to create a new or enhanced title object template. In this instance, as a title is consumed it will progressively track and update various properties within its stub element structure. These properties will combine to represent the experience of the title object, and on a particular redemption method will generate either a new title object template or an enhanced title object template. The new or enhanced template can then be used to create additional title objects. In this embodiment, a title can be an effective tool and mechanism for use in expert systems or artificial intelligence engines. In another embodiment, a title can be used as a data source into the create title 3604 process to create new titles, and this can be triggered by one of the redemption methods in the original title. This embodiment can be an effective technique in using title objects for syndication or delegation. It can also be an effective technique for transforming a title object, enhancing a title object, evolving a title object, or morphing a title object.

Figure 37B:
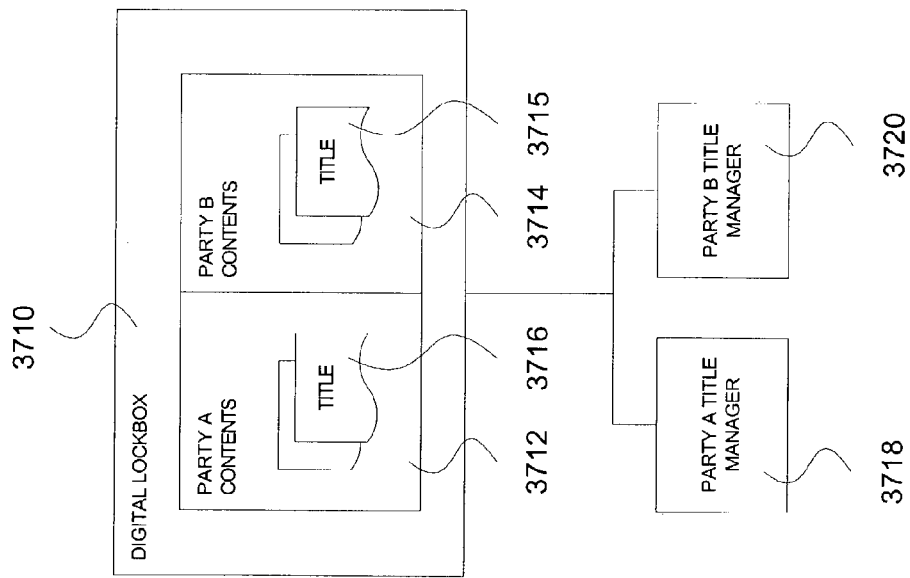
FIG. 37B depicts a simplified diagram a digital lockbox, according to an embodiment of the invention.
Figure 37A:
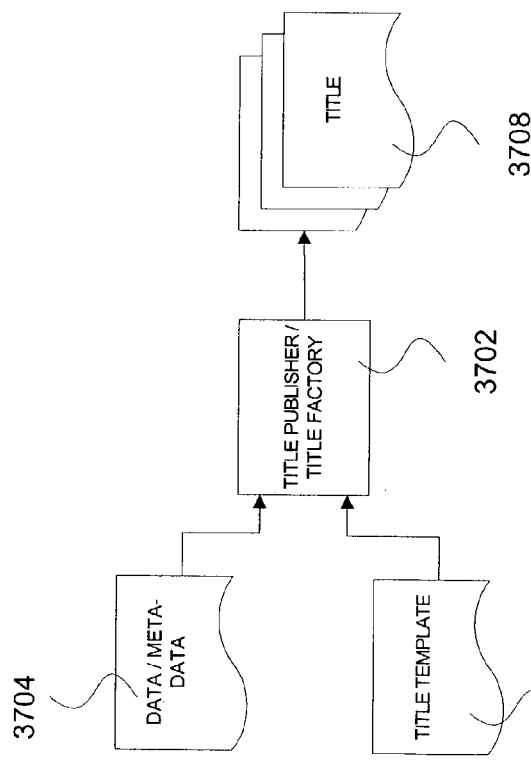

FIG. 37A is a simplified embodiment of the create title 3604 process shown in FIG. 36, according to one embodiment of the invention. The title publisher/title factory 3702 is responsible for implementing the process that creates titles. In this embodiment, the factory receives data/meta-data 3704 from a content publisher and also receives a title template 3706. The data and template combined may be used by the factory to produce the title. The data 3704 portion may provide specific data to be included in the title as well as instructions to control productions, such as the template to use, the number of titles to be produced, and the location of where the titles are to be sent. The template 3706 can be referenced by the content publisher and actually stored in the factory or it can be sent by the content publisher to the factory. The data 3704 source and format depends on the content publisher and can be proprietary information, standards-based information, or even another title object. The template can be an XSLT template or can be any format of template instructions that can be interpreted and processed by the factory. In this embodiment, the factory will use the template to interpret and process the data in order to produce title objects. Although FIG. 37A shows the factory output as title objects, another embodiment may only produce a single title, and yet another embodiment can produce great quantities of titles to fulfill a quota.

Title trading is supported by the title technology and the applications that process titles. Trading between parties can be accomplished in many different ways and involve any number of technologies and techniques. Referring now to FIG. 37B, a simplified diagram of a digital lockbox component is shown, according to one embodiment of the invention. In this example, digital lockbox component 3710 is used as a secure container for the title objects that are being traded between party A and party B. Digital lockbox component 3710 further comprises two secure areas that contain the title objects for trade, party A's title objects 3716 are stored in drawer 3712, while party B's title objects 3715 are stored in drawer 3714. Digital lockbox component 3710 further permits inspection by either party into the contents of the lockbox in order for each to verify the title objects and approve or cancel the trade. Digital lockbox component 3710 would not permit ownership to be transferred and only permits viewing of sample content, or of the content permitted by a redemption method (e.g. content legally shared). When both parties have confirmed the trade and approved of title objects 3716 and 3715, digital lockbox component 3710 claims ownership over all title objects in the lockbox, and then transfers ownership to the respective party. Transferring ownership involves delivering title objects 3716 and 3715 to the appropriate title manager 3718 and 3720 and subsequently having title managers 3718 and 3720 claim ownership for their respective party. Digital lockbox component 3710 in this case is similar to a $3^{rd}$ party escrow system by providing a substantial level of guarantee to both parties involved in the trade. For instance, if any part of the trade failed during the claim process, digital lockbox 3710 can rollback the entire trade. Digital lockbox 3710 can also provide a legal record of the trade to all parties involved in the trade. As shown in the example, the contents of the trade can be one or multiple title objects.

In another embodiment, digital lockbox component 3710 supports a transfer in which party A intends to give party B the title objects with nothing expected in return. For example, party B could sample the content and review it before accepting the transfer. The claim process for the title objects would remain the same and digital lockbox component 3710 can provide a record of the transaction. In yet another embodiment, digital lockbox component 3710 can support: multi-party, dependent trades, nested-trades. In yet another embodiment, digital lockbox component 3710 may support complex trades involving service level agreements, insurance, legal recourse, guarantees, and content introspection. For example, a highly confidential trade can be implemented with special content inspection rights provided through digital lockbox component 3710. This would provide both parties with the ability to view the confidential content for the duration of the trade negotiations under special circumstances, such as viewing directly using a controlled application similar to that provided by digital rights management software.

In another embodiment, a simplified trade can be executed directly between two parties by having title manager components 3718 and 3720 simply transfer title objects 3716 and 3715, and subsequently have the receiving title manager 3718 and 3720 claim ownership over the respective title objects 3716 and 3715. In yet another embodiment, a trade can be executed directly by title manager components 3718 and 3720 acting as secure agents. An established protocol can be used by title managers 3718 and 3720 to securely trade the title objects. For example, a Boolean circuit can be utilized by the title managers. In another embodiment, security ownership indicia associated with each title object can be updated according to specific title authentication techniques employed by each respective title objects 3716 and 3715.

Although the structure and management of titles as described herein may make specific or general references to certain technologies such as XML, other technologies may be available. Title structures can be represented in any number of formats, and management or lifecycle processes can be implemented in any number of ways. For example, a title object and its management maybe implemented directly in computer executable code. This type of title object can be an effective method for creating title enabled mobile code, self-executing title objects, digital robots, and crawlers. In this example, using the title object can provide significant benefits in that trust and integrity can be transmitted with the mobile code. In the example where the title object is self-executing code, the title object can implement title creation functions to morph or transform itself. In another embodiment, a title object can be described in a scripting language and executed as required. For example, a title object can be described and implemented as a Javascript program and embedded within a web page. The Javascript program would comprise not only the title structure, but also the logic to process the titles such as implementing the rules and redemption methods. The Javascript code can be used to embed titles in a web page and participate in the title transaction ecosystem.

In another embodiment, title objects and management components are directly embedded into hardware. For example, a title object can be stored on a smartcard device along with a secure management component that is responsible for processing and updating the title object's security indicia. A user would subsequently insert the smartcard into a terminal in order, among other things, to guarantee transaction validity. The title object's security indicia would be securely updated directly on the smartcard, as a security precaution. In another example, management components are implemented as firmware in hardware computing appliances (i.e., firewalls, consumer set-top boxes, etc.), or in portable hardware tokens that can be attached to computing devices through direct interfaces, cables or wireless connections.

F. CONCLUSION

Advantages of the invention include the ability to easily and efficiently manage and share titles over a network such as the Internet. Additional advantages of the invention include creating an ecosystem whereby digital content providers can offload the burden of managing and enforcing user access rights, yet receive revenue from third party transactions.

Having disclosed exemplary embodiments and the best mode, modifications and variations may be made to the disclosed embodiments while remaining within the subject and spirit of the invention as defined by the following claims.

The invention claimed is:

1. A computer-implemented method for effecting transfer of title objects using one or more computing devices, comprising:

using a first subset of the one or more computing devices, storing a first title object received from a first entity with a lockbox programmed to securely execute transfer of title objects between parties, the first title object having been previously encoded with title data representing at least one right, the first title object being encoded to effect anonymous redemption of the at least one right by presentation of the first title object to a title-enabled process, the first title object also having been previously encoded with an associated title object state corresponding to a first value which corresponds to an externally stored state that is stored separately from the title object state;

verifying validity of the first title object by comparing the associated title object state and the externally stored state;

in response to verification of the validity of the first title object, transferring ownership of the at least one right represented by the first title object to a second entity by releasing the first title object from the lockbox to the second entity upon satisfaction of at least one criterion; and using a second subset of the one or more computing devices, updating both the associated title object state and the externally stored state to correspond to a new value in conjunction with releasing the first title object to the second entity, thereby ensuring that only a single valid instance of the first title object is in circulation.

2. The method of claim 1 further comprising receiving a second title object from the second entity with the lockbox before releasing the first title object, and releasing the second title object from the lockbox to the first entity upon satisfaction of the at least one criterion.

3. The method of claim 2 wherein the at least one criterion comprises receipt by the lockbox of both of the first and second title objects.

4. The method of claim 1 wherein the at least one criterion comprises approval by at least one of the first and second entities of release of the first title object.

5. The method of claim 1 further comprising providing an interface to at least one of the first and second entities for interacting with the lockbox.

6. The method of claim 5 wherein the interface is operable to enable any of viewing of the first title object, verification of the first title object, inspection of the first title object, sampling of the first title object, and approval of release of the first title object.

7. The method of claim 6 wherein the interface employs a controlled program for enabling restricted access to the first title object.

8. The method of claim 1 further comprising updating the title object state and the externally stored state corresponding to the first title object as a result of interaction of the lockbox with the first title object.

9. The method of claim 1 further comprising storing the first title object in a memory associated with and controlled by the lockbox.

10. The method of claim 1 wherein the lockbox is controlled by one of the first and second entities.

11. The method of claim 1 wherein the lockbox process is controlled by a third entity.

12. The method of claim 1 further comprising providing a software application to at least one of the first and second entities to facilitate interaction with the lockbox.

13. The method of claim 1 wherein the lockbox comprises one of a plurality of lockboxes and the first and second entities comprise two of a plurality of entities, the method further comprising facilitating transfer of selected ones of the title objects among the plurality of entities with the plurality of lockboxes substantially simultaneously.

14. The method of claim 1 wherein the first entity is a seller of a product represented by the first title object, and the second entity is a buyer of the product, the method further comprising:

facilitating selection of the product by the buyer;

facilitating transmission of the first title object from the seller to the lockbox in response to selection of the product by the buyer;

facilitating transmission of a sales order from the seller to the buyer, the sales order identifying terms of sale and including information relating to the lockbox; and facilitating transmission of a payment title object from the buyer to the lockbox using the information, receipt of the payment title object by the lockbox corresponding to one of the at least one criterion.

15. The method of claim 14 further comprising:

notifying the seller that the payment title object has been received by the lockbox;

facilitating verification of payment by the seller; and facilitating capture of funds by the seller using the payment title object.

16. The method of claim 1 further comprising:

receiving a second title object from the second entity with the lockbox before releasing the first title object;

under control of the lockbox, controlling access to the first and second title objects such that the first entity has restricted access to the second title object and the second entity has restricted access to the first title object; and releasing the second title object from the lockbox to the first entity upon satisfaction of the at least one criterion.

17. The method of claim 16 wherein the restricted access enables the first and second entities to perform at least one of viewing of, verification of, inspection of, and sampling of the second and first title objects, respectively.

18. The method of claim 1 wherein the first title object represents a right to access digital content, and wherein the digital content is maintained separately from the first title object.

19. The method of claim 18 further comprising facilitating access to at least a portion of the digital content by the second entity under control of the lockbox.

20. The method of claim 1 wherein the first title object represents a right to access digital content, and wherein at least a portion of the digital content is embedded in the first title object.

21. The method of claim 20 further comprising facilitating access to the portion of the digital content by the second entity under control of the lockbox.

22. The method of claim 1 further comprising generating a record of the receipt and release of the first title object.

23. The method of claim 1 wherein the first and second entities are represented by first and second title manager processes, respectively, the first and second title manager processes being operable to facilitate organization and management of selected ones of the title objects associated with the first and second entities, the method further comprising facilitating interaction among the first and second title manager processes and the lockbox to facilitate handling of the first title object.

24. The method of claim 23 further comprising receiving instructions from at least one of the first and second title manager processes, the instructions being for use by the lockbox to facilitate handing of the first title object.

25. The method of claim 1 further comprising facilitating manual verification of satisfaction of the at least one criterion by at least one of the first entity and the second entity.

26. The method of claim 1 further comprising facilitating verification of satisfaction of the at least one criterion by an automated process associated with at least one of the first entity and the second entity.

27. The method of claim 1 further comprising:
receiving at least one additional title object from any of the first, second, and at least one additional entity with the lockbox; and
releasing the at least one additional title object from the lockbox to any of the first, second, and at least one additional entities upon satisfaction of the at least one criterion.

28. The method of claim 1 wherein the lockbox is operable to facilitate any of multi-party trades, dependent trades, nested trades, and complex trades.

29. The method of claim 28 wherein the complex trades relate to any of service level agreements, insurance agreements, legal recourse agreements, and guarantee agreements, content inspection agreements.

30. A platform for facilitating transfer of title objects, comprising one or more computing devices, a first one of the computing devices being programmed to implement a lockbox for securely executing transfer of title objects between parties, the lockbox being operable to store a first title object received from a first entity using a first subset of the computing devices, the first title object having been previously encoded with title data representing at least one right, the first title object being encoded to effect anonymous redemption of the at least one right by presentation of the first title object to a title-enabled process, the first title object also having been previously encoded with an associated title object state corresponding to a first value which corresponds to an externally stored state that is stored separately from the title object state, a second subset of the computing devices being further programmed to verify the validity of the first title object by comparing the associated title object state and the externally stored state, and in response to verification of the validity of the first title object to transfer ownership of the at least one right represented by the first title object to a second entity by releasing the first title object to the second entity upon satisfaction of at least one criterion, the second subset of the computing devices being further programmed to update both the associated title object state and the externally stored state to correspond to a new value in conjunction with releasing the first title object to the second entity, thereby ensuring that only a single valid instance of the first title object is in circulation.

31. The platform of claim 30 wherein the lockbox is further operable to receive a second title object from the second entity before releasing the first title object, and release the second title object to the first entity upon satisfaction of the at least one criterion.

32. The platform of claim 31 wherein the at least one criterion comprises receipt by the lockbox of both of the first and second title objects.

33. The platform of claim 30 wherein the at least one criterion comprises approval by at least one of the first and second entities of release of the first title object.

34. The platform of claim 30 wherein the at least one computing device is configured to provide an interface to at least one of the first and second entities for interacting with the lockbox.

35. The platform of claim 34 wherein the interface is operable to enable any of viewing of the first title object, verification of the first title object, inspection of the first title object, sampling of the first title object, and approval of release of the first title object.

36. The platform of claim 35 wherein the interface employs a controlled program for enabling restricted access to the first title object.

37. The platform of claim 30 wherein the at least one computing device is operable to facilitate updating of the title object state and the externally stored state corresponding to the first title object as a result of interaction of the lockbox with the first title object.

38. The platform of claim 30 further comprising a memory under control of the lockbox, the at least one computing device being configured to store the first title object in the memory.

39. The platform of claim 30 wherein the at least one computing device is controlled by one of the first and second entities.

40. The platform of claim 30 wherein the at least one computing device is controlled by a third entity.

41. The platform of claim 30 wherein the at least one computing device is configured to provide a software application to at least one of the first and second entities to facilitate interaction with the lockbox.

42. The platform of claim 30 wherein the lockbox comprises one of a plurality of lockboxes and the first and second entities comprise two of a plurality of entities, the at least one computing device further being configured to facilitate transfer of selected ones of the title objects among the plurality of entities with the plurality of lockboxes substantially simultaneously.

43. The platform of claim 30 wherein the first entity is a seller of a product represented by the first title object, and the second entity is a buyer of the product, the at least one computing device is further configured to:
facilitate selection of the product by the buyer;
facilitate transmission of the first title object from the seller to the lockbox in response to selection of the product by the buyer;
facilitate transmission of a sales order from the seller to the buyer, the sales order identifying terms of sale and including information relating to the lockbox; and
facilitate transmission of a payment title object from the buyer to the lockbox using the information, receipt of the payment title object by the lockbox corresponding to one of the at least one criterion.

44. The platform of claim 43 wherein the at least one computing device is further configured to:
   notify the seller that the payment title object has been received by the lockbox;
   facilitate verification of payment by the seller; and
   facilitate capture of funds by the seller using the payment title object.

45. The platform of claim 30 wherein the at least one computing device is further configured to:
   receive a second title object from the second entity with the lockbox before releasing the first title object;
   control access to the first and second title objects such that the first entity has restricted access to the second title object and the second entity has restricted access to the first title object; and
   release the second title object from the lockbox to the first entity upon satisfaction of the at least one criterion.

46. The platform of claim 45 wherein the restricted access enables the first and second entities to preform at least on of viewing of, verification of, inspection of, and sampling of the second and first title objects.

47. The platform of claim 30 wherein the first title object represents a right to access digital content, and wherein the digital content is maintained separately from the first title object, and wherein the at least one computing device is configured to facilitate access to at least a portion of the digital content by the second entity under control of the lockbox.

48. The platform of claim 30 wherein the first title object represents a right to access digital content, and wherein at least a portion of the digital content is embedded in the first title object, and wherein the at least one computing device is configured to facilitate access to the portion of the digital content by the second entity under control of the lockbox.

49. The platform of claim 30 wherein the at least one computing device is operable to generate a record of the receipt and release of the first title object by the lockbox.

50. The platform of claim 30 wherein the at least one computing device is configured to facilitate manual verification of satisfaction of the at least one criterion by at least one of the first entity and the second entity.

51. The platform of claim 30 wherein the at least one computing device is configured to facilitate verification of satisfaction of the at least one criterion by an automated process associated with at least one of the first entity and the second entity.

52. The platform of claim 30 wherein the at least one computing device is configured to:
   receive at least one additional title object from any of the first, second, and at least one additional entity with the lockbox; and
   release the at least one additional title object from the lockbox to any of the first, second, and at least one additional entities upon satisfaction of the at least one criterion.

53. The platform of claim 30 wherein the lockbox is operable to facilitate any of multi-party trades, dependent trades, nested trades, and complex trades.

54. The platform of claim 53 wherein the complex trades relate to any of service level agreements, insurance agreements, legal recourse agreements, guarantee agreements, and content inspection agreements.

* * * * *

UNITED STATES PATENT AND TRADEMARK OFFICE
CERTIFICATE OF CORRECTION

| | | |
|---|---|---|
| PATENT NO. | : 7,707,121 B1 | Page 1 of 1 |
| APPLICATION NO. | : 10/440286 | |
| DATED | : April 27, 2010 | |
| INVENTOR(S) | : Stefan Roever et al. | |

It is certified that error appears in the above-identified patent and that said Letters Patent is hereby corrected as shown below:

CLAIMS:

1.    In line 2 of claim 46 (column 43, line 19) change "enables the first and second entities to preform at least on of" to --enables the first and second entities to preform at least one of--.

Signed and Sealed this
Thirteenth Day of November, 2012

David J. Kappos
*Director of the United States Patent and Trademark Office*